US009366483B2

(12) United States Patent
Eckhoff et al.

(10) Patent No.: US 9,366,483 B2
(45) Date of Patent: Jun. 14, 2016

(54) TEMPERATURE-CONTROLLED CONTAINER SYSTEMS FOR USE WITHIN A REFRIGERATION DEVICE

(71) Applicant: Tokitae LLC, Bellevue, WA (US)

(72) Inventors: Philip A. Eckhoff, Kirkland, WA (US); Lawrence Morgan Fowler, Redmond, WA (US); William Gates, Medina, WA (US); Jennifer Ezu Hu, Seattle, WA (US); Muriel Y. Ishikawa, Livermore, CA (US); Nathan P. Myhrvold, Medina, WA (US); Nels R. Peterson, Bellevue, WA (US); Clarence T. Tegreene, Mercer Island, WA (US); Maurizio Vecchione, Pacific Palisades, CA (US); Lowell L. Wood, Jr., Bellevue, WA (US); Victoria Y. H. Wood, Livermore, CA (US)

(73) Assignee: Tokitac LLC, Bellevue, WA (US)

( * ) Notice: Subject to any disclaimer, the term of this patent is extended or adjusted under 35 U.S.C. 154(b) by 175 days.

(21) Appl. No.: 14/091,831

(22) Filed: Nov. 27, 2013

(65) Prior Publication Data
US 2015/0143818 A1    May 28, 2015

(51) Int. Cl.
*F25D 11/00* (2006.01)
*F25B 21/02* (2006.01)
(Continued)

(52) U.S. Cl.
CPC .............. *F28D 15/02* (2013.01); *F25D 11/006* (2013.01); *F25B 21/02* (2013.01); *F25B 23/006* (2013.01); *F25B 2600/07* (2013.01); *F25D 2700/12* (2013.01)

(58) Field of Classification Search
CPC ....... F25D 11/00; F25D 11/006; F25B 21/02; F25B 2600/07; F25B 23/006; F25B 21/04; F25B 49/02; F28D 15/02
USPC ................................. 62/3.2; 165/104.21, 287
See application file for complete search history.

(56) References Cited

U.S. PATENT DOCUMENTS

| 4,137,964 A | * | 2/1979 | Buckley | ................ F24F 5/0046 126/638 |
| 4,474,170 A | * | 10/1984 | McConnell | ............... F24J 2/055 118/317 |

(Continued)

FOREIGN PATENT DOCUMENTS

| WO | WO 2011/007162 A1 | 1/2011 |
| WO | WO 2013/110957 A2 | 8/2013 |

OTHER PUBLICATIONS

U.S. Appl. No. 14/484,969, Chou et al.

(Continued)

*Primary Examiner* — Mohammad M Ali

(57) ABSTRACT

In some embodiments, a temperature-controlled container for use within a refrigeration device includes: one or more sections of insulation material substantially defining one or more walls of a temperature-controlled container, the temperature-controlled container including an internal region; a thermally-insulated partition dividing the internal region to form a storage region and a phase change material region internal to the container, the thermally-insulated partition including a conduit between the storage region and the phase change material region; a thermal control device within the conduit; an aperture within a section of the insulation material substantially defining the container, the aperture between the phase change material region internal to the container and an external surface of the container; and a unidirectional thermal conductor positioned within the aperture, the unidirectional thermal conductor configured to transmit heat in a direction from the phase change material region to the external surface of the container.

8 Claims, 32 Drawing Sheets

(51) Int. Cl.
*F28D 15/02* (2006.01)
*F25B 23/00* (2006.01)

(56) References Cited

U.S. PATENT DOCUMENTS

| | | | | |
|---|---|---|---|---|
| 5,497,630 A | * | 3/1996 | Stein | F24B 17/12 |
| | | | | 165/104.12 |
| 5,579,830 A | * | 12/1996 | Giammaruti | F28D 15/02 |
| | | | | 165/104.21 |
| 8,716,689 B2 | * | 5/2014 | Chen | F28D 15/0233 |
| | | | | 257/2 |
| 2011/0016886 A1 | * | 1/2011 | Ghoshal | F25B 21/02 |
| | | | | 62/3.2 |
| 2011/0265785 A1 | * | 11/2011 | Klier | F24J 2/34 |
| | | | | 126/628 |
| 2012/0012804 A1 | * | 1/2012 | Chen | F28D 15/0233 |
| | | | | 257/2 |
| 2012/0192574 A1 | * | 8/2012 | Ghoshal | F25B 21/02 |
| | | | | 62/3.2 |
| 2012/0292476 A1 | * | 11/2012 | Smith | F16F 15/022 |
| | | | | 248/550 |
| 2012/0294407 A1 | * | 11/2012 | Namba | G21C 9/004 |
| | | | | 376/272 |
| 2013/0019623 A1 | | 1/2013 | Jo et al. | |
| 2013/0047652 A1 | | 2/2013 | Lee et al. | |
| 2013/0063854 A1 | * | 3/2013 | Soffer | G06F 1/18 |
| | | | | 361/103 |
| 2013/0152621 A1 | | 6/2013 | Lee et al. | |
| 2013/0160476 A1 | | 6/2013 | Lee et al. | |
| 2013/0160484 A1 | | 6/2013 | Lee et al. | |

OTHER PUBLICATIONS

PCT International Search Report; International App. No. PCT/US2014/067273; bearing a date of Apr. 24, 2015; pp. 1-3.

* cited by examiner

TEMPERATURE-CONTROLLED CONTAINER SYSTEMS FOR USE WITHIN A REFRIGERATION DEVICE

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

Temperature-controlled containers for use within a refrigeration device are described herein. In some embodiments, a temperature-controlled container for use within a refrigeration device comprises: one or more sections of insulation material substantially defining a temperature-controlled container of a size and shape to fit within a storage region of a refrigeration device, the one or more sections of insulation material forming an aperture at one side of the container and a storage region internal to the container distal to the aperture; and two or more walls substantially forming a tank, the tank configured to hold phase change material internal to the container, the one or more walls positioned within the one or more sections of insulation material so that a first wall of the tank is adjacent to the aperture at one side of the container and a second wall of the tank is positioned adjacent to the storage region.

In some embodiments, a temperature-controlled container for use within a refrigeration device comprises: one or more sections of insulation material substantially defining one or more walls of a temperature-controlled container, the temperature-controlled container including an internal region; a thermally-insulated partition dividing the internal region to form a storage region and a phase change material region internal to the container, the thermally-insulated partition including a conduit between the storage region and the phase change material region; a thermal control device within the conduit; an aperture within a section of the insulation material substantially defining the container, the aperture between the phase change material region internal to the container and an external surface of the container; a unidirectional thermal conductor positioned within the aperture, the unidirectional thermal conductor configured to transmit heat in a direction from the phase change material region to the external surface of the container; and a thermal dissipator unit adjacent to the external surface of the container, the thermal dissipator unit including a radiative component configured to be positioned within the refrigeration device, and a thermal transfer component, the thermal transfer component in thermal contact with the unidirectional thermal conductor.

In some embodiments, a temperature-controlled container for use within a refrigeration device comprises: one or more sections of insulation material substantially defining one or more walls of a temperature-controlled container, the temperature-controlled container including an internal region; a thermally-insulated partition dividing the internal region to form a storage region and a phase change material region internal to the container, the thermally-insulated partition including a conduit between the storage region and the phase change material region; a thermal diode unit within the storage region, the thermal diode unit including a thermal transfer component positioned within the conduit; an aperture within a section of the insulation material substantially defining the container, the aperture between the phase change material region internal to the container and an external surface of the container; a unidirectional thermal conductor positioned within the aperture, the unidirectional thermal conductor configured to transmit heat in a direction from the phase change material region to the external surface of the container; and a thermal dissipator unit adjacent to the external surface of the container, the thermal dissipator unit including a radiative component configured to be positioned within the refrigeration device, and a thermal transfer component, the thermal transfer component in thermal contact with the unidirectional thermal conductor.

In some embodiments, a thermal diode unit configured for use within a temperature-controlled container for use within a refrigeration device comprises: at least one inner wall configured to be substantially vertical during use of the thermal diode unit; at least one outer wall of a size and shape to align with the at least one inner wall, with a gap formed between the at least one inner wall and the at least one outer wall; a mesh structure affixed to a surface of the at least one inner wall adjacent to the gap; a liquid within the gap; one or more seals between the at least one inner wall and the at least one outer wall, forming a gas-impermeable interior region of the thermal diode unit surrounding the gap; and a gas pressure less than atmospheric pressure within the gas-impermeable interior region.

In some embodiments, a temperature-controlled container for use within a refrigeration device comprises: one or more sections of insulation material substantially defining one or more walls of a temperature-controlled container, the temperature-controlled container including an internal region; a thermally-insulated partition dividing the internal region to form a storage region and a phase change material region internal to the container, the thermally-insulated partition including a conduit between the storage region and the phase change material region; a thermal control device within the conduit; a first aperture within a section of the insulation material substantially defining the container, the aperture between the phase change material region internal to the container and an external surface of the container; a first unidirectional thermal conductor positioned within the first aperture, the unidirectional thermal conductor configured to transmit heat in a direction from the phase change material region to the external surface of the container; a second aperture within a section of the insulation material substantially defining the container, the aperture between the storage region internal to the container and an external surface of the container; and a second unidirectional thermal conductor positioned within the second aperture, the unidirectional thermal conductor configured to transmit heat in a direction from the storage region to the external surface of the container.

In some embodiments, a temperature-control addition to a refrigeration device comprises: a thermal storage unit including a container of a size and shape to fit within a freezer section of a refrigeration device, the container including an aperture with an edge dimension larger than a cross-section of a refrigeration coil of the refrigeration device; a thermal diode unit of a size and shape to fit within a refrigeration section of the refrigeration device, the thermal diode unit including a top edge configured to be positioned adjacent to a vent aperture of the refrigeration device; and a control unit including a temperature sensor, a controller responsive to the temperature sensor, and a fan responsive to the controller.

In some embodiments, a temperature-control addition to a refrigeration device comprises: a temperature-controlled container including one or more sections of insulation material substantially defining one or more walls of the temperature-controlled container, a thermally-insulated partition dividing the internal region into at least a first storage region and a second storage region, a first conduit attached to the first storage region, a second conduit attached to a second storage region, the first conduit and the second conduit both of a size and shape to be positioned within a ventilation conduit of a refrigeration device; a first thermal diode unit of a size and shape to fit within the first storage region of the temperature-controlled container, the first thermal diode unit including a thermal transfer component in thermal contact with a top edge of the first thermal diode unit, the thermal transfer component configured to be positioned within the first conduit of the temperature-controlled container; a second thermal diode unit of a size and shape to fit within the second storage region of the temperature-controlled container, the second thermal diode unit including a thermal transfer component in thermal contact with a top edge of the second thermal diode unit, the thermal transfer component configured to be positioned within the second conduit of the temperature-controlled container; a first control unit including a temperature sensor, a controller responsive to the temperature sensor, and a fan responsive to the controller attached to the first storage region of the temperature-controlled container; and a second control unit including a temperature sensor, a controller responsive to the temperature sensor, and a fan responsive to the controller attached to the second storage region of the temperature-controlled container.

In some embodiments, a method of forming a temperature-control addition to a refrigeration device comprises: obtaining measurements of interior surfaces of a refrigeration device; forming a temperature-controlled container from one or more walls formed from insulative material, the temperature-controlled container including an exterior surface configured to reversibly mate with the interior surfaces of the refrigeration device and a thermally-sealed internal region; affixing at least one thermally-insulated partition within the thermally-sealed internal region to form at least one storage region and at least one phase change material region; positioning at least one unidirectional thermal conductor through the one or more walls so that heat is conducted from the thermally-sealed internal region to the interior surfaces of the refrigeration device when the temperature-controlled container is positioned within the refrigeration device; and sealing phase change material within the phase change material region.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
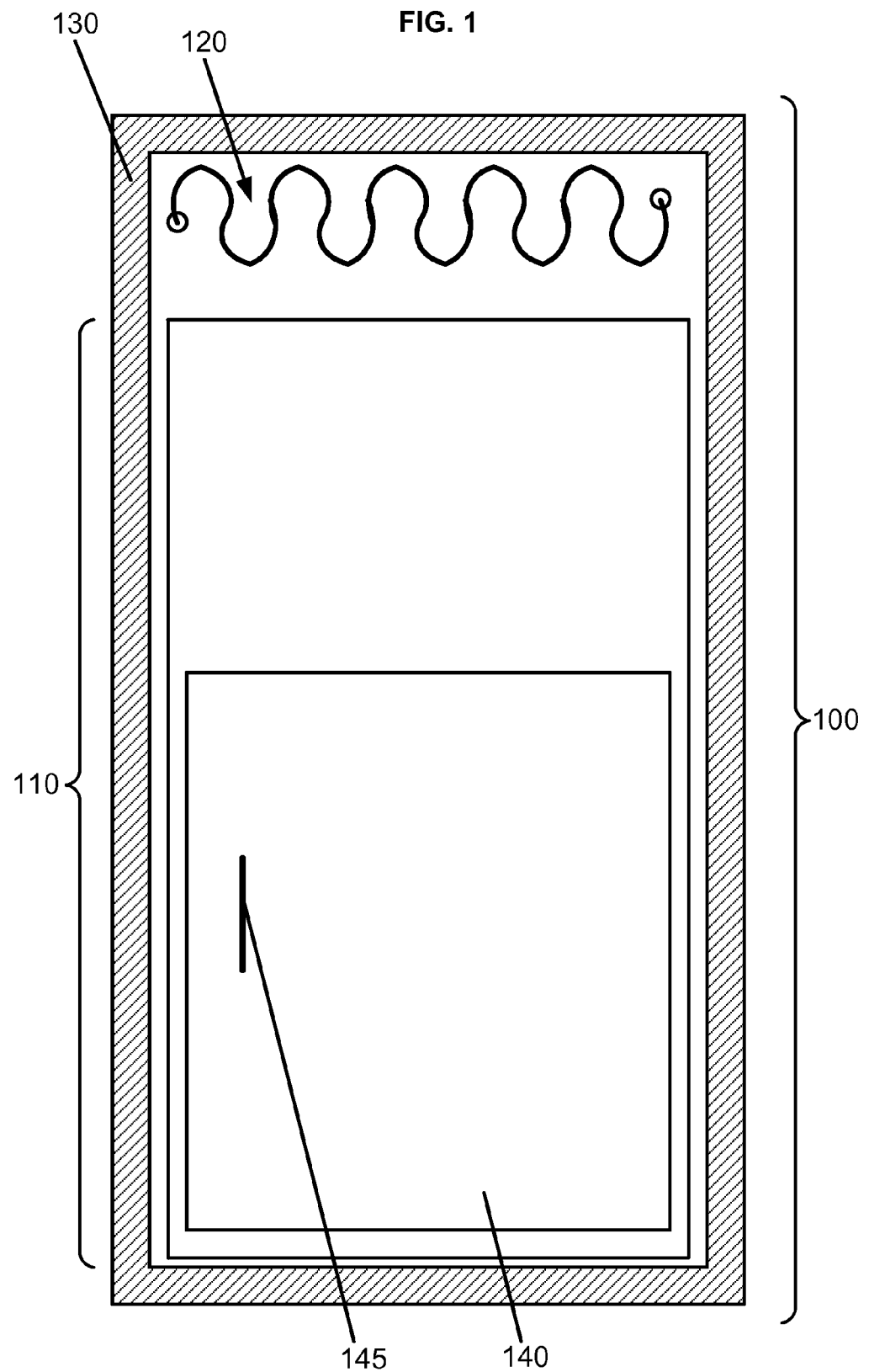
FIG. 1 is a schematic of a temperature-controlled container in use within a refrigeration device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Aspects of temperature-controlled containers for use within a refrigeration device are described herein. The temperature-controlled containers described herein are designed for use within a refrigeration device. For example, in some embodiments, temperature-controlled containers are of a size, shape and configuration for use within a domestic refrigerator device. For example, in some embodiments, temperature-controlled containers are of a size, shape and configuration for use within a domestic refrigerator appliance. For example, in some embodiments, temperature-controlled containers are of a size, shape and configuration for use within a commercial refrigerator device. For example, in some embodiments, temperature-controlled containers are of a size, shape and configuration for use within a medical refrigerator device.

The temperature-controlled containers described herein are configured to provide ongoing temperature control to at least one storage region within the container while the temperature-controlled container is within the refrigeration device. The temperature-controlled containers described herein are designed to provide ongoing temperature control to at least one storage region within the container even in times when the refrigeration device is not operating, for example during power outages. In particular, it is envisioned that the temperature-controlled containers described herein will be useful in locations with intermittent or variable power supply to refrigeration devices. For example, in some embodiments, temperature-controlled containers can be configured to maintain the internal storage regions within a predetermined temperature range indefinitely while the refrigeration device has access to electrical power approximately 10% of the time on average. For example, in some embodiments, temperature-controlled containers can be configured to maintain the internal storage regions within a predetermined temperature range indefinitely while the refrigeration device has access to electrical power approximately 5% of the time on average. For example, in some embodiments, temperature-controlled containers can be configured to maintain the internal storage regions within a predetermined temperature range indefinitely while the refrigeration device has access to electrical power approximately 1% of the time on average. For example, in some embodiments, temperature-controlled containers can be configured to maintain the internal storage regions within a predetermined temperature range for at least 30 hours. For example, in some embodiments, temperature-controlled containers can be configured to maintain the internal storage regions within a predetermined temperature range for at least 50 hours. For example, in some embodiments, temperature-controlled containers can be configured to maintain the internal storage regions within a predetermined temperature range for at least 70 hours. For example, in some embodiments, temperature-controlled containers can be configured to maintain the internal storage regions within a predetermined temperature range for at least 90 hours. For example, in some embodiments, temperature-controlled containers can be configured to maintain the internal storage regions within a predetermined temperature range for at least 110 hours. For example, in some embodiments, temperature-controlled containers can be configured to maintain the internal storage regions within a predetermined temperature range for at least 130 hours. For example, in some embodiments, temperature-controlled containers can be configured to maintain the internal storage regions within a predetermined temperature range for at least 150 hours. For example, in some embodiments, temperature-controlled containers can be configured to maintain the internal storage regions within a predetermined temperature range for at least 170 hours.

Items that are particularly sensitive to temperature fluxuations can be stored within the storage regions of temperature-controlled containers in order to maintain the items within a predetermined temperature range for extended periods, even when power supply to the refrigeration device is interrupted. For example, in some embodiments, a temperature-controlled container within a refrigeration device that is unable to obtain power is configured to maintain the temperature of its internal storage region for an extended period of time when the ambient external temperature is between −10° C. and 43° C. For example, in some embodiments, a temperature-controlled container within a refrigeration device that is unable to obtain power is configured to maintain the temperature of its internal storage region for an extended period of time when the ambient external temperature is below −10° C.

As used herein, a "refrigeration device" refers to an electrically-powered device with an internal storage region, configured to store material at a temperature below ambient temperature for a period of time. Generally, refrigeration devices include refrigeration coils and a compressor device that are powered with electricity. In some embodiments, a refrigeration device is electrically powered from a municipal power supply. In some embodiments, a refrigeration device is electrically powered from a solar power generator. In some embodiments, a temperature-controlled container is designed for use with a refrigeration device that is a refrigerator. Refrigerators are generally powered through municipal electrical power systems. Refrigerators are generally calibrated to hold internally stored items in a predetermined temperature range above zero but less than ambient temperatures. Refrigerators can, for example, be designed to maintain internal temperatures between 1° C. and 4° C. In some embodiments, a temperature-controlled container is designed for use with a refrigeration device that is a standard freezer. Freezers are generally powered through municipal electrical power systems. Freezers are generally calibrated to hold internally stored items in a temperature range below zero but above cryogenic temperatures. Freezers can, for example, be designed to maintain internal temperatures between −23° C. and −17° C., or can, for example, be designed to maintain internal temperatures between −18° C. and −15° C. In some embodiments, a temperature-controlled container is designed for use with a refrigeration device that includes both a refrigerator compartment and a freezer compartment. For example, some refrigeration devices include a first internal region that operates at refrigerator temperature ranges and a second internal region that operates at freezer temperature ranges.

In some embodiments, a temperature-controlled container is configured to maintain the interior storage region of the temperature-controlled container within a predetermined temperature range. A "predetermined temperature range," as used herein, refers to a range of temperatures that have been predetermined to be desirable for the interior storage region of a particular embodiment of a temperature-controlled container in use. For example, in some embodiments, a temperature-controlled container is configured to maintain the interior storage region of the temperature-controlled container within a predetermined temperature range of approximately 2° C. to 8° C. For example, in some embodiments, a temperature-controlled container is configured to maintain the interior storage region of the temperature-controlled container within a predetermined temperature range of approximately 1° C. to 9° C. For example, in some embodiments, a temperature-controlled container is configured to maintain the interior storage region of the temperature-controlled container within a predetermined temperature range of approximately −15° C. to −25° C. For example, in some embodiments, a temperature-controlled container is configured to maintain the interior storage region of the temperature-controlled container within a predetermined temperature range of approximately −5° C. to −10° C. A predetermined temperature range is the stable temperature range that the interior storage region of a temperature controlled container maintains temperature within during use of the container.

For example, in some embodiments, a temperature-controlled container is configured to maintain the interior storage region of the temperature-controlled container within the predetermined temperature range for at least 50 hours when power is unavailable to the refrigeration device. For example, in some embodiments, a temperature-controlled container is configured to maintain the interior storage region of the temperature-controlled container within the predetermined temperature range for at least 100 hours when power is unavailable to the refrigeration device. For example, in some embodiments, a temperature-controlled container is configured to maintain the interior storage region of the temperature-controlled container within the predetermined temperature range for at least 150 hours when power is unavailable to the refrigeration device. For example, in some embodiments, a temperature-controlled container is configured to maintain the interior storage region of the temperature-controlled container within the predetermined temperature range for at least 200 hours when power is unavailable to the refrigeration device.

In some embodiments, a temperature-controlled container is configured to passively maintain its interior storage region within a predetermined temperature range for an extended period of time when power is unavailable to the refrigeration device. In some embodiments, a temperature-controlled container is configured to maintain its interior storage region within a predetermined temperature range for an extended period of time when electric power is unavailable to the refrigeration device and wherein no electric power is available to the temperature-controlled container. In some embodiments, a temperature-controlled container is configured to maintain its interior storage region within a predetermined temperature range for an extended period of time when electric power is unavailable to the refrigeration device and wherein minimal power is available to the temperature-controlled container. For example, in some embodiments the temperature-controlled container includes a small battery.

In some embodiments a temperature-controlled container can be readily removed from the interior of a refrigeration device, and persist with temperature control of the interior storage region of the temperature-controlled container for a duration of time outside of the refrigeration device. For example, in some embodiments a temperature-controlled container is configured to be moved from the interior of one refrigeration device to the interior of another refrigeration device. For example, in some embodiments a temperature-controlled container is configured to be removed temporarily from the interior of one refrigeration device and left at ambient room temperature for a period of time while maintaining the interior storage region of the temperature-controlled container within the predetermined temperature range. For example, in some embodiments a temperature-controlled container can be removed from a refrigeration device for cleaning or service of the refrigeration device, and the interior storage region of the temperature-controlled container maintained within a predetermined temperature range while outside of the refrigeration device.

In some embodiments a temperature-controlled container is integrated within a specific model of a refrigeration device, and not configured for direct removal from the refrigeration device without detachment of the temperature-controlled container from the interior of the refrigeration device. For example, in some embodiments, a temperature-controlled container is integrated within an internal conduit of the refrigeration device. For example, in some embodiments, a temperature-controlled container is configured to be partially positioned within a vent duct internal to the refrigeration device. For example, in some embodiments, a temperature-controlled container includes a region that surrounds one or more refrigeration coils of the refrigeration device. For example, in some embodiments, a temperature-controlled container includes electrical circuitry configured to attach to the electrical system of the refrigeration device, for example with one or more wires.

With reference now to FIG. 1, shown is an example of temperature-controlled container within a refrigeration device that may serve as a context for introducing one or more processes and/or devices described herein. FIG. 1 depicts a refrigeration device 100 that includes a single refrigeration region internal to the refrigeration device. A single door substantially opens the single refrigeration region of the refrigeration device to outside users of the device. For illustration purposes, the door is not shown in FIG. 1. The refrigeration device 100 includes a plurality of walls 130, which can be fabricated to include one or more insulation materials, such as plastic foam insulation. The refrigeration device 100 includes a set of refrigeration coils 120. For example, the refrigeration coils 120 can be evaporative refrigeration coils attached to a compressor and condenser coils attached to the rear of the refrigeration device 100.

FIG. 1 depicts a temperature-controlled container 110 within the internal storage region of the refrigeration device 100. The temperature-controlled container 110 includes a door 140 with a handle 145 configured to provide access to one or more storage regions internal to the temperature-controlled container 110. The temperature-controlled container 110 illustrated in FIG. 1 is not depicted as attached to the interior of the refrigeration device 100, and therefore can be readily removed from the interior of the refrigeration device 100 by a user.

Although the temperature-controlled containers depicted in FIG. 1 and subsequently are shown with some space around the temperature-controlled containers for illustration purposes, it is generally expected that temperature-controlled containers will fit snugly against the inner walls of a refrigeration device. For example, in some embodiments, a temperature-controlled container can be fabricated to specifically fit inside a particular model of refrigeration device, with corresponding surfaces on the exterior of the temperature-controlled container and the interior of the refrigeration device configured to reversibly mate with each other. In some embodiments, a temperature-controlled container can be fitted with extra material to minimize and space between the exterior of the temperature-controlled container and the interior of the refrigeration device. For example, in some embodiments a soft foam material can be inserted around the exterior of a temperature-controlled container, such that space between the container and the refrigeration device is filled with the soft foam material. For example, in some embodiments a temperature-controlled container can be positioned within a refrigeration device and blow foam installed around the container within the refrigeration device.

Figure 2:
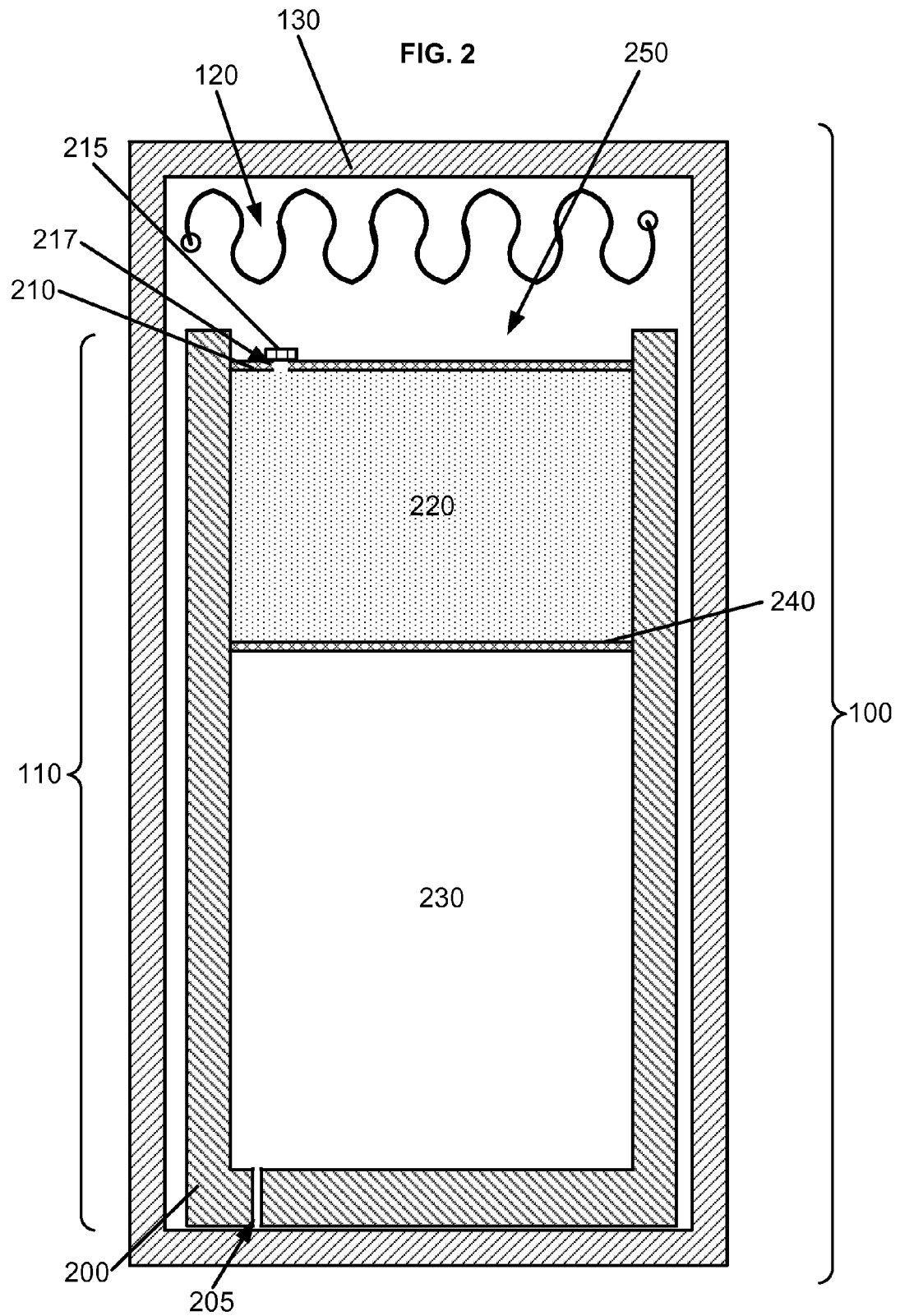
FIG. 2 is a schematic of a temperature-controlled container in use within a refrigeration device.

FIG. 2 illustrates aspects of an embodiment of a temperature-controlled container 110 within a refrigeration device 100. The refrigeration device 100 includes walls 130, and a set of refrigeration coils 120. The embodiment of a temperature-controlled container 110 illustrated in FIG. 2 is depicted to illustrate its internal structures in a substantially cross-section view. The embodiment of a temperature-controlled container 110 includes one or more sections of insulation material 200 substantially defining a temperature-controlled container 110 of a size and shape to fit within a storage region of a refrigeration device 100, the one or more sections of insulation material 200 forming an aperture 250 at one side of the temperature-controlled container 110 and a storage region 230 internal to the temperature-controlled container 110 distal to the aperture 250. The illustrated embodiment also includes two walls 210, 240 substantially forming a tank 220, the tank configured to hold phase change material internal to the temperature-controlled container 110, the two walls 210, 240 positioned within the one or more sections of insulation material 200 so that a first wall 210 of the tank is adjacent to the aperture 250 at one side of the temperature-controlled container 110 and a second wall 240 of the tank is positioned adjacent to the storage region 230. FIG. 2 also depicts an aperture 217 within the first wall 210 of the tank, the aperture configured to mate with a removable cover 215. The embodiment shown in FIG. 2 includes an aperture 205 in the lower face of the temperature-controlled container 110, the aperture 205 of a size and shape to allow condensation to leave the storage region 230 due to gravity while minimizing thermal energy transfer between the storage region 230 and a region exterior to the container.

In some embodiments, a temperature-controlled container 110 such as shown in FIG. 2 is of a size and shape to fit within a cold-storage region of a domestic refrigeration device. For example, the refrigeration device 100 can be a domestic refrigeration device. In some embodiments, a temperature-controlled container includes an aperture at one side of the container, wherein the aperture at one side of the container is positioned adjacent to a refrigeration unit when the temperature-controlled container is within a storage region of a refrigeration device. For example, the embodiment shown in FIG. 2 includes an aperture 250 positioned adjacent to refrigeration coils 120 of the refrigeration device. In some embodiments, a temperature-controlled container includes an aperture at one side of the container, wherein the aperture at one side of the container is positioned at the top edge of the temperature-controlled container when the temperature-controlled container is positioned for use. For example, FIG. 2 depicts a temperature-controlled container 110 in use within a refrigeration device 100, the container 110 including an aperture 250 positioned at the top edge of the temperature-controlled container 100. In some embodiments, a temperature-controlled container includes an aperture at one side of the container, wherein the aperture at one side of the container substantially encompasses one side of the temperature-controlled container. For example, the embodiment of a temperature-controlled container 110 shown in FIG. 2 includes an aperture 250 that substantially encompasses the top side of the container, so that the majority of the top surface of the container is the aperture 250, exposing the first wall 210 of the tank is adjacent to the aperture 250.

A temperature-controlled container includes one or more sections of insulation material. In some embodiments, the one or more sections of insulation material include one or more sections of vacuum-insulated panels. In some embodiments, the one or more sections of insulation material include one or more sections of aerogel. In some embodiments, the one or more sections of insulation material include an insulation material with an R-value of at least 5 $ft^{2.\circ}$ F.·h/Btu. In some embodiments, the one or more sections of insulation material include an insulation material with an R-value of at least 7 $ft^{2.\circ}$ F.·h/Btu. In some embodiments, the one or more sections of insulation material include an insulation material with an R-value of at least 10 $ft^{2.\circ}$ F.·h/Btu. In some embodiments, the one or more sections of insulation material include an access aperture adjacent to the storage region internal to the container; and a door configured to substantially mate with the access aperture. For example, FIGS. 1, 6, 8, 15, 17, 22, 30, 32 and 33 depict embodiments of a temperature-controlled container including at least one door configured to permit access to an adjacent storage region internal to the container. A door within a temperature-controlled container can include at least one insulation material.

In some embodiments, a temperature-controlled container includes an aperture at the lower face of the container, the aperture configured to permit condensed liquid to flow from the interior of the container. For example, FIGS. 2, 3, 4, 5, 7, 9, 10, 11, 12, 16, 18, 20, 21, 23, 24, 25, 26, 27 and 31 depict embodiments of a temperature-controlled container including at least one aperture 205 configured to permit condensed liquid to flow from the interior of the container. For example, water may condense in the interior of the storage region of a temperature-controlled container, and an aperture at a lower face of the container can be positioned to allow the condensed water to drain out of the temperature-controlled container. The aperture configured to permit condensed liquid to flow from the interior of the container can be positioned, for example, with one end at a lower location within the interior of the container, and one end external to the container. The aperture can be configured to permit minimal heat into the interior of the container, for example the aperture can be shaped as a narrow tubular structure. The aperture can be configured to permit minimal heat into the interior of the container, for example the aperture can be shaped as an elongated tubular structure.

A temperature-controlled container includes at least one storage region internal to the container. In some embodiments, at least one storage region internal to the container is positioned adjacent to the bottom of the temperature-controlled container when the temperature-controlled container is positioned for use. For example, the storage region 230 of the temperature-controlled container 110 depicted in FIG. 2 is positioned at the bottom of the container 110, with the lower face of the storage region 230 adjacent to the bottom wall of the container 110 and the upper face of the storage region 230 positioned adjacent to the second wall 240 of the tank. In some embodiments, a temperature-controlled container includes a tank wherein the tank is positioned above the storage region when the container is positioned for use.

In some embodiments, at least one storage region internal to the container is configured to store material at a temperature substantially between 2° C. and 8° C. For example, in some embodiments a temperature-controlled container is designed to maintain the storage region internal to the container at a temperature substantially between 2° C. and 8° C. while the temperature-controlled container is positioned within a powered refrigeration device as well as for a duration of time no less than 100 hours when the refrigeration device is without power. In some embodiments, at least one storage region internal to the container is configured to store material at a temperature substantially between approximately 1° C. to 9° C. In some embodiments, at least one storage region internal to the container is configured to store material at a temperature substantially between approximately −15° C. to −25° C. In some embodiments, at least one storage region internal to the container is configured to store material at a temperature substantially between approximately −5° C. to −10° C. In some embodiments, at least one storage region internal to the container is configured to store medicinal material. For example, a temperature-controlled container can include at least one storage region configured to store vaccine vials, for example with appropriately-sized shelving or partitions, at a temperature substantially between 2° C. and 8° C. In some embodiments, for example, a temperature-controlled container can include at least one storage region configured to store medicinal material such as antibiotics, antibody therapies, vaccines, chemotherapy agents, or antiviral agents. In some embodiments, for example, a temperature-controlled container can include at least one storage region configured to store medical samples, such as blood, urine, fecal samples, sputum samples, and their derivatives.

In some embodiments, at least one storage region internal to the container is sized to include a storage region with 50 liter (L) capacity. In some embodiments, at least one storage region internal to the container is sized to include a storage region with 100 liter (L) capacity. In some embodiments, at least one storage region internal to the container is sized to include a storage region with 150 liter (L) capacity. In some embodiments, at least one storage region internal to the container is sized to include a storage region with 200 liter (L) capacity.

In some embodiments, a temperature-controlled container includes two or more walls substantially forming a tank, the tank configured to hold phase change material internal to the container, the two or more walls positioned within the one or more sections of insulation material so that a first wall of the tank is adjacent to the aperture at one side of the container and a second wall of the tank is positioned adjacent to the storage region. For example, FIG. 2 depicts an embodiment of a temperature-controlled container including two walls 210, 240 substantially forming a tank 220, the tank configured to hold phase change material internal to the temperature-controlled container 110, the two walls 210, 240 positioned within the one or more sections of insulation material 200 so that a first wall 210 of the tank is adjacent to the aperture 250 at one side of the temperature-controlled container 110 and a second wall 240 of the tank is positioned adjacent to the storage region 230. In some embodiments, the two or more walls substantially forming a tank are fabricated from a thermally conductive material. In some embodiments, the two or more walls substantially forming a tank are fabricated from a material with a thermal conductivity value of at least 50 W/[m·K]. In some embodiments, the two or more walls substantially forming a tank are fabricated from a material with a thermal conductivity value of at least 100 W/[m·K]. In some embodiments, the two or more walls substantially forming a tank are fabricated from a material with a thermal conductivity value of at least 150 W/[m·K]. In some embodiments, the two or more walls substantially forming a tank are fabricated from a material with a thermal conductivity value of at least 200 W/[m·K]. In some embodiments, the two or more walls substantially forming a tank are fabricated from an aluminum material.

In some embodiments, a temperature-controlled container includes two or more walls substantially forming a tank, the tank configured to hold phase change material internal to the container, the two or more walls positioned within the one or more sections of insulation material so that a first wall of the tank is adjacent to the aperture at one side of the container and a second wall of the tank is positioned adjacent to the storage region, further including an aperture at a position adjacent to the aperture at one side of the container; and a reversible seal on the aperture. For example, the embodiment shown in FIG. 2 includes an aperture 210 within the first wall 210 of the tank, the aperture configured to mate with a removable cover 215.

In some embodiments, a temperature-controlled container includes two or more walls substantially forming a tank, the tank configured to hold phase change material internal to the container, and wherein the two or more walls substantially forming a tank are watertight. For example, some embodiments of a temperature-controlled container include a tank configured to hold a phase-change material that is a liquid within all or some of a temperature range of expected use. In some embodiments, a temperature-controlled container includes two or more walls substantially forming a tank, the tank configured to hold phase change material internal to the container, and wherein the two or more walls substantially forming a tank are gastight. For example, some embodiments of a temperature-controlled container include a tank configured to hold a phase-change material that is a gas within all or some of a temperature range of expected use. In some embodiments, a temperature-controlled container includes two or more walls substantially forming a tank, the tank configured to hold phase change material internal to the container, and wherein the two or more walls substantially forming a tank are impervious to a solid or semi-solid. For example, some embodiments of a temperature-controlled container include a tank configured to hold a phase-change material that is a solid or semi-solid form within all or some of a temperature range of expected use. In some embodiments, for example, a tank includes an internal volume of 20 L. In some embodiments, for example, a tank includes an internal volume of 30 L.

In some embodiments, a temperature-controlled container includes at least one phase-change material. A "phase-change material," as used herein, is a material with a high latent heat, which is capable of storing and releasing heat energy while changing physical phase. The selection of a phase change material for an embodiment depends on considerations including the latent heat for the material, the melting point for the material, the boiling point for the material, the volume of material required to store a predetermined amount of heat energy in an embodiment, the toxicity of the material, the cost of the material, and the flammability of the material. Depending on the embodiment, a phase-change material can be a solid, a liquid, a semi-solid or a gas during use. For example, in some embodiments a phase-change material includes water, methanol, ethanol, a sodium polyacrylate/polysaccharide material or a salt hydrate. In some embodiments, for example, a phase change material including a majority of the volume as pure water/ice is preferred due to the physical property of pure water/ice having a melting point of 0° C. In some embodiments, for example, a phase change material including a majority of the volume as salt water/salt ice is preferred as the melting point of salt ice can be calibrated to below 0° C. based on the salt molarity and content within the salt water/salt ice. In some embodiments, for example, a phase change material is configured to freeze at below −20° C. In some embodiments, for example, a phase change material is configured to freeze at a point between 1° C. and 3° C.

Figure 3:
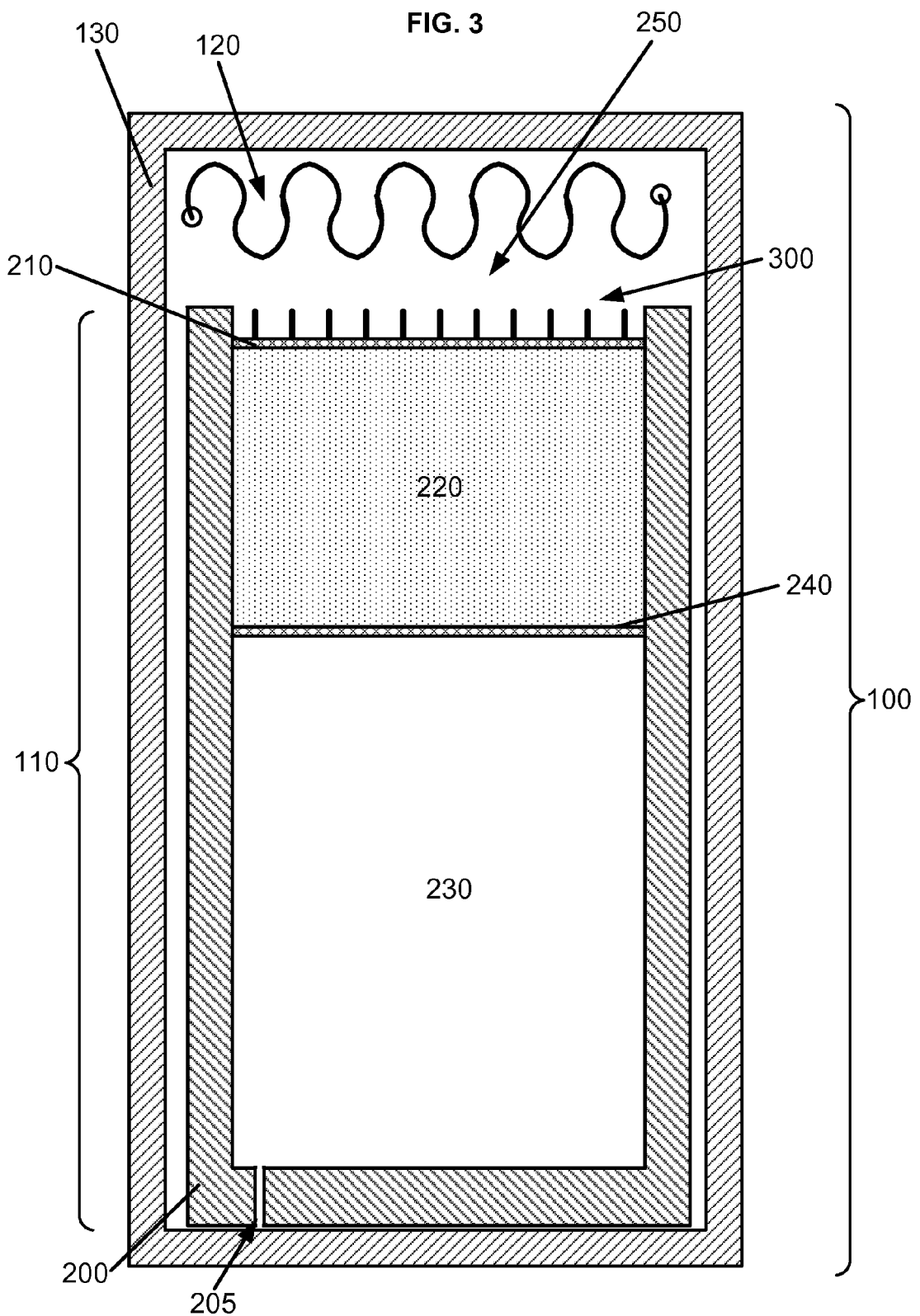
FIG. 3 is a schematic of a temperature-controlled container in use within a refrigeration device.

FIG. 3 illustrates aspects of an embodiment of a temperature-controlled container 110 in use within a refrigeration device 100. The embodiment of a temperature-controlled container 110 illustrated in FIG. 3 is depicted to illustrate its internal structures in a substantially cross-section view. The refrigeration device 100 includes a plurality of walls 130 and at least one set of refrigeration coils 120. A door to the refrigeration device is not shown for purposes of illustration. The refrigeration device 100 shown in FIG. 3 includes a single internal storage region. The temperature-controlled container 110 includes one or more sections of insulation material 200 substantially defining the dimensions of the temperature-controlled container. The one or more sections of insulation material 200 include an aperture 250 at one side of the temperature-controlled container 110, the aperture 250 at a face of the temperature-controlled container 100 adjacent to the refrigeration coils 120. The temperature-controlled container 110 includes a storage region 230 internal to the temperature-controlled container 110 distal to the aperture 250. An aperture 205 is positioned at the lower face of the temperature-controlled container 110, the aperture configured to allow liquid to flow from the interior of the storage region 230 to a point exterior to the container with minimal heat transfer into the storage region 230.

The embodiment illustrated in FIG. 3 also includes two walls 210, 240 substantially forming a tank 220, the tank configured to hold phase change material internal to the temperature-controlled container 110, the two walls 210, 240 positioned within the one or more sections of insulation material 200 so that a first wall 210 of the tank 220 is adjacent to the aperture 250 at one side of the temperature-controlled container 110 and a second wall 240 of the tank is positioned adjacent to the storage region 230. In the embodiment illustrated in FIG. 3, the first wall 210 of the tank 220 includes a thermal transfer component 300. The thermal transfer component 300 is configured and positioned to encourage thermal transfer from the first wall 210 into the interior region of the refrigeration device 100. In the embodiment illustrated in FIG. 3, for example, the first wall 210 of the tank 220 includes a thermal transfer component 300 that is a set of fins. Fins can be fabricated from a thermally-conductive material and affixed to the first wall 210 of the tank 220. For example, Fins can be fabricated from aluminum or copper materials. In some embodiments, a refrigeration device includes a fan, and the thermal transfer component is positioned adjacent to the fan. Increasing surface area of a thermal transfer component increases the potential for convection from the thermal transfer component.

Figure 4:
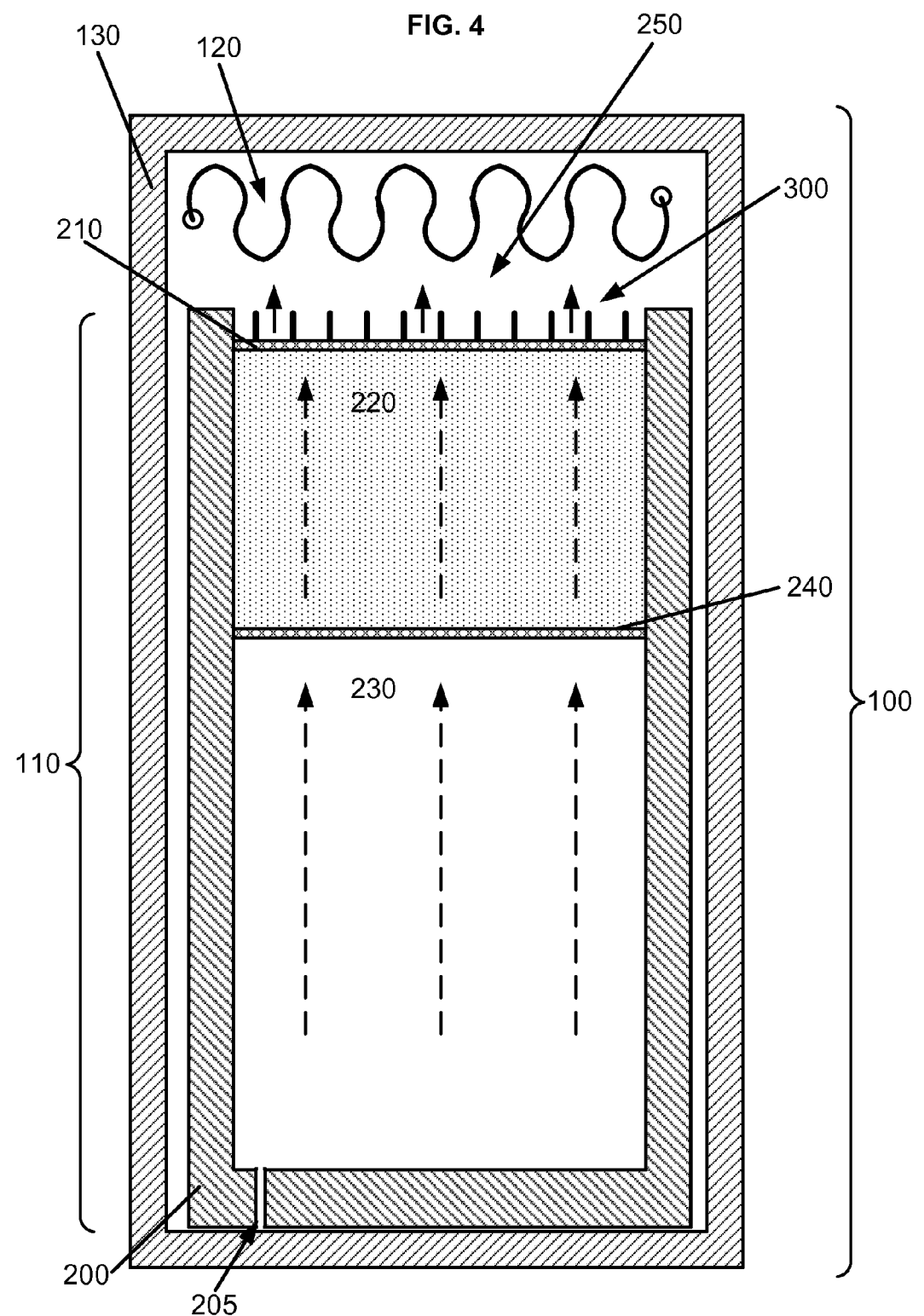
FIG. 4 is a schematic of a temperature-controlled container in use within a refrigeration device illustrating heat transfer within the device.

FIG. 4 illustrates aspects of the thermal properties of an embodiment of a temperature-controlled container 110 during use. The embodiment of a temperature-controlled container 110 illustrated in FIG. 4 is depicted to illustrate its internal structures in a substantially cross-section view. The temperature-controlled container 110 is within an internal region of a refrigeration device 100. The refrigeration device 100 is fabricated from walls 130 that surround the temperature-controlled container 110 during use. The temperature-controlled container 110 includes a plurality of sections of insulation material 200 substantially forming walls around the container sides and bottom. The sections of insulation material 200 substantially forming the temperature-controlled container 110 include an aperture 250 corresponding to the top face of the temperature-controlled container 110. The sections of insulation material 200 include an aperture 205 at the bottom of the container, configured to allow liquid to flow downward while minimizing thermal transfer into the container.

The temperature-controlled container 110 shown in FIG. 4 includes two walls 210, 240 substantially forming a tank 220, the tank configured to hold phase change material internal to the temperature-controlled container 110, the two walls 210, 240 positioned within the one or more sections of insulation material 200 so that a first wall 210 of the tank 220 is adjacent to the aperture 250 at one side of the temperature-controlled container 110 and a second wall 240 of the tank 220 is positioned adjacent to a storage region 230 internal to the temperature-controlled container 110. The tank 220 includes phase-change material. A thermal transfer component 300 that is a set of fins is attached to the first wall 210 of the tank 220, at a position adjacent to the refrigeration coils 120 of the refrigeration device 100.

During time periods when the refrigeration coils 120 of the refrigeration device are operating, thermal energy or heat will rise through the temperature-controlled container 110 and be removed from the refrigeration device 100 through operation of the standard mechanism, including the refrigeration coils 120, of the refrigeration device 100. Thermal energy is depicted in FIG. 4 as a series of dotted arrows pointing upwards, consistent with properties of thermal transfer along a temperature gradient between the storage region and the phase change material region, along to the refrigeration coils of the refrigeration device and the ambient temperature external to the refrigeration device. Thermal energy will move through the temperature-controlled container 110, including through the storage region 230, the tank 220, and upwards through the first wall 210 of the tank 220 in accord with the thermal gradient present at any given time in those structures. Thermal transfer from the first wall 210 to an adjacent region within the refrigeration device 100 is enhanced through the set of fins affixed to the first wall 210. Over time, the removal of thermal energy or heat from the temperature-controlled container 110 will result in cooling of the storage region 230 and the phase change material within the tank 220 as well as associated structures of the temperature-controlled container 110. This cooling will be limited by the amount of thermal energy removed from the temperature-controlled container 110 by operation of the refrigeration coils 120 of the refrigeration device 100. In a standard refrigerator, for example, the refrigeration coils will be operational to cool the interior of the refrigerator to a temperature between 1° C. and 4° C. The structures of the temperature-controlled container 110 will, correspondingly, be cooled to between 1° C. and 4° C. over time within the refrigerator. At a subsequent time when the refrigerator stops operating, for example due to an electrical power outage, the storage region 230 within the temperature-controlled container 110 will maintain its interior in the predetermined temperature range between 1° C. and 4° C. for a longer time period than the internal region within the refrigerator. The insulation material 200 of the temperature-controlled container 110, for example, will assist in reducing the thermal leak between the region outside of the temperature-controlled container 110 and the storage region 230 internal to the temperature-controlled container 110. In addition, thermal energy, or heat, will naturally move along the thermal gradient created during operation of the refrigeration device, from the storage region 230 into the tank 220 holding the phase change material. The phase change material, due to its inherent physical properties, will be able to absorb thermal energy or heat at the appropriate temperature range for the specific embodiment to maintain the temperature within the predetermined temperature range within the storage region 230 of the temperature-controlled container 110.

Figure 5:
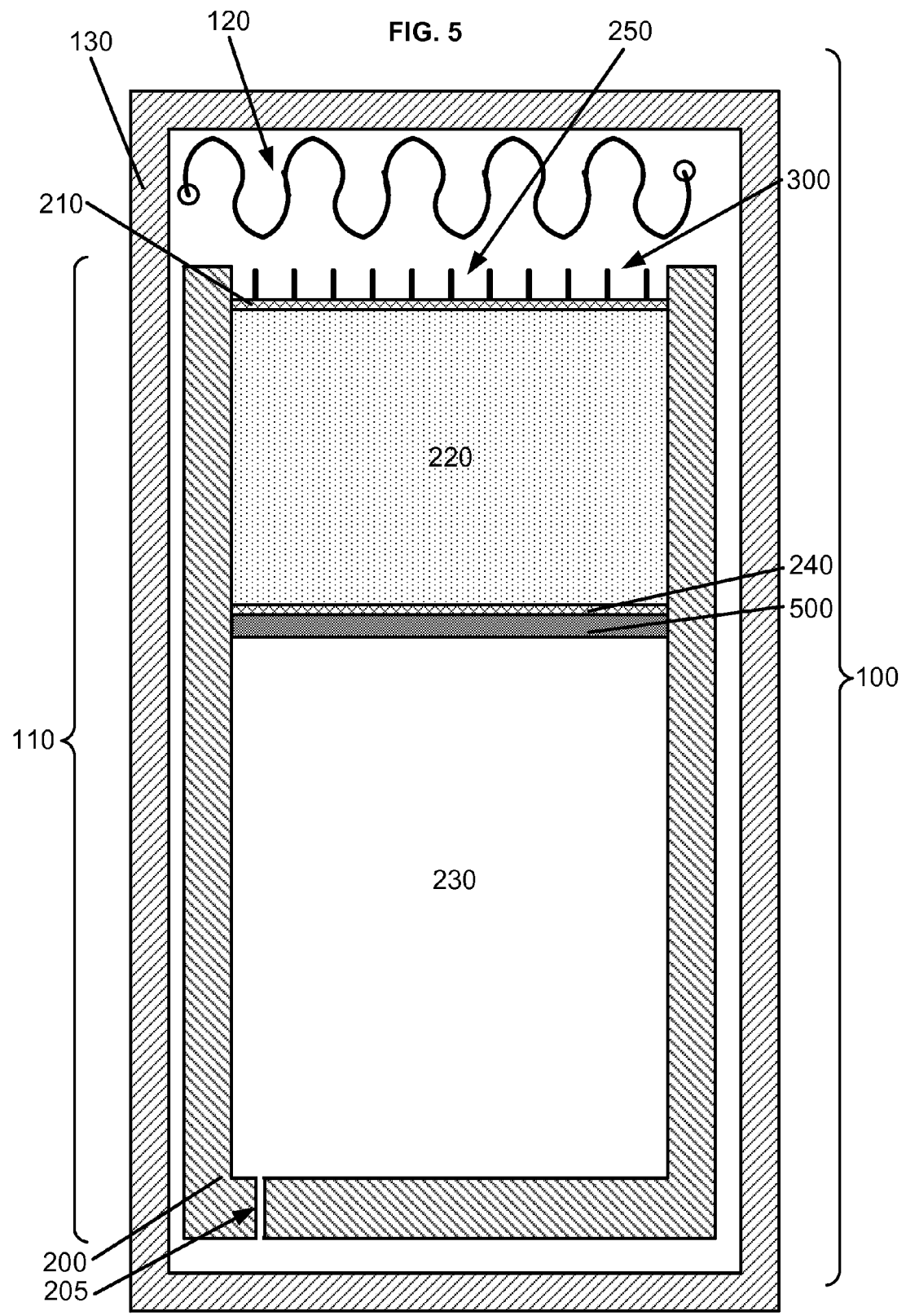
FIG. 5 is a schematic of a temperature-controlled container in use within a refrigeration device.

FIG. 5 depicts aspects of an embodiment of a temperature-controlled container 110. The embodiment of a temperature-controlled container 110 illustrated in FIG. 5 is depicted to illustrate its internal structures in a substantially cross-section view. FIG. 5 depicts a temperature-controlled container 110 within a refrigeration device 100. The refrigeration device 100 includes walls 130; a door is not shown for purposes of illustration. Internal to the refrigeration device 100 is a temperature-controlled container 110. The temperature-controlled container 110 includes insulation 200 forming the basic structure of walls and a bottom of the container. The temperature-controlled container 110 includes an aperture 250 at the top face of the temperature-controlled container 110, the aperture 250 substantially corresponding to the top face of the temperature-controlled container 110. The temperature-controlled container 110 is positioned within the refrigeration device 100 so that the aperture 250 is positioned adjacent to the refrigeration coils 120 of the refrigeration device 100. The temperature-controlled container 110 includes a small aperture 205 in the bottom of the temperature-controlled container 110, the aperture 250 configured to permit condensed liquid to flow away from the storage region 230 while minimizing thermal leak into the storage region 230.

As illustrated in FIG. 5, the temperature-controlled container 110 includes two walls 210, 240 substantially forming a tank 220, the tank 220 configured to hold phase change material internal to the temperature-controlled container 110, the two walls 210, 240 positioned within the one or more sections of insulation material 200 so that a first wall 210 of the tank 220 is adjacent to the aperture 250 at one side of the temperature-controlled container 110 and a second wall 240 of the tank 220 is positioned at the opposing face of the tank 220. The tank 220 includes phase-change material. A thermal transfer component 300 including a set of fins is attached to the first wall 210 of the tank 220, at a position adjacent to the refrigeration coils 120 of the refrigeration device 100.

In some embodiments, a temperature-controlled container 110 includes a phase change material compartment configured to contain a second phase change material. The phase change material compartment is positioned adjacent to, and in thermal contact with, the tank or container holding the first phase change material. For example, the temperature-controlled container 110 shown in FIG. 5 also includes a phase change material compartment 500 configured to hold a second phase change material. The phase change material compartment 500 is positioned adjacent to the face of the second wall 240 of the tank 220 and positioned between the face of the second wall 240 and the storage region 230. The phase change material compartment 500 includes a second phase change material with thermal properties distinct from the phase change material within the tank 220. The combination of the positioning and selection of the second phase change material in the phase change material compartment 500 and the phase change material in the tank 220 absorb thermal energy, or heat, from the storage region 230 more efficiently than a single compartment holding a single phase change material. Some embodiments include a tank 220 including a first phase change material with a freezing point below 0° C. and a phase change material compartment 500 holding a second phase change material with a freezing point above that of 0° C. For example, in some embodiments a tank includes a first phase change material that is water/ice and the phase change material compartment includes a second phase change material that is a sodium polyacrylate/polysaccharide material with a freezing point above 0° C.

Figure 6:
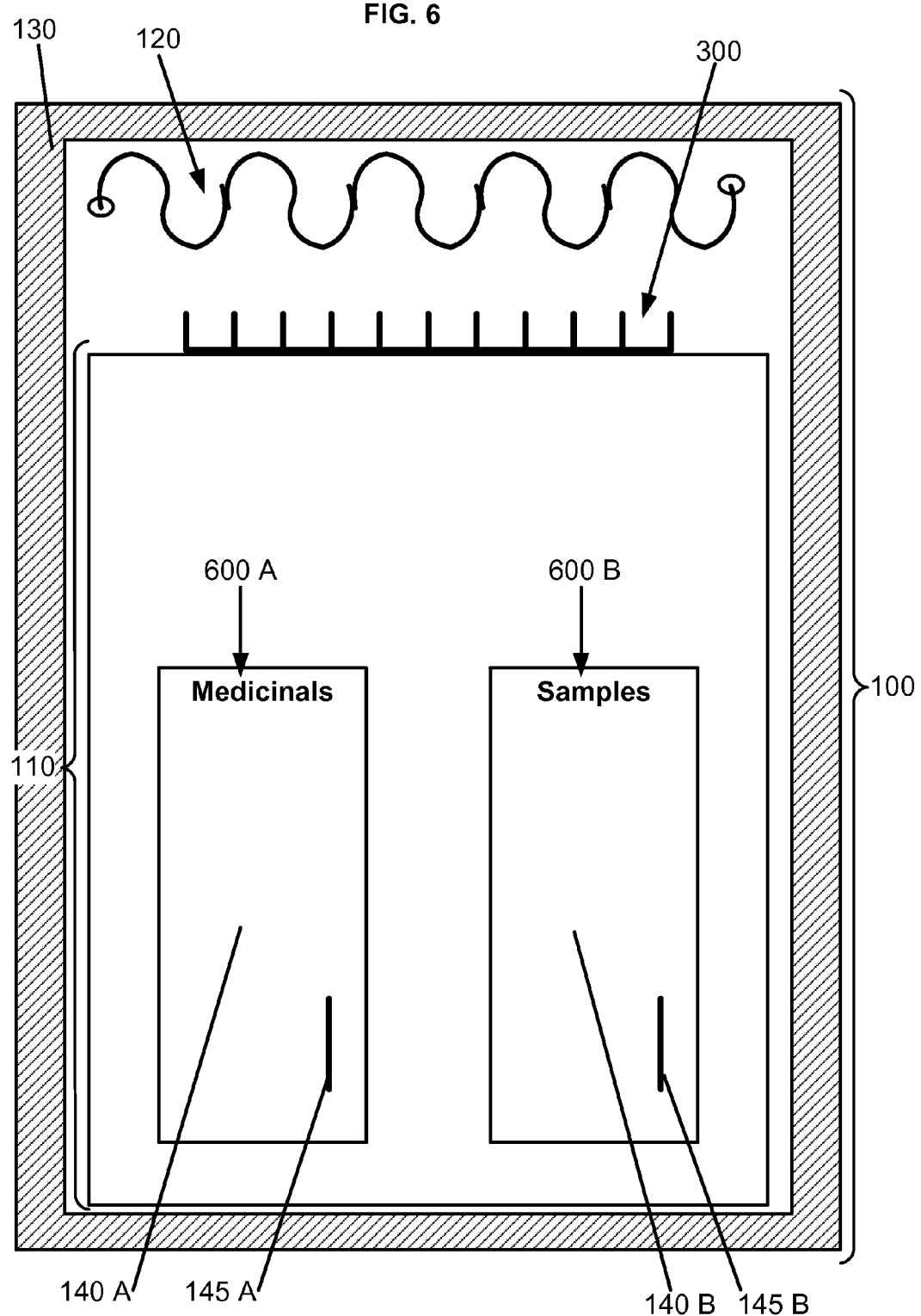
FIG. 6 is a schematic of a temperature-controlled container in use within a refrigeration device.

FIG. 6 illustrates aspects of a temperature-controlled container 110 within a refrigeration device 100. The refrigeration device 100 includes walls 130 surrounding the temperature-controlled container 110. For purposes of illustration, the refrigeration device 100 is shown without a door. The temperature-controlled container 110 includes a thermal transfer component 300 that is a set of fins on the top of the container at a position adjacent to the refrigeration coils 120 of the refrigeration device 100. The temperature-controlled container 110 includes two doors 140 A, 140 B, each of which open into a storage region within the container. Each door, for example, can include insulation. Each door, for example, can be of a size and shape to permit access while minimizing thermal energy transfer between the region exterior to the container and a storage region accessed by the door. Each door, for example, can be configured to minimize thermal energy transfer between the region exterior to the container and a storage region accessed by the door. For example, each door may fit snugly against the surrounding region of the container, and can be surrounded by a gasket or similar structure. Each of the doors 140 A, 140 B has a handle 145 A, 145 B to provide ease of access for a user of the container. Each door 140 A, 140 B can include a visual identifier 600 A, 600 B, such as text. For example, a door configured to permit access to an interior region of a size, temperature and storage condition configured for vaccines or therapeutics can be labeled "medicinals." For example, a door configured to permit access to an interior region of a size, temperature and storage condition configured to store medical samples such as blood, saliva, urine, feces or tissue can be labeled "samples."

Figure 7:
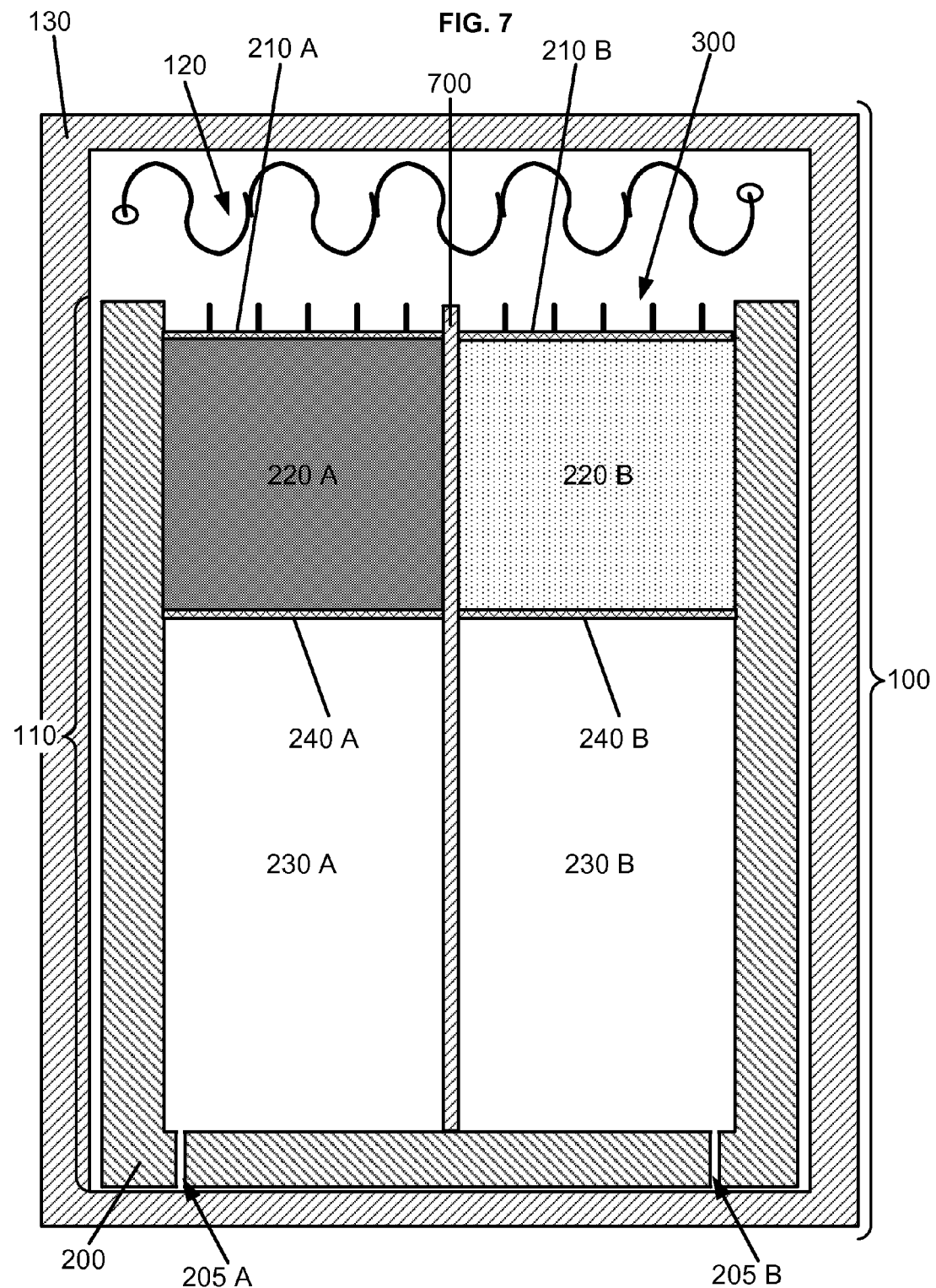
FIG. 7 is a schematic of a temperature-controlled container in use within a refrigeration device.

FIG. 7 illustrates an embodiment of a temperature-controlled container including a plurality of storage regions within the container, each of the storage regions having an associated tank including a phase change material. The associated tanks can include different phase change materials, and be configured to provide different predetermined temperature ranges to each of the associated storage regions. The temperature-controlled container 110 shown in FIG. 7 is within a refrigeration device 100, with the walls 130 of the refrigeration device 100 surrounding the temperature controlled container 110. The embodiment of a temperature-controlled container 110 illustrated in FIG. 7 is depicted to illustrate its internal structures in a substantially cross-section view. The embodiment of a temperature-controlled container 110 includes one or more sections of insulation material 200 substantially defining a temperature-controlled container 110 of a size and shape to fit within a storage region of a refrigeration device 100, the one or more sections of insulation material 200 forming an aperture 250 at one side of the temperature-controlled container 110. A divider 700 further separates the region internal to the one or more sections of insulation material into two internal regions. The one or more sections of insulation material 200 and the divider 700 in combination with the walls 240 A, 240 B substantially define two storage regions 230 A, 230 B internal to the temperature-controlled container 110 distal to the aperture 250. The illustrated embodiment also includes two first walls 210 A, 210 B, and two second walls 240 A, 240 B. The combination of one or more sections of insulation material 200 and the divider 700 as well as the two first walls 210 A, 210 B, and two second walls 240 A, 240 B substantially form two tanks 220 A, 220 B. Each of the tanks is configured to hold phase change material internal to the temperature-controlled container 110. A thermal transfer component 300 that is a set of fins is attached to the upper face of the first walls 210 A, 210 B of the tanks 220 A, 220 B.

In some embodiments, a temperature-controlled container includes a plurality of distinct internal storage regions. Some embodiments of a temperature-controlled container, for example, include two distinct storage regions. Some embodiments of a temperature-controlled container, for example, include three distinct storage regions. Some embodiments of a temperature-controlled container, for example, include four distinct storage regions. Each of the internal storage regions can be made distinct from the others, with insulation, configurations and associated structures to maintain an internal temperature within a different predetermined temperature range for each distinct internal storage region. For example, a temperature controlled container can include two interior storage regions, one configured to maintain an internal predetermined temperature range between 2° C. and 8° C., and another configured to maintain an internal predetermined temperature range between −15° C. and −25° C. For example, a temperature controlled container can include three interior storage regions, a first storage region configured to maintain an internal predetermined temperature range between 2° C. and 8° C., a second storage region configured to maintain an predetermined temperature range between −5° C. and −15° C., and a third storage region configured to maintain an internal predetermined temperature range between −15° C. and −25° C.

Some embodiments include a storage region configured with a predetermined temperature range in the freezing range of water, or below 0° C. Embodiments including a storage region configured with a predetermined temperature range in the freezing range of water can be configured for freezing of ice packs. For example, some embodiments include a storage region of a size, shape and predetermined temperature range appropriate to freeze WHO-standard ice packs as expected for medical use. For example, some embodiments include a storage region of a size, shape and predetermined temperature range appropriate to freeze ice blocks, trays or cubes that can then be removed for use outside of the temperature-controlled container. For example, ice blocks or cubes can be removed for medical uses.

The embodiment illustrated in FIG. 7 includes two storage regions 230 A, 230 B internal to the temperature-controlled container 110, each of the two storage regions 230 A, 230 B positioned adjacent to the bottom face of the container. The storage regions 230 A, 230 B are physically and thermally separated within the container by the divider 700. For example, a divider 700 can include a substantially planar section of insulation that is attached at least three edges to the interior surface of the one or more sections of insulation material 200, creating a thermal seal within the interior of the temperature-controlled container 110. Each of the storage regions 230 A, 230 B is bounded at the upper face by the second walls 240 A, 240 B of the adjacent tanks 220 A, 220 B. Each of the storage regions 230 A, 230 B has an associated tank 220 A, 220 B positioned directly above the storage region 230 A, 230 B. In some embodiments, each of the tanks 220 A, 220 B can include a different phase change material, resulting in different thermal properties of the adjacent storage region 230 A, 230 B. In some embodiments, each of the tanks 220 A, 220 B can include the same phase change material, resulting in similar thermal properties of the adjacent storage regions 230 A, 230 B. The embodiment shown in FIG. 7 includes two apertures 205 A, 205 B in the lower face of the temperature-controlled container 110, the each of the two apertures 205 A, 205 B of a size and shape to allow condensation to leave the s adjacent storage region 230 A, 230 B due to gravity while minimizing thermal energy transfer between the storage region 230 A, 230 B and a region exterior to the container.

Figure 8:
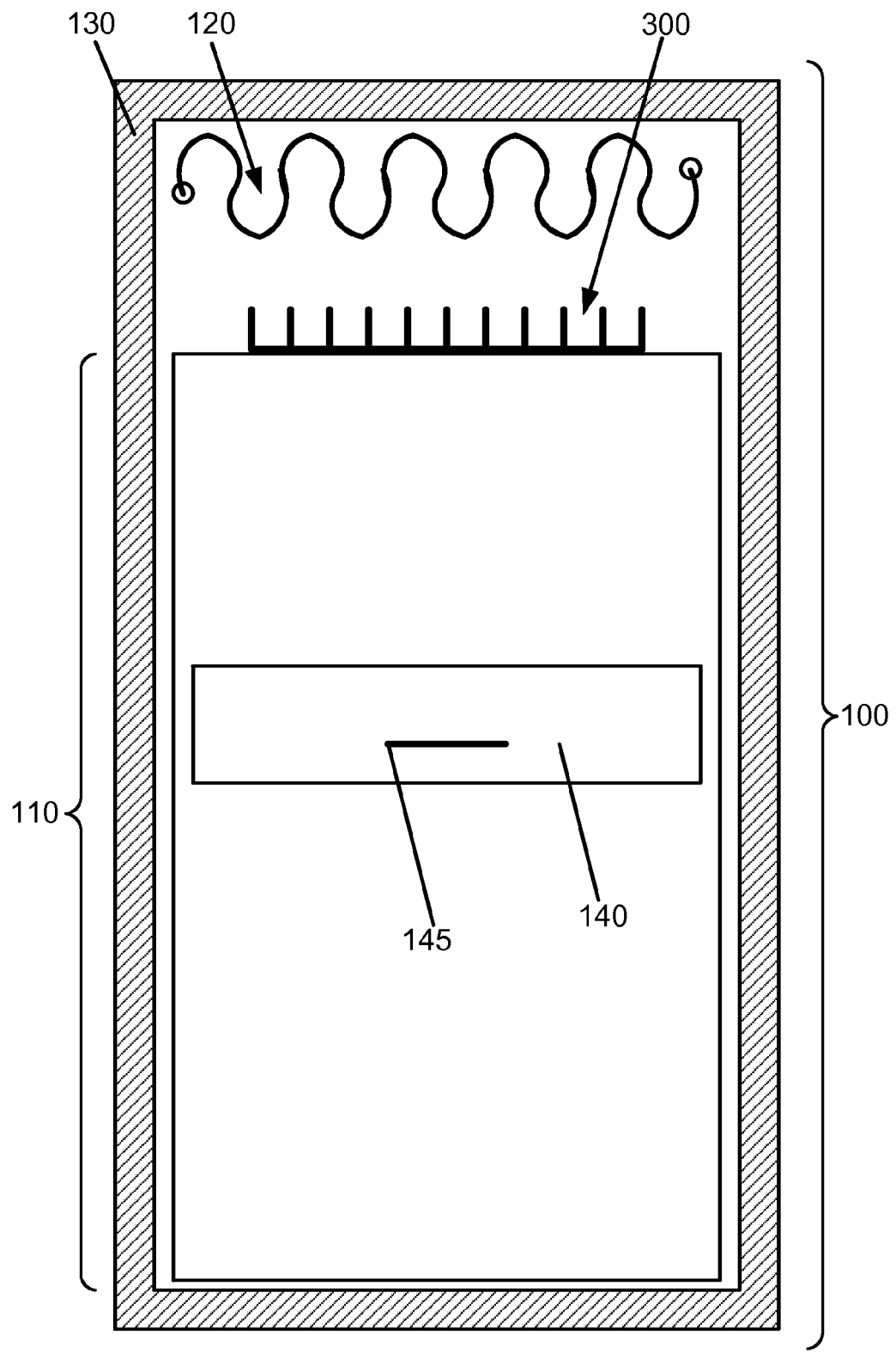
FIG. 8 is a schematic of a temperature-controlled container in use within a refrigeration device.

FIG. 8 depicts aspects of a temperature-controlled container 110 within a refrigeration device 100. The refrigeration device 100 includes walls 130 surrounding the temperature-controlled container 110. For purposes of illustration, the refrigeration device 100 is shown without a door. The temperature-controlled container 110 includes a thermal transfer component 300 that is a set of fins on the top of the container at a position adjacent to the refrigeration coils 120 of the refrigeration device 100. The temperature-controlled container 110 includes a single door 140 with a handle 145 positioned to assist a user to open the door 140 and access the interior storage region of the container.

Figure 9:
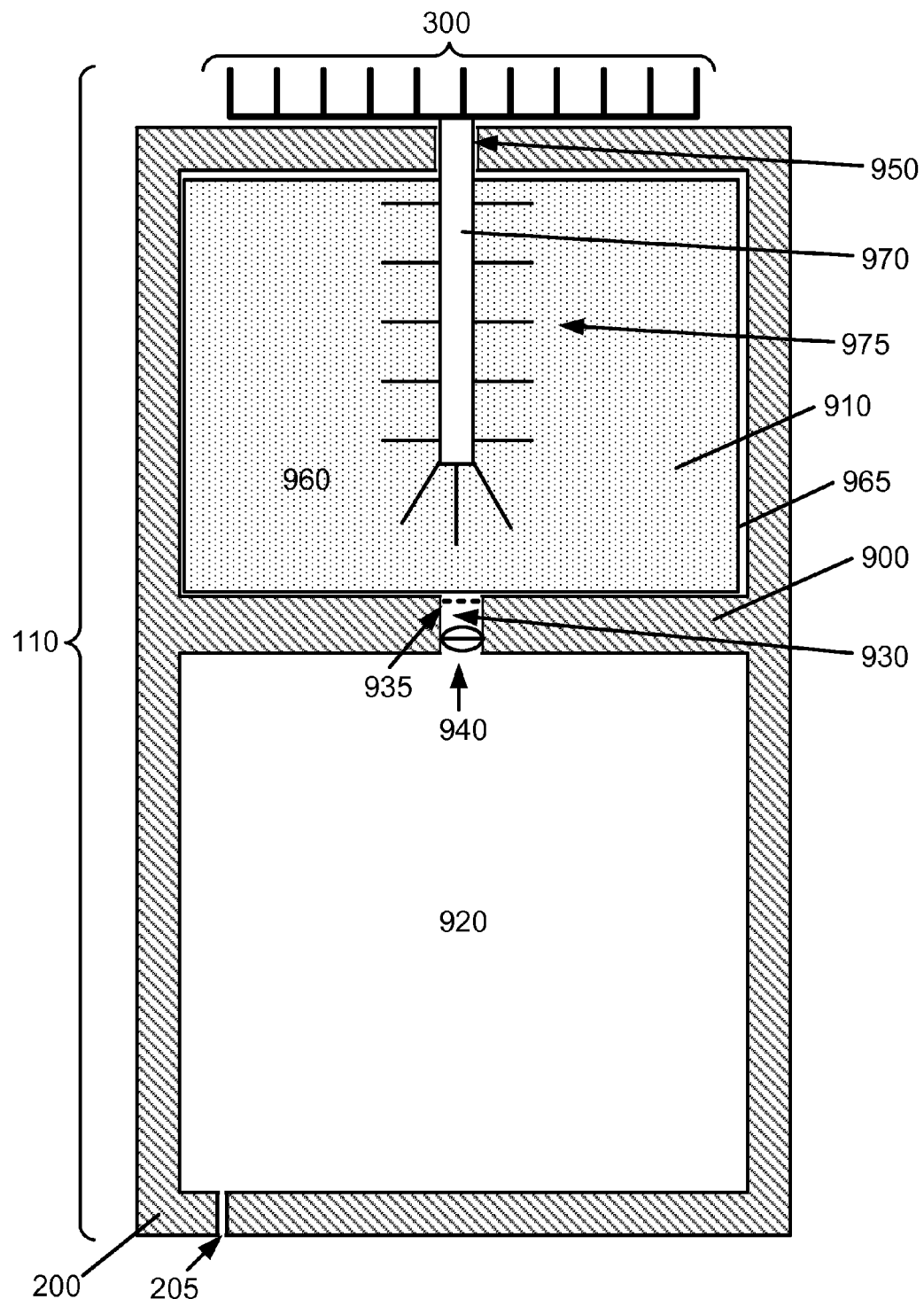
FIG. 9 is a schematic of a temperature-controlled container.

FIG. 9 depicts an embodiment of a temperature-controlled container 110 for use within a refrigeration device. For example, the temperature-controlled container 110 can be used within a refrigeration device in a manner as illustrated in FIG. 8. In some embodiments, a temperature-controlled container is of a size and shape to fit within a cold-storage region of a domestic refrigeration device. In some embodiments, a temperature-controlled container includes an external surface configured to be positioned adjacent to one or more walls of a refrigeration region within a refrigeration device. In some embodiments, a temperature-controlled container includes one or more external surfaces configured to reversibly mate with one or more internal surfaces of the refrigeration device. The temperature-controlled container 110 shown in FIG. 9 is depicted without a refrigeration device, although it is configured to fit and operate within an interior of a refrigeration device. The embodiment of a temperature-controlled container 110 illustrated in FIG. 9 is depicted to illustrate its internal structures in a substantially cross-section view.

As shown in FIG. 9, the temperature-controlled container 110 includes one or more sections of insulation material substantially defining one or more walls 200 of the temperature-controlled container 110. In some embodiments, the walls of the temperature-controlled container include a structural material attached to the one or more sections of insulation material. In some embodiments, the walls of the temperature-controlled container are of a size and shape to fit within a storage region of the refrigeration device. In some embodiments, the walls of the temperature-controlled container include a radiative surface configured to be positioned adjacent to a set of refrigeration coils. As shown in FIG. 9, the walls 200 of the temperature-controlled container 110 form a substantially upright rectangular structure, with exterior dimensions of a size and shape to fit within an internal storage region of a refrigeration device. In the embodiment illustrated in FIG. 9, the walls 200 of the temperature-controlled container 110 form a rectangular structure wherein the horizontal width is less than the vertical length of the container when it is positioned for use. In some embodiments, the walls of a temperature-controlled container form a structure wherein the horizontal width is greater than the vertical length of the container when it is positioned for use. In some embodiments, the walls of a temperature-controlled container form a shape that is not rectangular, such as a cylinder, an oblong sphere or egg-shaped structure.

As illustrated in FIG. 9, the temperature-controlled container 110 includes an internal region. The temperature-controlled container 110 includes a thermally-insulated partition 900 dividing the internal region to form a storage region 920 and a phase change material region 910 internal to the container 110, the thermally-insulated partition 900 including a conduit 930 between the storage region 920 and the phase change material region 910. In some embodiments, a thermally-insulated partition includes one or more sections of insulation material. In some embodiments, a thermally-insulated partition is fabricated from the same type of insulation material as the one or more walls defining the temperature-controlled container. In some embodiments, a thermally-insulated partition is fabricated from a type of insulation material distinct from the insulation material of the walls of the container. In some embodiments, a thermally-insulated partition is configured so that the phase change material region is positioned adjacent to at least one external surface of the temperature-controlled container, the at least one external surface configured to be positioned adjacent to the refrigeration region.

Some embodiments of a temperature-controlled container include: an access aperture adjacent to the storage region internal to the container; and a door configured to substantially mate with the access aperture. For example, some embodiments include: an aperture in at least one of the one or more sections of insulation material substantially defining one or more walls of a temperature-controlled container; and a door fabricated from an insulation material, the door configured to substantially mate with the access aperture. For example, a door can include an edge of a size and shape to reversibly mate with the surface of the access aperture. A door is shaped and positioned for a user to access the contents of at least one storage region within the temperature-controlled container. For example, a user can retrieve, remove, add or position material within the storage region through use of the door. A door is shaped, fabricated and positioned to minimize thermal transfer from the storage region to a region external to the temperature-controlled container. In some embodiments, a door includes at least one insulation material.

In some embodiments, there is a liner 965 or secondary container within the phase change material region 910, the liner 965 or secondary container positioned to contain the phase change material 960. A liner 965 can, in some embodiments, include a thin plastic pouch within the phase change material region 910, the liner fabricated from plastic material of sufficient strength and durability to contain the phase change material 960 used in the embodiment. A liner or secondary container can, in some embodiments, include sufficient internal space for a change in volume of the phase change material during freeze/thaw cycles. A secondary container positioned to contain the phase change material can, in some embodiments, include a thermally-conductive metal container of a size and shape to fit within the phase change material region. For example, in some embodiments a secondary container positioned to contain the phase change material can include a liquid-tight aluminum container the outer surfaces of the container sized and shaped to reversibly mate with the internal surfaces of the walls of the phase change material region. For example, in some embodiments a secondary container positioned to contain the phase change material can include a liquid-tight copper container, the outer surfaces of the container sized and shaped to reversibly mate with the internal surfaces of the walls of the phase change material region. For example, in some embodiments a secondary container positioned to contain the phase change material region can include a liquid-tight container fabricated from a thermally-conductive plastic, the outer surfaces of the container sized and shaped to reversibly mate with the internal surfaces of the walls of the phase change material region. A secondary container positioned to contain the phase change material can, in some embodiments, include a container of a size and shape to fit within the phase change material region fabricated from a thermally non-conductive material. For example, in some embodiments a secondary container positioned to contain the phase change material can include a liquid-tight container fabricated from a thermally non-conductive plastic. In some embodiments a secondary container or liner positioned to contain the phase change material can include a gas-tight container.

In the embodiment illustrated, there is a thermally-conductive divider 935 positioned within the conduit 930. The thermally-conductive divider 935 is configured and positioned to encourage thermal energy transfer between phase change material located within the phase change material region 910 and the conduit 930, while minimizing the possibility of leakage of the phase change material into the conduit 930. For example, a thermally-conductive divider 935 can include a planar structure fabricated from a thermally-conductive metal, such as aluminum or copper. For example, a thermally-conductive divider 935 can include a mesh-like structure fabricated from a thermally-conductive metal, such as aluminum or copper. For example, a thermally-conductive divider 935 can include a mesh-like structure fabricated from a thermally-conductive plastic, such as stretched polytetrafluoroethylene (PTFE). Some embodiments do not include a divider positioned within the conduit.

The temperature-controlled container 110 shown in FIG. 9 includes a thermal control device 940 within the conduit 930. The thermal control device 940 is positioned to reversibly permit and inhibit thermal transfer between the storage region 920 and the phase change material region 910 through the conduit 930 dependent on the temperature.

Some embodiments include a thermal control device that is a passive thermal control device. For example, a thermal control device that is a passive thermal control device can include a bimetallic element configured to reversibly move over the horizontal diameter of the conduit 930 in response to temperature changes within the conduit 930. A passive thermal control device including a bimetallic element can be configured to reversibly move across the diameter of the conduit, blocking thermal transfer between a storage region and a phase change material region of a temperature-controlled container, in response to the internal temperature within the conduit. A passive thermal control device including a bimetallic element can be configured to reversibly move across the diameter of the conduit, blocking thermal transfer between a storage region and a phase change material region of a temperature-controlled container, in response to the internal temperature within the storage region. A passive thermal control device including a bimetallic element can be configured to reversibly move across the diameter of the conduit, blocking thermal transfer between a storage region and a phase change material region of a temperature-controlled container, in response to the internal temperature within the phase change material region. For example, a passive thermal control device including a bimetallic element can be configured to reversibly move outward, at temperatures above about 8° C. and correspondingly configured to reversibly move inward, at temperatures below about 8° C. For example, a passive thermal control device including a bimetallic element can be configured to reversibly move to an open position for the conduit at temperatures above about 8° C., and correspondingly configured to reversibly move to a closed position for the conduit at temperatures below about 8° C. For example, a passive thermal control device including a bimetallic element can, in some embodiments, include a pop-disc style thermostat element, the pop-disk configured to reversibly inhibit or permit thermal flow through air within the conduit in response to a preset temperature.

Some embodiments include a thermal control device that is an active thermal control device. For example, an active thermal control device can, in some embodiments, include an electrically-powered motor attached to one or more closure elements positioned across the diameter of the conduit, an electronic temperature sensor and a battery. In some embodiments, an active thermal control device is configured to attach to a power source external to the temperature-controlled container. For example, a power source can include a battery, a solar array, a generator, or a connection to a municipal power supply. In some embodiments, the thermal control device includes: a temperature sensor; an electronic controller attached to the temperature sensor; and an electronically-controlled thermal control unit responsive to the electronic controller.

The temperature-controlled container 110 shown in FIG. 9 includes a storage region 920. In some embodiments, a storage region can be subdivided, for example through the addition of internal walls or other structures within the storage region. In some embodiments, a storage region can include storage structures, such as shelves, containers or other structures. In some embodiments, a storage region can include a non-toxic coating or liner on the internal surface of the storage region. In some embodiments, a storage region can include an anti-microbial coating or liner, such as a plastic liner including an anti-bacterial and/or anti-microbial agent. In some embodiments, a storage region can be configured to store medicinal agents. For example, in some embodiments a storage region can be configured of a size and shape to store secondary packaging of medicinal agents, such as boxes and wrappers. In some embodiments, a storage region can be configured to store pharmaceutical agents. For example, in some embodiments a storage region can be configured of a size and shape to store secondary packaging of pharmaceutical agents, such as boxes and wrappers. In some embodiments, a storage region can be configured to store vaccines. For example, in some embodiments a storage region can include racks or internal containers of a size and shape to store vaccine vials, with or without secondary packaging.

Some embodiments include wherein the one or more sections of insulation material include an aperture at a lower face of the container, the aperture configured to permit condensed liquid to flow from an interior of the container. The embodiment illustrated in FIG. 9 includes an aperture at a lower face of the container, the aperture attached to a small conduit 250 positioned within the wall 200 of the temperature-controlled container 110, with a first end of the small conduit 250 opening into the lower face of the storage region 920 and a second end of the small conduit 250 opening at the exterior surface of the wall 200. A small conduit can be, for example, a narrow tube configured to permit condensed liquid to flow through gravity from the interior of the storage region to a region adjacent to an external surface of the container while minimizing thermal transfer through the small conduit. A small conduit can be fabricated, for example, from thermally non-conductive tube with a narrow diameter. For example, in some embodiments a small conduit is fabricated from thermally non-conductive plastic tubing. For example, in some embodiments a small conduit is fabricated as a tube with a diameter no greater than 1 cm across. For example, in some embodiments a small conduit is fabricated from as a tube with a diameter no greater than 0.5 cm across. For example, in some embodiments a small conduit is fabricated as a tube with a diameter no greater than 0.2 cm across. For example, in some embodiments a small conduit is fabricated as a tube with a diameter no greater than 0.1 cm across. The aperture can be positioned at a relatively low region in the lower face of the storage region, for example in an indentation or lower part of a sloping region in the lower face of the storage region.

In some embodiments, a temperature-controlled container includes an aperture within a section of the insulation material substantially defining the container, the aperture between the phase change material region internal to the container and an external surface of the container. For example, the temperature-controlled container 110 illustrated in FIG. 9 includes an aperture 950 in the top wall of the container 110. In some embodiments, the aperture is positioned at a top face of the temperature-controlled container when the container is oriented for use within a refrigeration device. In some embodiments, the aperture is of a size and shape to substantially correspond with an external surface of the unidirectional thermal conductor positioned within the aperture. In some embodiments, the aperture is configured as a tubular structure. In some embodiments, the aperture is configured as a substantially vertical tubular structure when the container is positioned for use within a refrigeration device. In some embodiments, the aperture within a section of the insulation material substantially defining the container further includes a structure internal to the aperture, the structure forming walls of the aperture. In some embodiments, for example, an aperture includes a tube conforming to the walls of the aperture. The aperture 950 corresponds to a small portion of the section of the insulation material substantially defining the container. For example, in some embodiments the cross-section of an aperture corresponds to no more than 0.5% of the total surface of the exterior of a temperature-controlled container. For example, in some embodiments the cross-section of an aperture corresponds to no more than 1% of the total surface of the exterior of a temperature-controlled container. For example, in some embodiments the cross-section of an aperture corresponds to no more than 2% of the total surface of the exterior of a temperature-controlled container. For example, in some embodiments the cross-section of an aperture corresponds to no more than 3% of the total surface of the exterior of a temperature-controlled container. For example, in some embodiments the cross-section of an aperture corresponds to no more than 4% of the total surface of the exterior of a temperature-controlled container. For example, in some embodiments the cross-section of an aperture corresponds to no more than 5% of the total surface of the exterior of a temperature-controlled container. In some embodiments, the aperture 950 includes additional thermal insulation, such as one or more rubber gaskets or liners.

In some embodiments, a temperature-controlled container includes a unidirectional thermal conductor positioned within the aperture, the unidirectional thermal conductor configured to transmit heat in a direction from the phase change material region to the external surface of the container. For example, the embodiment shown in FIG. 9 includes a unidirectional thermal conductor 970 that traverses the aperture 950. The unidirectional thermal conductor 970 shown in FIG. 9 is of a size and shape so that the external surface of the unidirectional thermal conductor 970 is configured to reversibly mate with the internal surface of the aperture 950 at the position where the unidirectional thermal conductor 970 is adjacent to the aperture 950. In the embodiment illustrated in FIG. 9, the unidirectional thermal conductor 970 includes a first end positioned external to the temperature-controlled container 110 and a second end positioned within the phase change material region 910 in contact with the phase change material 960. In some embodiments, a unidirectional thermal conductor includes one or more thermal conduction units in thermal contact with an exterior surface of the unidirectional thermal conductor, the one or more thermal conduction units positioned within the phase change material region. The unidirectional thermal conductor 970 shown in FIG. 9, for example, includes thermal conduction units 975 attached to the unidirectional thermal conductor 970 at the region within the phase change material region 910, the thermal conduction units 975 positioned to maximize thermal transfer between the phase change material 960 and the unidirectional thermal conductor 970. For example, as shown in FIG. 9, a unidirectional thermal conductor 970 can traverse a liner 965 or secondary container within the phase change material region 910.

A "unidirectional thermal conductor," as used herein, refers to a structure configured to permit thermal transfer in one direction along its long axis, while substantially inhibiting thermal transfer in the reverse direction along the same long axis. A unidirectional thermal conductor is designed and implemented to encourage the transmission of thermal energy (e.g. heat) in one direction along the length of the unidirectional thermal conductor, while substantially suppressing the transmission in the reverse direction along the length of the unidirectional thermal conductor. In some embodiments, for example, a unidirectional thermal conductor includes a linear heat pipe device. In some embodiments, for example, a unidirectional thermal conductor includes a thermal diode device. For example, a unidirectional thermal conductor can include a hollow tube fabricated from a thermally conductive material, the hollow tube sealed at each end and including a substance in a volatile liquid form and in a gas form. A unidirectional thermal conductor is configured so that the liquid and gas form of the substance will be in thermal equilibrium. A unidirectional thermal conductor is substantially evacuated during fabrication, then sealed with a gas-impermeable seal, so that substantially all of the gas present within the unidirectional thermal conductor is the gas form of the liquid present. The vapor pressure within a unidirectional thermal conductor is substantially entirely the vapor pressure of the liquid, so that the total vapor pressure is substantially equivalent to the partial pressure of the liquid. In some embodiments, a unidirectional thermal conductor can be configured to operate in a substantially vertical position, with thermal transfer from the lower end to the upper end carried out through vapor rising within the unidirectional thermal conductor and condensing at the upper end. In some embodiments, the surface of the volatile liquid within the unidirectional thermal conductor is positioned to be no higher than the lower face of the wall of the thermally-insulated container. In some embodiments, the unidirectional thermal conductor includes a volatile liquid wherein the expected surface level of the volatile liquid is within a storage region of a temperature-controlled container when the unidirectional thermal conductor is in its expected position within the container. In some embodiments, for example, a unidirectional thermal conductor includes a liquid that includes: R-134A refrigerant, iso-butane, water, methanol, ammonia, or R-404 refrigerant. In some embodiments, for example, a unidirectional thermal conductor is configured as a ½ inch diameter copper pipe.

Some embodiments include a unidirectional thermal conductor that includes an elongated structure. For example, a unidirectional thermal conductor can include a substantially tubular structure. A unidirectional thermal conductor can be configured as a substantially linear structure. A unidirectional thermal conductor can be configured as a substantially non-linear structure. For example, unidirectional thermal conductor can be configured as a non-linear tubular structure. In some embodiments, one or more thermal conduction units are attached to an exterior surface of a unidirectional thermal conductor. For example, one or more planar structures, such as fin-like structures, fabricated from a thermally-conductive material can be attached to the exterior surface of a unidirectional thermal conductor and positioned to promote thermal transfer between the unidirectional thermal conductor and an adjacent region. A unidirectional thermal conductor can be fabricated from a thermally-conductive metal. For example, a unidirectional thermal conductor can include copper, aluminum, silver or gold.

In some embodiments, a unidirectional thermal conductor can include a substantially elongated structure. For example, a unidirectional thermal conductor can include a substantially tubular structure. The substantially elongated structure includes a volatile liquid sealed within the structure with gas-impermeable seals. For example, a unidirectional thermal conductor can include welded or crimped gas-impermeable seals. In some embodiments, the volatile liquid includes one or more of: water, ethanol, methanol, or butane. The selection of the volatile liquid in an embodiment depends on factors including the evaporation temperature of the volatile liquid in the particular unidirectional thermal conductor structure in the embodiment, including the gas pressure within the unidirectional thermal conductor. The interior of the structure of the unidirectional thermal conductor includes a gas pressure below the vapor pressure of the volatile liquid included in that embodiment. When the unidirectional thermal conductor is positioned within a temperature-controlled container in a substantially vertical position, the volatile liquid evaporates from the lower portion of the unidirectional thermal conductor, wherein the resulting vapor rises to the upper portion of the unidirectional thermal conductor and condenses, thus transferring thermal energy from the lower portion of the unidirectional thermal conductor to the upper portion.

In some embodiments, a temperature-controlled container does not include a thermal control device that is a valve within the conduit. In some embodiments, a temperature-controlled container includes a unidirectional thermal conductor that is positioned with a first end within the storage region of the container, and a second end that projects into the phase change material region of the container. An adiabatic region of the unidirectional thermal conductor is positioned within the conduit of the temperature-controlled container. In such embodiments, the temperature-controlled container relies on the temperature gradient across the length of the unidirectional thermal conductor to regulate the temperature within the storage region of the container. For example, a unidirectional thermal conductor can be chosen for a particular embodiment based on its physical properties that alter a thermal gradient along the length of the unidirectional thermal conductor, such as the material used to fabricate the unidirectional thermal conductor, the liquid within the unidirectional thermal conductor, the length of the unidirectional thermal conductor and the diameter of the unidirectional thermal conductor.

In some embodiments, a temperature-controlled container includes a thermal dissipator unit positioned adjacent to the external surface of the container, the thermal dissipator unit including a radiative component configured to be positioned within the refrigeration device, and a thermal transfer component, the thermal transfer component in thermal contact with the unidirectional thermal conductor. Some embodiments include a thermal dissipator unit including a radiative component affixed to an exterior surface of the temperature-controlled container. For example, the embodiment illustrated in FIG. 9 includes a thermal dissipator unit 300 affixed to the top external surface of the temperature-controlled container 110. The thermal dissipator unit 300 is in thermal contact with the end of the unidirectional thermal conductor 970. Some embodiments include a thermal dissipator unit including a radiative component including a radiative fin structure. For example, the embodiment shown in FIG. 9 includes a thermal dissipator unit 300 including a radiative fin structure with a plurality of fin structures attached to the thermal dissipator unit 300 and positioned to promote the thermal transfer between the thermal dissipator unit 300 and an adjacent region within the refrigeration device.

In some embodiments, a temperature-controlled container includes a thermal dissipator unit including a thermal transfer component including a highly thermally-conductive material in thermal contact with the unidirectional thermal conductor. For example, a temperature-controlled container that includes a thermal dissipator unit with a thermal transfer component can include a plate fabricated from a thermally-conductive material positioned between a surface of the thermal dissipator unit and a surface of the unidirectional thermal conductor. For example, a temperature-controlled container that includes a thermal dissipator unit with a thermal transfer component can include a crimp or connector fabricated from a thermally-conductive material positioned between a surface of the thermal dissipator unit and a surface of the unidirectional thermal conductor. A thermal transfer component can, in some embodiments, be fabricated from a thermally-conductive material that is a thermally-conductive metal, such as copper, aluminum, silver or gold. A thermal transfer component can, in some embodiments, be fabricated from a thermally-conductive material that is a thermally-conductive plastic material.

In some embodiments, a temperature-controlled container includes a thermal dissipator unit including a thermal transfer component including a Peltier device in thermal contact with the unidirectional thermal conductor. A Peltier device can be positioned between a thermal dissipator unit and a unidirectional thermal conductor to increase thermal transfer from the unidirectional thermal conductor to the thermal dissipator unit. The Peltier device can be attached to a controller and a power source, such as a battery. The Peltier device can be attached to a controller and a power source, as well as a temperature sensor positioned within the storage region of the temperature-controlled container. The controller for the Peltier device can be configured to turn the Peltier device on and off in response to information from the temperature sensor. For example, a controller for a Peltier device can be configured to turn on the Peltier device when a temperature sensor within the storage region indicates a temperature above 7° C. For example, a controller for a Peltier device can be configured to turn off the Peltier device when a temperature sensor within the storage region indicates a temperature below 3° C.

Figure 10:
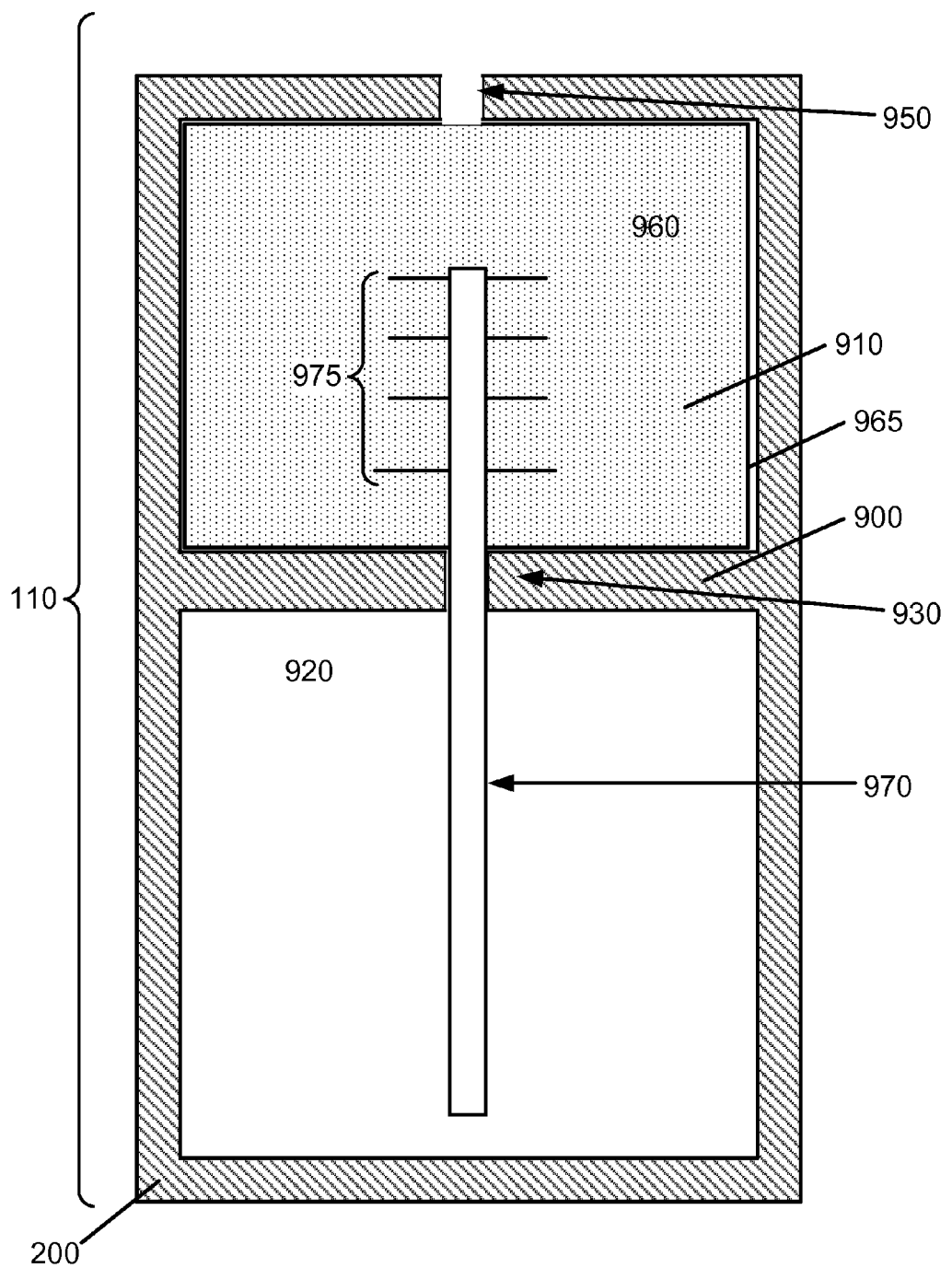
FIG. 10 is a schematic of a temperature-controlled container.

FIG. 10 illustrates aspects of thermal flow through a temperature-controlled container. The temperature-controlled container 110 shown in FIG. 10 is depicted without a refrigeration device, although it is configured to fit and operate within an interior of a refrigeration device. The embodiment of a temperature-controlled container 110 illustrated in FIG. 10 is depicted to illustrate its internal structures in a substantially cross-section view. The temperature-controlled container 110 shown in FIG. 10 includes walls 200 substantially defining the container, and an insulated partition 900 including a conduit 930 between a storage region 920 and a phase change material region 910. A unidirectional thermal conductor 970 is positioned with a first end within the storage region 920 of the temperature-controlled container 110, and a second end positioned within the phase change material region 960, with an adiabatic region positioned within the conduit 930. The region of the unidirectional thermal conductor 970 positioned within the conduit 930 is configured to reversibly mate with the internal surface of the conduit 930. Some embodiments include an insulation material, such as insulative foam, surrounding the exterior surface of the unidirectional thermal conductor 970 within the conduit 930, the insulative material positioned to reduce thermal transfer around the outer surface of the unidirectional thermal conductor 970.

In embodiments including a liner 965 or secondary container positioned to contain the phase change material 960 within the phase change material region 910, such as illustrated in FIG. 10, the liner 965 includes an aperture configured to permit the second end of the unidirectional thermal conductor 970 to be within the liner 965 walls without leakage of the phase change material 960. For example, one or more gaskets can be placed around the unidirectional thermal conductor 970. In some embodiments, such as illustrated in Figure to, a plurality of thermal conduction units 975 are attached to the unidirectional thermal conductor 970 at the region within the phase change material region 910

The embodiment shown in FIG. 10 includes an aperture 950 in the top wall of the temperature-controlled container 110. The aperture 950 is sized and positioned to permit one or more section of refrigeration coils from a refrigeration device to traverse the aperture 950 and to be positioned in thermal contact with the phase change material 960. When the refrigeration device is operating, the phase change material 960 will be cooled through normal functions of the refrigeration device through the refrigeration coils.

Figure 11:
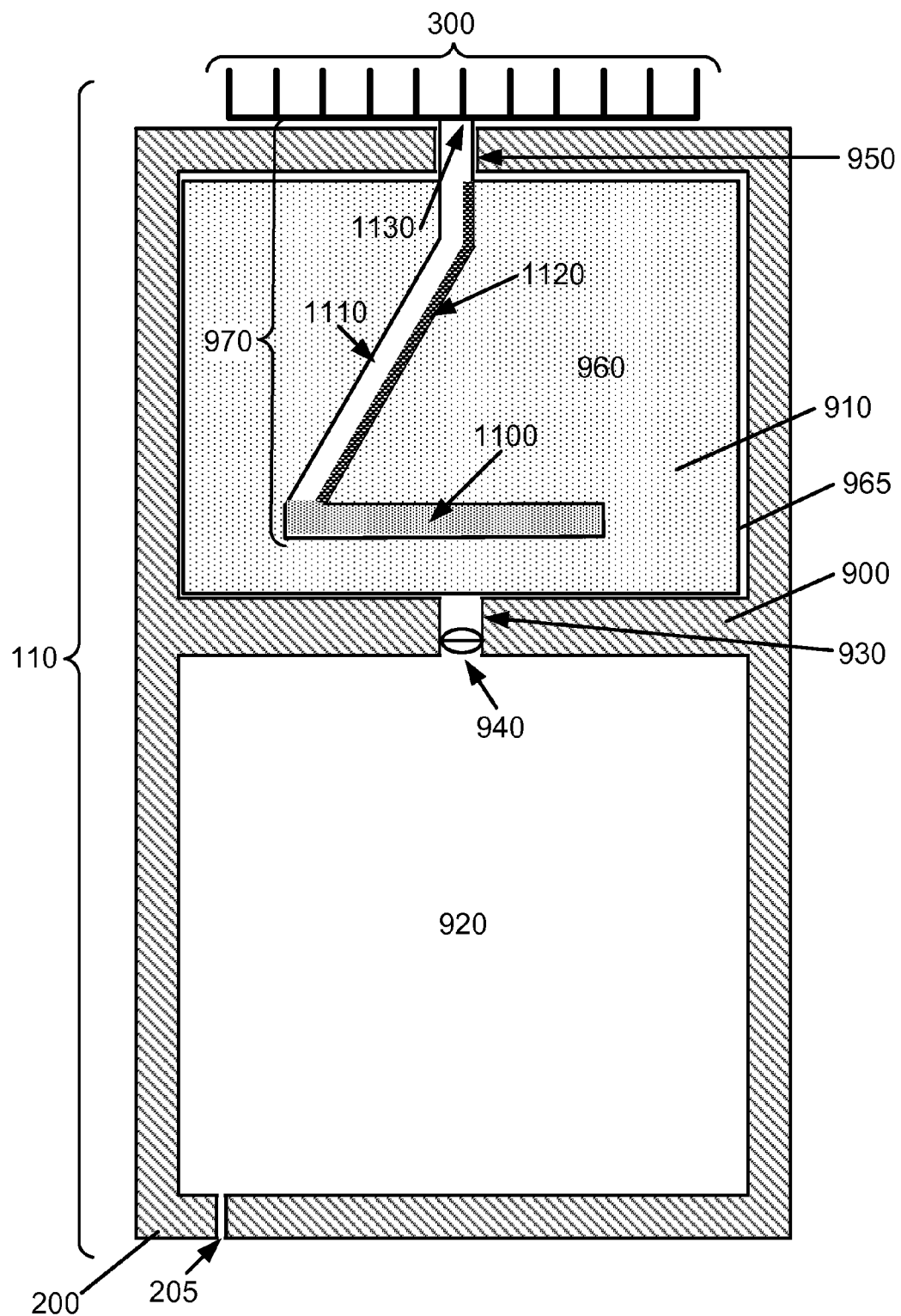
FIG. 11 is a schematic of a temperature-controlled container.

FIG. 11 illustrates aspects of a temperature-controlled container 110. The temperature-controlled container 110 shown in FIG. 11 is shown without a refrigeration device, although it is configured to fit and operate within an interior of a refrigeration device. The embodiment of a temperature-controlled container 110 illustrated in FIG. 11 is depicted to illustrate its internal structures in a substantially cross-section view. The temperature-controlled container 110 shown in FIG. 11 includes walls 200 substantially defining the container, and an insulated partition 900 including a conduit 930 between a storage region 920 and a phase change material region 910. The temperature-controlled container 110 includes an aperture 205 in the lower face of the temperature-controlled container 110, the aperture 205 of a size and shape to allow condensation to leave the storage region 230 due to gravity while minimizing thermal energy transfer between the storage region 230 and a region exterior to the container. A thermal control device 940 is positioned within the conduit 930. The thermal control device 940 is positioned in a "closed" orientation relative to the conduit 930, thereby inhibiting thermal energy transfer from the interior of the storage region 920 into the interior of the conduit 930.

The embodiment of a temperature-controlled container 110 illustrated in FIG. 11 includes a phase change material region 910 including phase change material 960. The phase change material 960 is enclosed within a liner 965 to the phase change material region 910. A unidirectional thermal conductor 970 is positioned with a lower region within the phase change material region 910, a region transverse to an aperture 950 in the top wall of the temperature-controlled container 110, and a top edge. The top edge of the unidirectional thermal conductor 970 is in thermal contact with a thermal transfer component 300 is positioned adjacent to the upper surface of the temperature-controlled container 110.

The embodiment of a unidirectional thermal conductor 970 shown in FIG. 11 is depicted with internal structures for purposes of illustration. The unidirectional thermal conductor 970 shown in FIG. 11 is configured as a substantially tubular structure, with a substantially linear upper region and a curved lower region. The unidirectional thermal conductor 970 includes a volatile liquid 1100 sealed within the unidirectional thermal conductor 970. The unidirectional thermal conductor 970 includes an interior region 1110, the interior region 1110 including gas at a pressure below the vapor pressure of the volatile liquid 1100 in expected use conditions for the temperature-controlled container 110. The unidirectional thermal conductor 970 includes a mesh structure 1120. In the embodiment shown in FIG. 11, the mesh structure 1120 is a three dimensional mesh structure. The mesh structure 1120 includes interior spaces of a size and shape so that the volatile liquid 1100 will be drawn into the mesh structure 1120 through capillary action. The mesh structure 1120 is fabricated from a material that has an adhesive force with the volatile liquid 1100 sufficient so that capillary action will draw the volatile liquid into and through the mesh structure 1120. The mesh structure 1120 is attached to an inner surface of the unidirectional thermal conductor 970, along the length of the unidirectional thermal conductor 970 region that is positioned within the phase change material region 910. The top edge of the mesh structure 1120 is positioned substantially adjacent to the expected top level of the phase change material 960 when the temperature-controlled container 110 is in use in expected conditions. In some embodiments, the top edge of the mesh structure is positioned below the expected top level of the phase change material when a temperature-controlled container is in use in expected conditions.

During use, the temperature-controlled container 110 is configured so that the volatile liquid 1100 within the unidirectional thermal conductor 970 wicks upward along the mesh structure 1120 through capillary action. The position of the volatile liquid 1100 within the mesh structure 1200 increases the surface area of the volatile liquid 1100 available for evaporation. The volatile liquid then moves into a gas form within the interior region 1110. Since the thermal transfer component 300 is positioned within the refrigeration region of a refrigeration device, it is expected to be transferring thermal energy away from the temperature-controlled container 110 (see FIG. 11). Thermal energy transfer to the thermal transfer component 300 will result in a cooling effect on the adjacent internal region 1130 of the unidirectional thermal conductor 970. Consequently, the gas form of the volatile liquid will condense at the adjacent internal region 1130 of the unidirectional thermal conductor 970, and associated thermal energy transfer.

Figure 12:
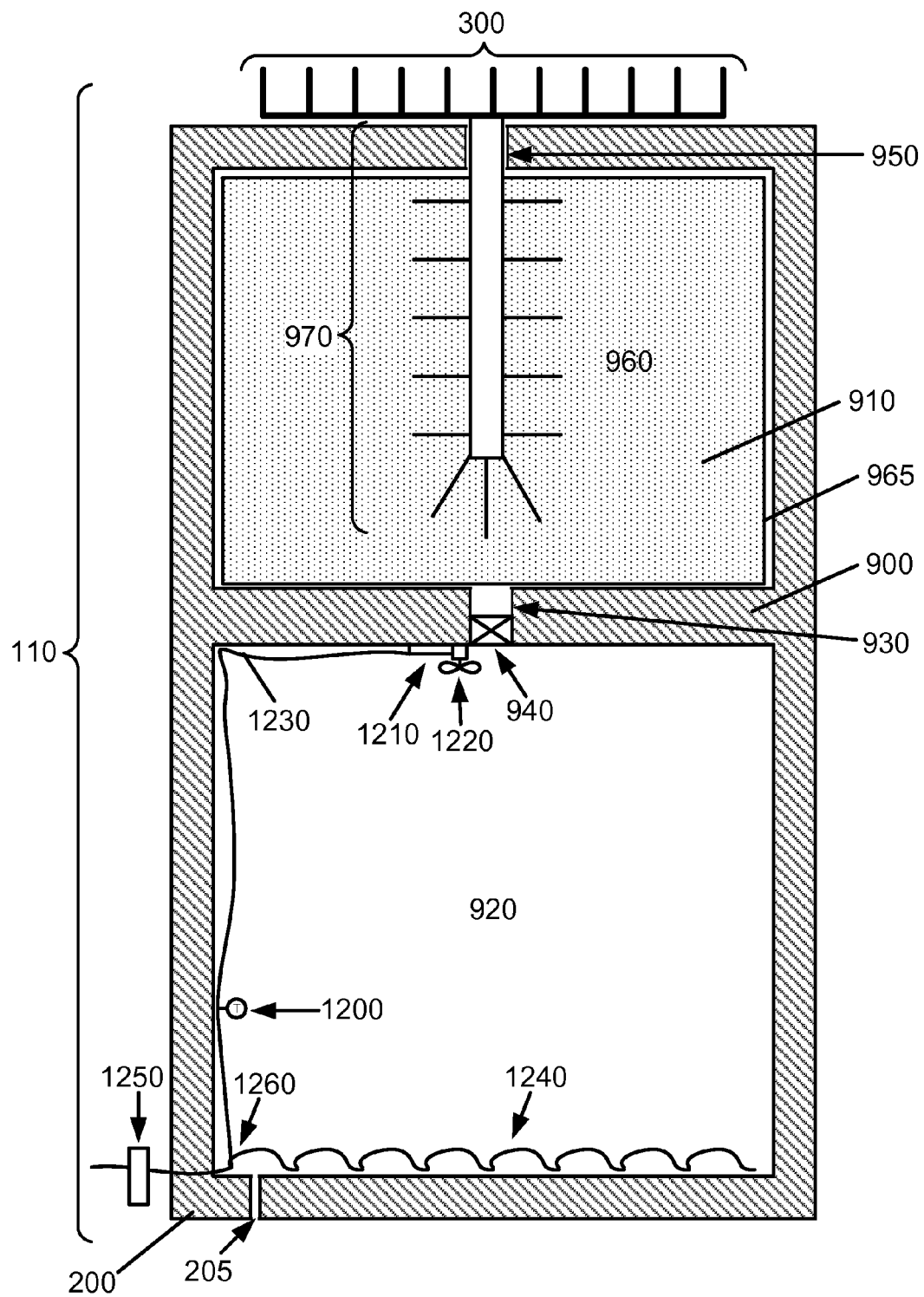
FIG. 12 is a schematic of a temperature-controlled container.

FIG. 12 depicts aspects of a temperature-controlled container 110. The temperature-controlled container 110 illustrated in FIG. 12 is shown without a refrigeration device, although it is configured to fit and operate within an interior of a refrigeration device. The embodiment of a temperature-controlled container 110 illustrated in FIG. 12 is depicted to illustrate its internal structures in a substantially cross-section view. The temperature-controlled container 110 shown in FIG. 12 includes walls 200 substantially defining the container, and an insulated partition 900 including a conduit 930 between a storage region 920 and a phase change material region 910. The temperature-controlled container 110 includes an aperture 205 in the lower face of the temperature-controlled container 110, the aperture 205 of a size and shape to allow condensation to leave the storage region 230 due to gravity while minimizing thermal energy transfer between the storage region 230 and a region exterior to the container.

A thermal control device 940 is positioned within the conduit 930. In the embodiment shown in FIG. 12, the thermal control device 940 includes an electronically-controlled thermal control unit. For example, in some embodiments the thermal control device 940 includes an electronically-controlled valve attached to the conduit 930, the valve positioned to reversibly inhibit gas passage through the conduit 930. The thermal control device 940 shown in FIG. 12 is attached to an electronic controller 1210. The electronic controller 1210 is attached to a temperature sensor 1200 with a wire connector 1230. As shown in FIG. 12, the temperature sensor 1200 is positioned within the storage region 930, and the temperature sensor 1200 is attached to the thermal control device 940. In the embodiment shown in FIG. 12, the temperature sensor 1200 is attached to the side of the storage region 920. In some embodiments, a temperature sensor can be positioned within the conduit 940. The electronic controller 1210 is configured to control the thermal control device 940 positioned within the conduit 930 in response to information transmitted from the temperature sensor 1200 via the wire connector 1230. In the embodiment illustrated in FIG. 12, a fan 1220 is attached to the electronic controller 1210 and positioned adjacent to the conduit 930. The fan 1220 is reversibly controlled by the electronic controller 1210 in response to information transmitted from the temperature sensor 1200 via the wire connector 1230. For example, the electronic controller 1210 can be configured to turn on the fan 1220 in response to a temperature reading above a threshold level. The electronic controller 1210 and attached modules are connected to a power source 1250, for example an external power source 1250 as shown in FIG. 12, via a wire connector 1260. In some embodiments, a temperature-controlled container 110 is connected to the power source for the refrigeration device surrounding the temperature-controlled container. The embodiment shown in FIG. 12 also includes a heating element 1240 attached to the electronic controller 1210 via the wire connector 1230. As shown in FIG. 12, the temperature sensor 1200 is positioned within the storage region 930, and the temperature sensor 1200 is attached to a heating device including a heating element 1240 within the storage region 930. The electronic controller 1210 can be configured to turn on the heating element 1240 in response to information transmitted from the temperature sensor 1200 via the wire connector 1230. For example, the electronic controller 1210 can be configured to turn on the heating element 1240 in response to a temperature reading below a threshold level. A heating element can be positioned, for example, along the lower face of the storage region 920. A heating element can be positioned, for example, adjacent to an interior surface of the storage region 920.

Figure 13:
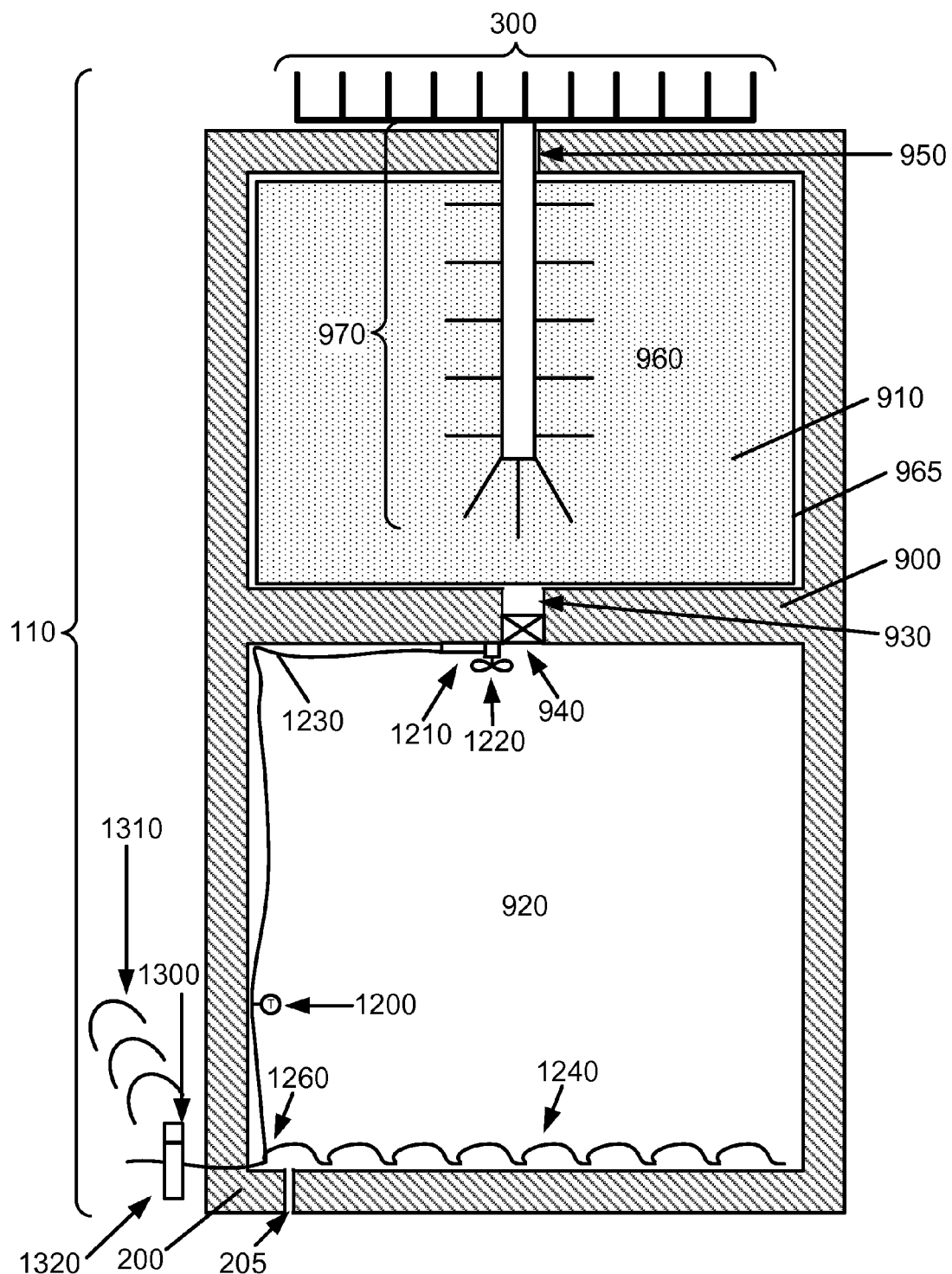
FIG. 13 is a schematic of a temperature-controlled container.

FIG. 13 illustrates aspects of a temperature-controlled container 110. The temperature-controlled container 110 shown in FIG. 13 is illustrated without a refrigeration device, although it is configured to fit and operate within an interior of a refrigeration device. The embodiment of a temperature-controlled container 110 depicted in FIG. 13 is shown with the internal structures in a substantially cross-section view. The temperature-controlled container 110 shown in FIG. 13 includes walls 200 substantially defining the container, and an insulated partition 900 including a conduit 930 between a storage region 920 and a phase change material region 910. The temperature-controlled container 110 includes an aperture 205 in the lower face of the temperature-controlled container 110, the aperture 205 of a size and shape to allow condensation to leave the storage region 230 due to gravity while minimizing thermal energy transfer between the storage region 230 and a region exterior to the container.

The embodiment illustrated in FIG. 13 includes an electronic controller 1210 connected via a wire connector 1230 to a temperature sensor 1200. A fan 1220 is positioned adjacent to the conduit 930 and operably coupled to the electronic controller 1210. A heating element 1240 is operably attached to the electronic controller 1210 by the wire connector 1230. As shown in FIG. 13, the temperature sensor 1200 is attached to a transmission unit 1320 including a transmitter 1300 via a wire connector 1260. The transmitter 1300 is configured to transmit signals 1310 external to the temperature-controlled container 110. In some embodiments, the transmission unit 1320 is configured to send signals 1310 through the transmitter 1300 on a regular schedule. For example, the transmission unit 1320 can be configured to send the most recent information from an attached temperature sensor 1200 for example, every hour, every 8 hours, every 12 hours, or every day. In some embodiments, the transmission unit 1320 is configured to send signals 1310 through the transmitter 1300 on an as-needed basis. For example, the transmission unit 1320 can be configured to send a warning signal when the information from the temperature sensor 1200 is above or below a threshold level (e.g. above 7° C., or below 3° C.).

In situations wherein the ambient temperature outside of a refrigeration device drops below the predetermined temperature range of a temperature-controlled container, a heating element such as those illustrated in FIGS. 13 and 14 can be included to provide heat as needed to maintain a lower boundary of the predetermined temperature range. For example, some embodiments include a thermostat and an internal heater within the storage region attached to a battery, such as a lithium battery. Some embodiments of a temperature-controlled container, for example, are configured for use within a refrigeration device wherein the refrigeration device can be used in environments with intermittent electrical power supply and ambient temperatures that can fall below the lower boundary of a predetermined temperature range for the storage region of a temperature-controlled container. For example, in embodiments wherein the predetermined temperature range for the storage region of a temperature-controlled container is in the 2° C. to 8° C. range, a thermostat attached to an internal heater within the storage region can be configured to heat the storage region when the temperature within the storage region reaches 2.5° C. This may occur, for example, in winter conditions wherein the refrigeration device surrounding the temperature-controlled container is without a consistent municipal power source.

Figure 14:
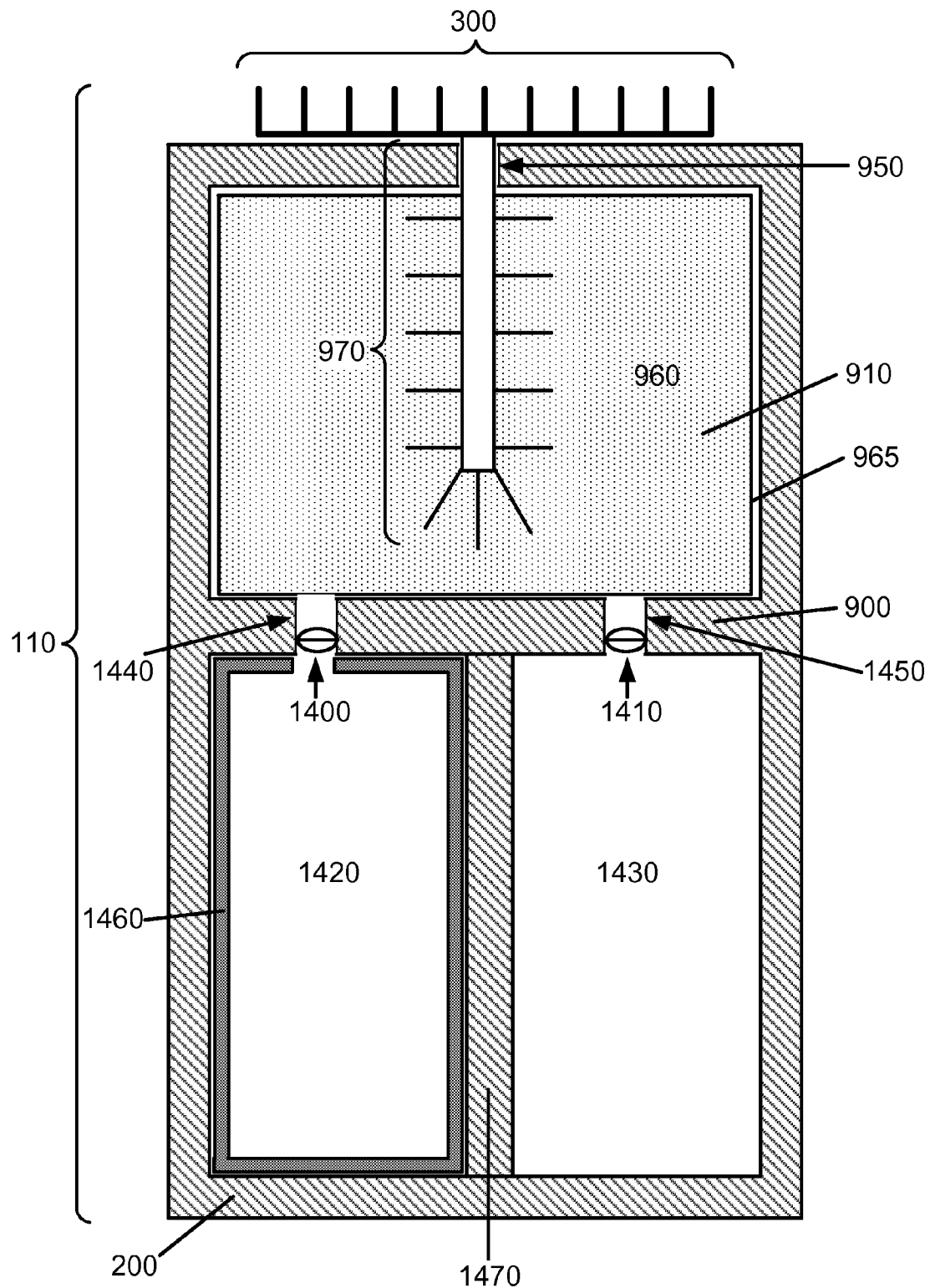
FIG. 14 is a schematic of a temperature-controlled container.

FIG. 14 illustrates aspects of an embodiment of a temperature-controlled container 110. The temperature-controlled container 110 shown in FIG. 14 is illustrated without a refrigeration device, although it is configured to fit and operate within an interior of a refrigeration device. The embodiment of a temperature-controlled container 110 depicted in FIG. 14 is shown with the internal structures in a substantially cross-section view. The temperature-controlled container 110 shown in FIG. 14 includes walls 200 substantially defining the container, and an insulated partition 900 between a storage region 920 and a phase change material region.

In the embodiment shown in FIG. 14, the partition 900 includes a first conduit 1450 and a second conduit 1440. A second insulated partition 1470 divides the region below the insulated partition 900 into a first storage region 1420 and a second storage region 1430. In the embodiment illustrated, the first storage region 1420 and the second storage region 1430 are positioned in a side-by-side configuration. Some embodiments include a first storage region and a second storage region positioned in a top-and-bottom configuration. For example, some embodiments include a second thermally-insulated partition dividing the internal region to form a second storage region and a second phase change material region internal to the container, the second thermally-insulated partition including a conduit between the second storage region and the second phase change material region.

In the embodiment shown in FIG. 14, the partition 900 includes a first conduit 1440 connecting the interior of the first storage region 1420 with the phase change material region 910. The first conduit 1440 includes a first thermal control device 1400. The partition 900 also includes a second conduit 1450 connecting the interior of the second storage region 1430 with the phase change material region 910. The second conduit 1450 includes a second thermal control device 1410. In the embodiment illustrated in FIG. 14, each of the first thermal control device 1400 and the second thermal control device 1410 operate independently. There is no connection between the first thermal control device 1400 and the second thermal control device 1410 in the embodiment of FIG. 14. In some embodiments, a first thermal control device attached to a first conduit and a second thermal control device attached to a second conduit are controlled by a single controller. For example, an electronic controller can be operably attached to a first thermal control device and a second thermal control device, the electronic controller configured to send signals to operate the devices in a coordinated manner.

In the embodiment shown in FIG. 14, the first storage region 1420 includes a liner region 1460 for the second storage region, the liner region 1460 configured to contain a phase change material. In the embodiment shown in FIG. 14, the liner region 1460 includes a contained region positioned adjacent to the interior surface of the first storage region 1420. A liner is configured to contain a quantity of a phase change material. In some embodiments, a liner region includes a phase change material including the phase change material in the phase change material region. In some embodiments, a liner region includes a second phase change material distinct from a phase change material in the phase change material region. A liner region contains and seals phase change material within the liner region. For example, in some embodiments, a liner region is fabricated from a durable plastic material with sealed seams. For example, in some embodiments, a liner region is fabricated from a metal with welded seams. In some embodiments, the liner region is fabricated from thermally-conductive material.

Each of the first storage region 1420 and the second storage region 1430 are in thermal contact with the phase change material region 910 through their respective conduits 1440, 1450. Each of the conduits 1440, 1450 independently permits thermal energy to flow to the phase change material region 910. The phase change material region 910 includes a liner 965 enclosing phase change material 960. A unidirectional thermal conductor 970 is positioned to traverse an aperture 950 in the top of the wall 200 surrounding the temperature-controlled container 110. The unidirectional thermal conductor 970 is immersed in the phase change material 960 for the majority of its lower directed region, includes a region traversing the aperture 950, and is connected at its upper face to the lower surface of a thermal transfer component 300.

Figure 15:
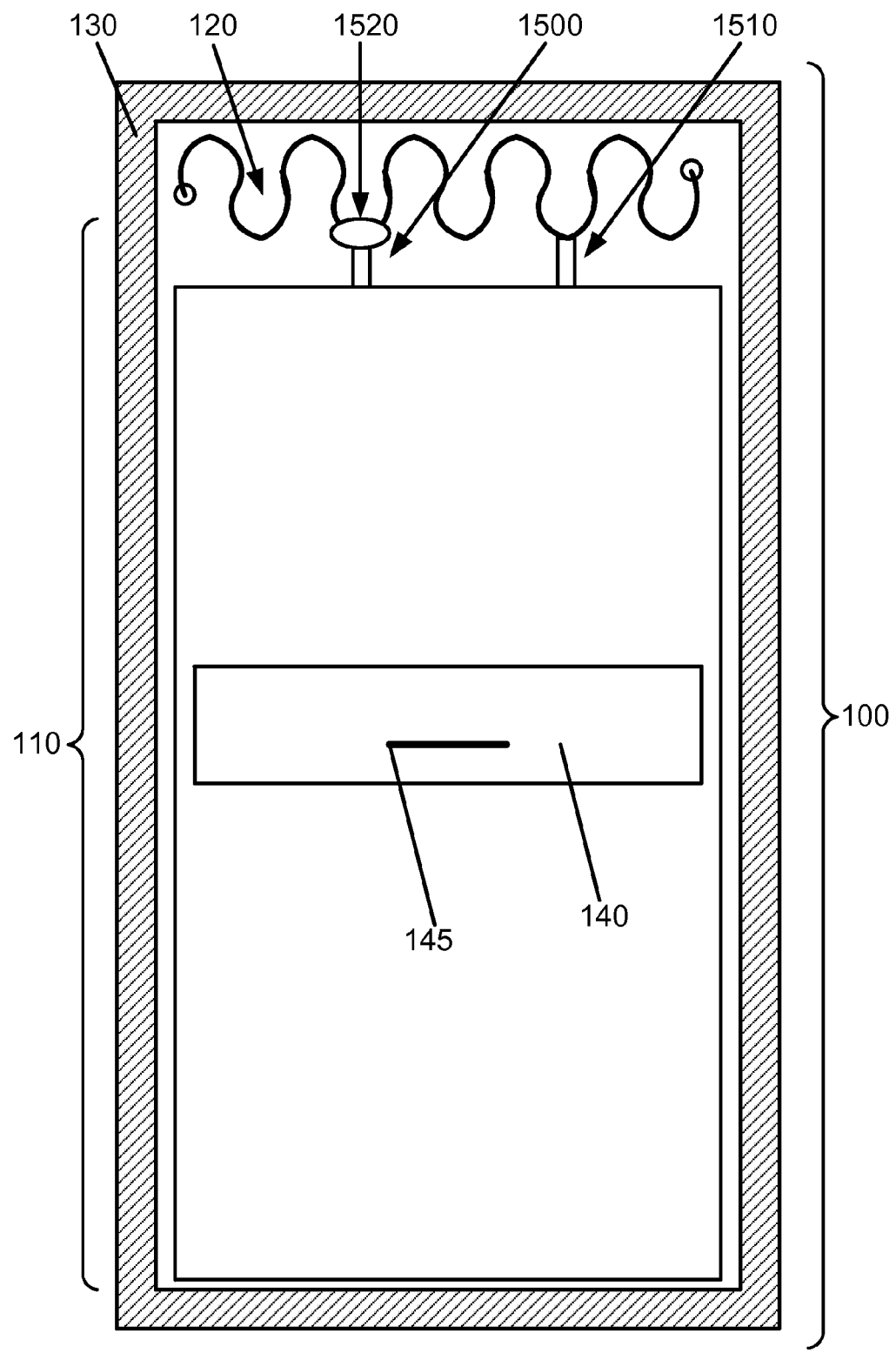
FIG. 15 is a schematic of a temperature-controlled container in use within a refrigeration device.

FIG. 15 illustrates aspects of a temperature-controlled container 110 within a refrigeration device 100. The refrigeration device 100 includes walls 130 surrounding the temperature-controlled container 110. For purposes of illustration, the refrigeration device 100 is shown without a door. FIG. 15 shows a temperature-controlled container 110 within the internal storage region of a refrigeration device 100. The temperature-controlled container 110 includes an access door 140 with an attached handle 145. The access door 140 is illustrated in a closed position, but can be opened by a user to access stored material within a storage region of the temperature-controlled container 110. In some embodiments, a single door provides access to a plurality of storage regions within a temperature-controlled container (see, e.g. FIG. 14).

The refrigeration device 100 shown in FIG. 15 includes refrigeration coils 120. The temperature-controlled container 110 includes a first unidirectional thermal conductor 1500 and a second unidirectional thermal conductor 1510. Each of the unidirectional thermal conductors 1500, 1510, traverses an aperture in the outer wall of the temperature-controlled container 110. The first unidirectional thermal conductor 1500 is attached to the refrigeration coils 120 with an attachment unit 1520. In the embodiment illustrated in FIG. 15, the temperature-controlled container 110 includes a second unidirectional thermal conductor 1510 is attached to the refrigeration coils 120 directly. The first unidirectional thermal conductor 1500 and the second unidirectional thermal conductor 1510 are each independently attached to the refrigeration coils 120 at distinct locations on the refrigeration coils 120.

Some embodiments include a thermal dissipator unit including an attachment unit configured to attach to a refrigeration coil of a refrigeration device. An attachment unit is a unit configured to increase the thermal connection between the unidirectional thermal conductor and the refrigeration coils. For example, in some embodiments an attachment unit includes a thermally conductive metal in contact with an end of the unidirectional thermal conductor and also in contact with the refrigeration coils. For example, in some embodiments an attachment unit is positioned to extend to a radiative unit of a temperature-controlled container. In some embodiments, an attachment unit is fabricated from a thermally-conductive metal, such as aluminum, copper, silver or gold. In some embodiments, an attachment unit is fabricated from a thermally-conductive synthetic material, such as a thermally-conductive plastic material. In some embodiments, an attachment unit is fabricated from a thermally-expansive material. For example, an attachment unit can be fabricated from a thermally-expansive metal, positioned so that when the attachment unit is relatively warmer it increases the amount of surface area that the attachment unit has in contact with the refrigeration coils.

Figure 16:
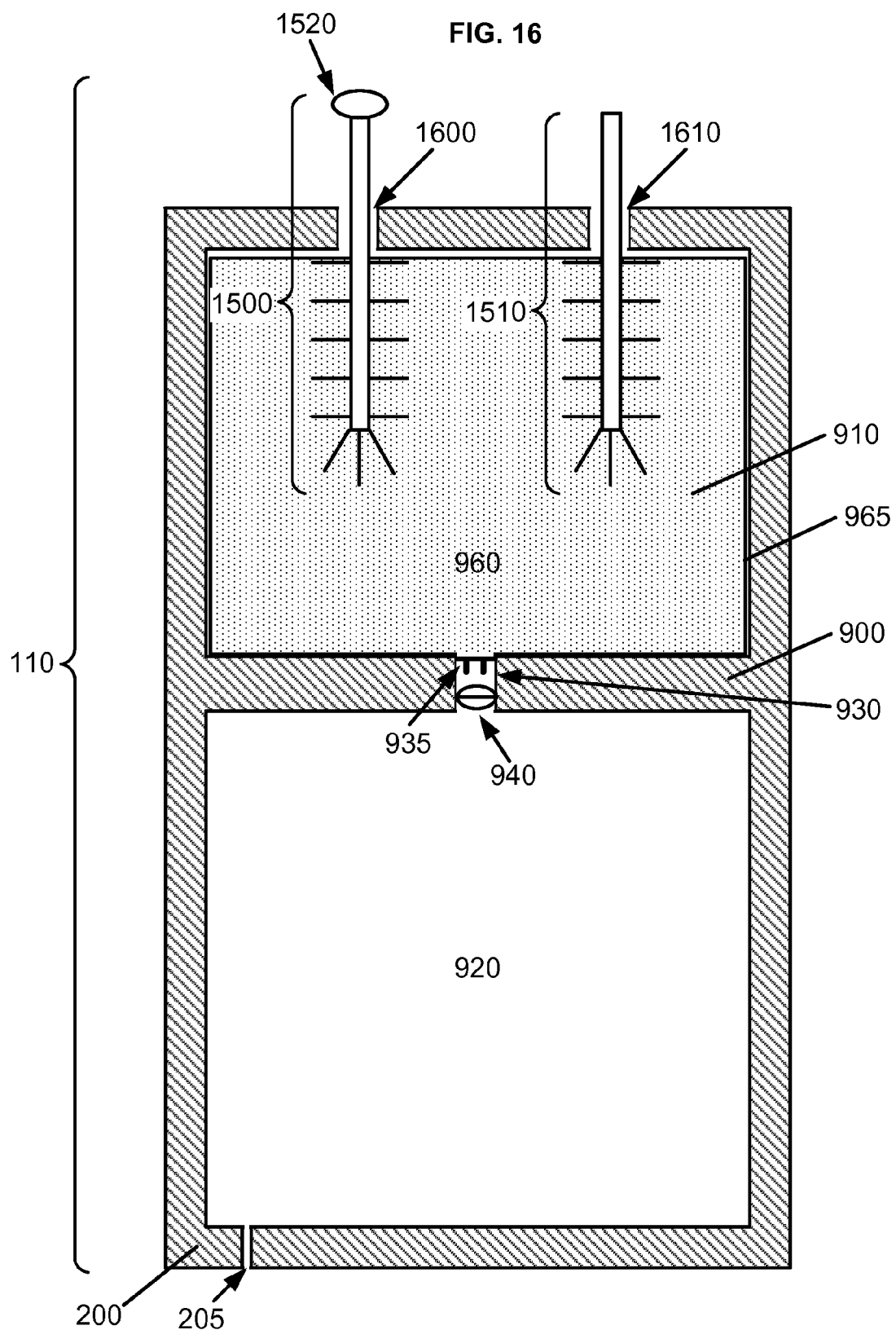
FIG. 16 is a schematic of a temperature-controlled container.

FIG. 16 depicts aspects of an embodiment of a temperature-controlled container 110. The temperature-controlled container 110 depicted in FIG. 16 is illustrated without a refrigeration device for visualization purposes, although it is configured to fit and operate within an interior of a refrigeration device. The embodiment of a temperature-controlled container 110 shown in FIG. 16 is shown with the internal structures in a substantially cross-section view. The temperature-controlled container 110 shown in FIG. 16 includes walls 200 substantially defining the container, and an insulated partition 900 between a storage region 920 and a phase change material region. An aperture 205 is positioned within a lower-facing wall 200, the aperture 205 configured to allow condensed liquid to drip from the interior of the storage region 920 in the temperature-controlled container 110. A partition 900 fabricated from insulative material bisects the top of the interior region of the temperature-controlled container 110. The partition 900 includes a single conduit 930 which is positioned and configured to thermally connect the interior of the storage region 920 to the interior of the phase change material region 910. A thermal control device 940 is positioned within the conduit 930, the thermal control device 940 configured to reversibly inhibit thermal energy transfer along the length of the conduit 930. A thermal control device 940 is positioned within the conduit 930, the thermal control device 940 configured to reversibly minimize thermal energy transfer along the length of the conduit 930. A thermally-conductive divider 935 is configured and positioned to encourage thermal energy transfer between phase change material located within the phase change material region 910 and the conduit 930, while minimizing the possibility of leakage of the phase change material into the conduit 930.

The embodiment of a temperature-controlled container 110 shown in FIG. 16 includes a phase change material region 910 including a liner 965 adjacent to the inner surface of the phase change material region 910. The liner 965 contains phase change material 960. There are two apertures 1600, 1610 positioned in the upper wall of the temperature-controlled container 110. A first unidirectional thermal conductor 1500 is positioned with a lower region within the phase change material region, a region bypassing the length of the first aperture 1600, and a region positioned external to the top face of the temperature-controlled container 110. Similarly, a second unidirectional thermal conductor 1510 is positioned with a lower region within the phase change material region, a region bypassing the length of the first aperture 1600, and a region positioned external to the top face of the temperature-controlled container 110. Although a space is shown around the outer surfaces of the first and second unidirectional thermal conductors, 1500, 1510 and the surfaces of the adjacent conduit 1600, 1610, this is for illustration purposes. In some embodiments, the outer surfaces of the first and second unidirectional thermal conductors, 1500, 1510 and the surfaces of the adjacent conduit 1600, 1610 would be configured to reversibly mate with each other with minimal space between the surfaces. In some embodiments, the outer surfaces of the first and second unidirectional thermal conductors, 1500, 1510 and the surfaces of the adjacent conduit 1600, 1610 would be thermally sealed with a gasket or similar addition. In the embodiment shown in FIG. 16, an attachment unit 1520 is attached to the topmost end of the first unidirectional thermal conductor 1500. The attachment unit 1520 is configured to improve the efficiency of thermal energy transfer between the end of the unidirectional thermal conductor 1500 and a set of refrigeration coils when the temperature-controlled container 110 is positioned for use within a refrigeration device.

Figure 17:
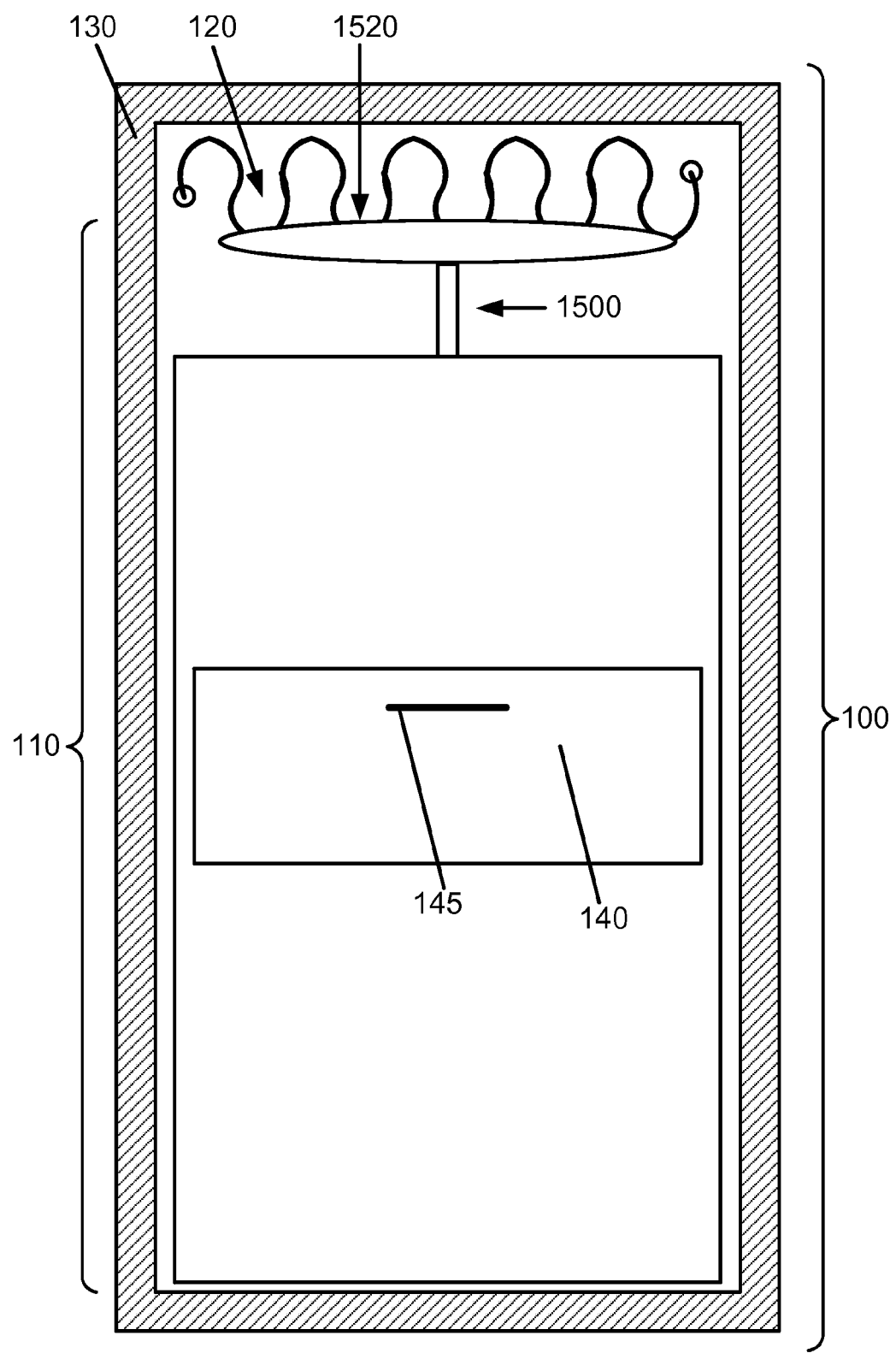
FIG. 17 is a schematic of a temperature-controlled container in use within a refrigeration device.

FIG. 17 illustrates aspects of a temperature-controlled container 110 within a refrigeration device 100. The refrigeration device 100 includes walls 130 surrounding the temperature-controlled container 110. For purposes of illustration, the refrigeration device 100 is shown without a door. FIG. 17 shows a temperature-controlled container 110 within the internal storage region of a refrigeration device 100. The refrigeration coils 120 of the refrigeration device 100 are exposed in the illustration of FIG. 17. For some refrigeration devices, there may be a panel or cover over the refrigeration coils which will need to be bypassed or removed, depending on the embodiment. The temperature-controlled container 110 includes an access door 140 with an attached handle 145. The access door 140 is illustrated in a closed position, but can be opened by a user to access stored material within a storage region of the temperature-controlled container 110. In some embodiments, a single door provides access to a plurality of storage regions within a temperature-controlled container (see, e.g. FIG. 14). The temperature-controlled container 110 includes a single unidirectional thermal conductor 1500 projecting substantially vertically upward from the top surface of the temperature-controlled container 110. The unidirectional thermal conductor 1500 is attached to the refrigeration coils 120 with an attachment unit 1520. The attachment unit 1520 depicted in the embodiment shown in FIG. 17 is of a size and shape to physically connect to the surface of the refrigerator coils 120 over a substantial portion of the refrigerator coils 120. For example, in some embodiments, an attachment unit is a size and shape to make physical contact with the width of a set of refrigerator coils. For example, in some embodiments, an attachment unit is a size and shape to make physical contact with the length of a set of refrigerator coils. For example, in some embodiments, an attachment unit is a size and shape to make physical contact with each of the loops of a set of refrigerator coils.

Figure 18:
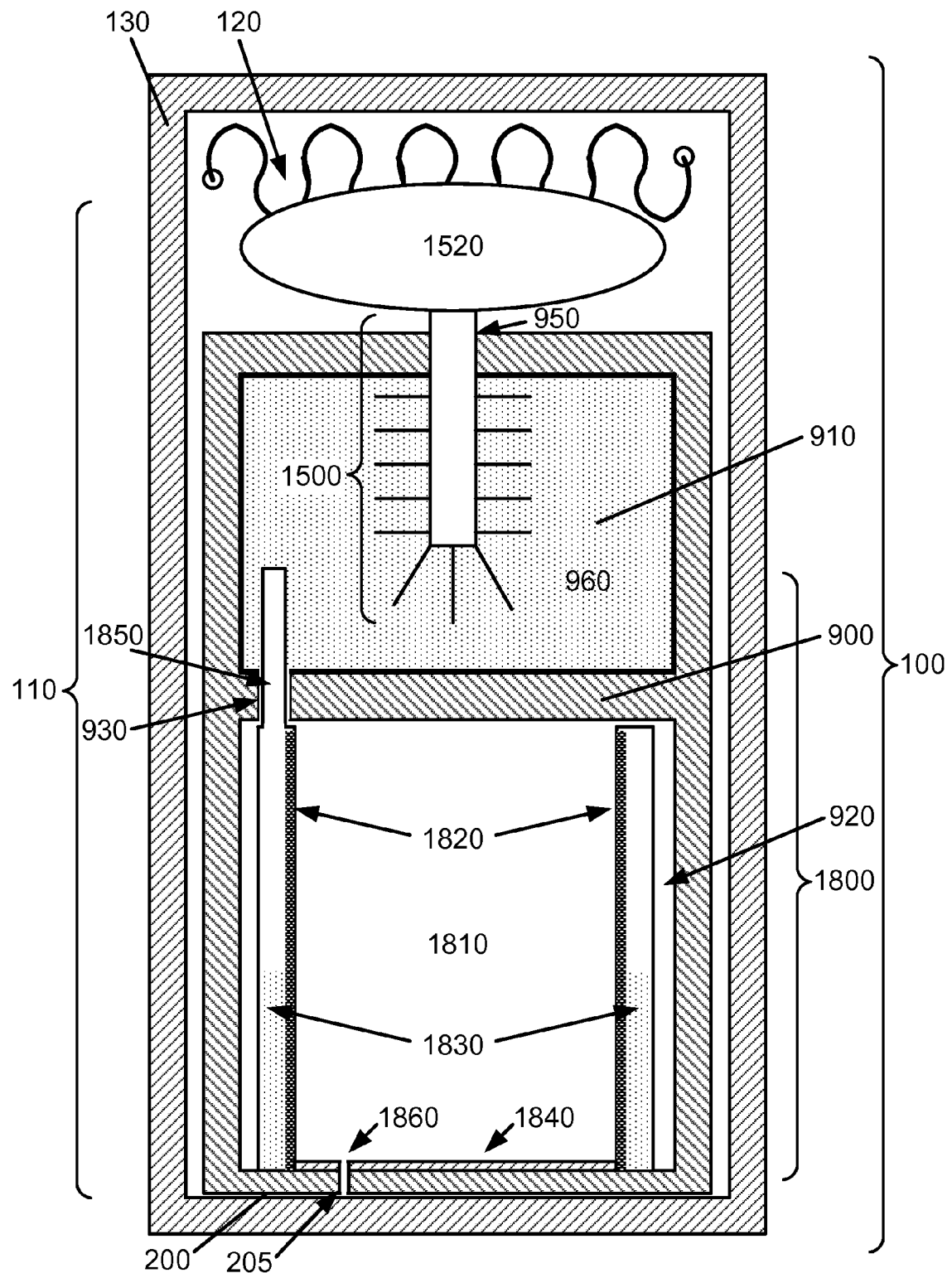
FIG. 18 is a schematic of a temperature-controlled container in use within a refrigeration device.

FIG. 18 depicts an embodiment of a temperature-controlled container 110 within a refrigeration device 100. The refrigeration device 100 includes walls 130 surrounding the temperature-controlled container 110. For purposes of illustration, the refrigeration device 100 is shown without a door. FIG. 18 depicts a temperature-controlled container 110 within the internal storage region of a refrigeration device 100. The refrigeration coils 120 of the refrigeration device 100 are exposed in the illustration of FIG. 18, although in some embodiments the depicted features of the container adjacent to the refrigeration coils are behind a panel or screen of the refrigeration device 100.

The embodiment shown in FIG. 18 includes one or more sections of insulation material substantially defining one or more walls 200 of a temperature-controlled container 110, the temperature-controlled container 110 including an internal region. The embodiment includes a thermally-insulated partition 900 dividing the internal region to form a storage region 920 and a phase change material region 910 internal to the container 110, the thermally-insulated partition including a conduit 930 between the storage region 920 and the phase change material region 910. Phase change material 960 is positioned within the phase change material region 910. The illustrated temperature-controlled container 110 includes a thermal diode unit 1800 within the storage region 920, the thermal diode unit 1800 including a thermal transfer component 1850 positioned within the conduit 930. In the illustrated embodiment, the thermal transfer component 1850 extends beyond the conduit into the interior region of the phase change material region 910. The illustrated embodiment also includes an aperture 950 within a section of the insulation material substantially defining the container 110, the aperture 950 between the phase change material region 910 internal to the container and an external surface of the container 110. The embodiment includes a unidirectional thermal conductor 1500 positioned within the aperture 950, the unidirectional thermal conductor 1500 configured to transmit heat in a direction from the phase change material region 910 to the external surface of the container 110. The unidirectional thermal conductor 1500 includes attached fin structures. The embodiment also includes an attachment unit 1520, the attachment unit 1520 positioned between the end of the unidirectional thermal conductor 1500 outside of the container 110 and the refrigeration coils 120 of the refrigeration device 100. The attachment unit 1520 shown in FIG. 18 is approximately the same width as the phase change material region 910 within the container 110 and forms thermal contacts with the majority of the loops of the refrigeration coils.

The embodiment shown in FIG. 18 includes a thermal diode unit 1800. A "thermal diode unit," as used herein, is a unit configured to border at least a section of the interior of a storage region of a temperature-controlled container, the thermal diode unit configured to substantially equalize temperature within the storage region and to enhance the transfer of thermal energy, or heat, out of the storage region when the temperature within the storage region is above a predetermined upper limit within the predetermined temperature range for a specific embodiment of a temperature-controlled container. A thermal diode unit includes outer walls and inner walls, positioned to include a gap between the outer walls and the inner walls. A thermal diode unit includes outer walls and inner walls, and is configured to form a gas-impermeable seal around the gap between the outer walls and inner walls, creating a gas-sealed gap within the structure of the thermal diode unit. In some embodiments, a thermal diode unit includes one or more substantially vertical outer walls with an outer surface that substantially mates with the interior surface of the storage region. In some embodiments, a thermal diode unit is substantially cylindrical, for example a substantially upright cylindrical shape. In some embodiments, a thermal diode unit is substantially rectangular. In some embodiments, a thermal diode unit is a boxlike shape. In some embodiments, a thermal diode unit includes at least one aperture in a wall of the thermal diode unit, the aperture positioned to correspond with a door or other opening in a storage region. In some embodiments, a thermal diode unit includes a floor region configured to reversibly mate with the lower surface of a storage region of a temperature-controlled container. In some embodiments, a thermal diode unit includes a floor region including an aperture configured to drain excess fluid from the floor region. In some embodiments, a thermal diode unit includes a thermal transfer component configured to extend into the phase change material region of a temperature-controlled container. A thermal transfer unit includes an interior region integral to the gas-sealed gap within the thermal diode unit. The outer walls of a thermal diode unit are fabricated from a thermally conductive material. For example, in some embodiments a thermal diode unit is fabricated including aluminum or copper. For example, in some embodiments a thermal diode unit is fabricated including a thermally-conductive plastic. A thermal diode unit includes an interior region of the thermal diode unit, the internal region including gas pressure that is not identical to the ambient gas pressure surrounding the thermal diode unit. For example, in some embodiments, a thermal diode unit includes a gas-sealed gap with a gas pressure below ambient atmospheric pressure. For example, in some embodiments, a thermal diode unit includes a gas-sealed gap with a gas pressure above ambient atmospheric pressure. In some embodiments, a thermal diode unit includes a gas-sealed gap including a liquid sealed within the gas-sealed gap. For example, a thermal diode unit can include an evaporative liquid. In some embodiments, a thermal diode unit includes a mesh structure attached to the inner surface of the inner wall of the thermal diode unit, the mesh structure positioned substantially vertically with physical contact along a contiguous surface region of the inner wall. In some embodiments, a mesh structure is affixed to the inner surface of the inner wall with thermal contact between the mesh structure and the majority of the inner surface. In some embodiments, a mesh structure includes a plurality of interior pores, the average dimension of the plurality of interior pores sufficient to conduct the liquid to a top edge of the mesh structure when the thermal diode unit is positioned for use. In some embodiments, a mesh structure includes a plurality of interior pores, the average dimension of the plurality of interior pores less than approximately 100 microns.

In some embodiments, a thermal diode unit designed for use within a temperature-controlled container includes: at least one inner wall configured to be substantially vertical during use of the thermal diode unit; at least one outer wall of a size and shape to align with the at least one inner wall, with a gap formed between the at least one inner wall and the at least one outer wall; a mesh structure affixed to a surface of the at least one inner wall adjacent to the gap; a liquid within the gap; one or more seals between the at least one inner wall and the at least one outer wall, forming a gas-impermeable interior region of the thermal diode unit surrounding the gap; and a gas pressure less than atmospheric pressure within the gas-impermeable interior region. Some embodiments include herein the gas pressure within the gap includes a gas pressure less than the partial gas pressure of the liquid under expected conditions of use of the thermal diode. In some embodiments, a thermal diode unit includes a bottom wall, the bottom wall affixed to the at least one inner wall at a lower edge when the thermal diode unit is positioned for use. In some embodiments, a thermal diode unit further includes: a thermal transfer component including an interior space contiguous with the gas-impermeable interior region of the thermal diode unit. In some embodiments, a thermal diode unit further includes: a thermal transfer component in thermal contact with the gas-impermeable interior region of the thermal diode unit. In some embodiments, a thermal diode unit further includes: a temperature sensor affixed to the thermal diode unit, the temperature sensor attached to a transmission device.

FIG. 18 depicts an embodiment of a temperature-controlled container 110 including a thermal diode unit 1800. The thermal diode unit 1800 shown in FIG. 18 includes a storage section, the storage section including an inner wall and an outer wall, with a gas-sealed gap between the walls. Interior to the inner wall is a temperature-controlled storage region 1810. In the embodiment illustrated, a substantially flat floor section 1840 is attached on its end regions to the inner wall, forming a lower boundary to the temperature-controlled storage region 1810. The floor section 1840 includes an aperture 1860, the aperture configured to permit drainage of excess liquid, such as condensate, from within the temperature-controlled storage region 1810. The aperture 1860 in the floor section 1840 of the thermal diode unit 1800 is positioned and shaped to mate with the aperture 205 in the lower wall of the temperature-controlled container 110.

A mesh structure 1820 is affixed to the interior surface of the inner wall of the thermal diode unit 1800, the mesh structure facing the gas-sealed gap between the walls of the thermal diode unit 1800. A liquid 1830 is positioned within the gas-sealed gap. The liquid 1830 has a surface tension sufficient to permit the liquid to wick upwards within a plurality of pores within the mesh structure 1820. The combination of the average size of the plurality of pores within the mesh structure and the wicking action of the liquid 1830 results in the mesh structure 1820 being substantially saturated with the liquid 1830 along its length and height within the gas-sealed gap. In some embodiments, a mesh structure is a metal foam structure. In some embodiments, a mesh structure is fabricated from paper fibers. In some embodiments, a mesh structure is fabricated from a cloth material. For example, some embodiments include liquid that is pure water, and the mesh structure includes pores with an average diameter of 30 microns, wherein the mesh structure has a vertical height of no more than 0.3 meters. For example, some embodiments include a mesh structure fabricated from copper with pores with an average diameter of approximately 44 microns. A mesh structure is affixed contiguously to the surface of the adjacent wall. For example, in some embodiments a mesh structure is affixed to a wall surface with one or more of: multiple welds, multiple staples, or multiple nails in a configuration to promote surface contact between the mesh structure and the wall surface.

The thermal diode unit 1800 shown in FIG. 18 includes a thermal transfer component 1850 positioned within the conduit 930 of the temperature-controlled container 110. In the embodiment illustrated, the thermal transfer component 1850 forms a substantially cylindrical upright structure, with an internal gas-sealed region attached to the gas-sealed gap in the thermal diode unit 1800. The thermal transfer component 1850 shown in FIG. 18 is positioned to traverse the conduit 930 in the partition 900, with an upper region positioned within the phase change material region 910 of the container 110. During use, liquid from the gas-sealed gap can absorb thermal energy, or heat, through the walls of the thermal diode. Liquid that has become vapor can rise within the gas-sealed gap and flow upward into the interior of the thermal transfer component 1850. Once sufficient thermal energy, or heat, is disseminated through the top region of the thermal transfer component 1850 into the phase change material 960, the vapor then condenses into liquid on the interior surface of the thermal transfer component 1850 and can drip back down into the lower part of the thermal transfer component 1850.

Figure 19:
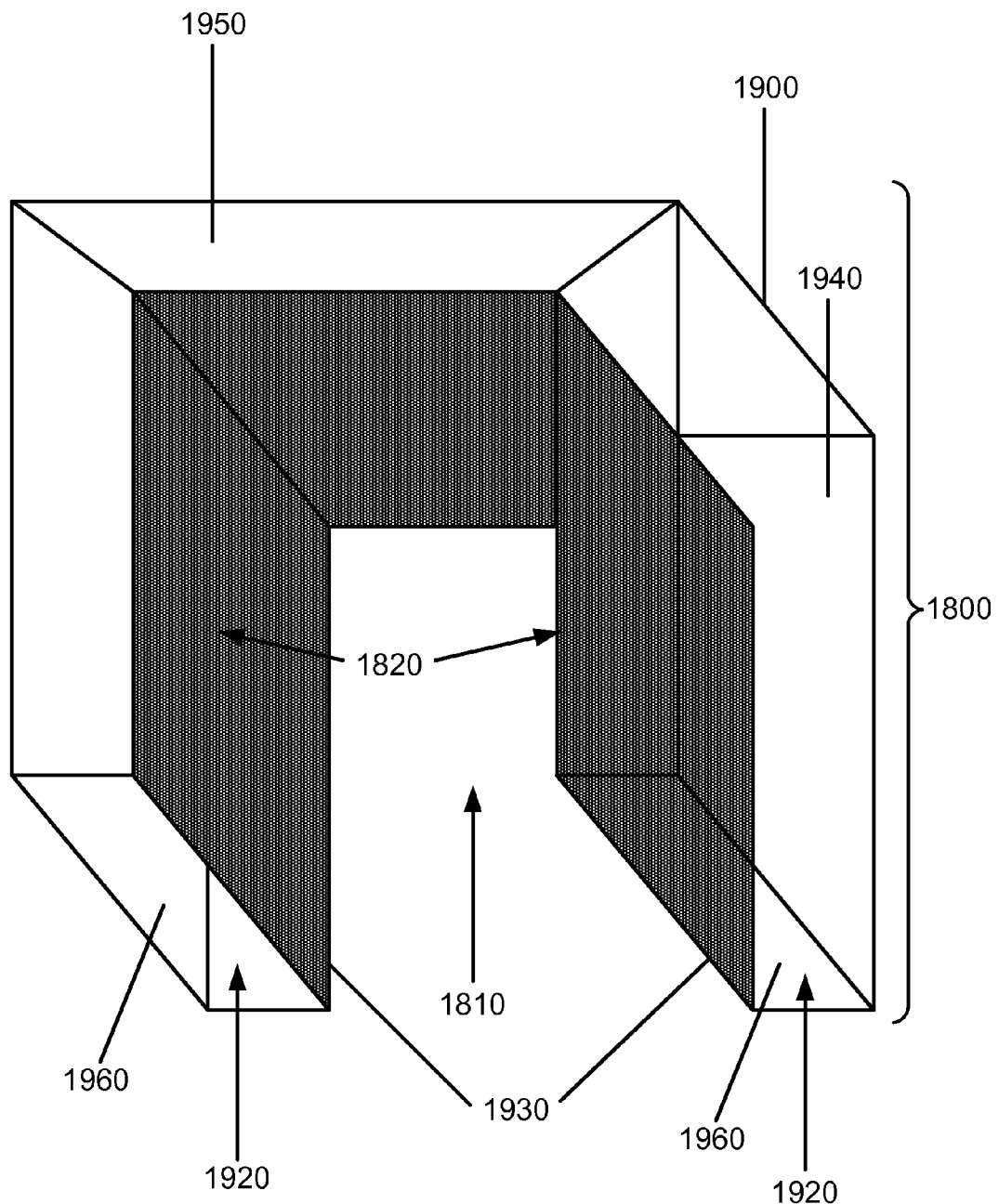
FIG. 19 is a schematic of a thermal diode device.

FIG. 19 depicts aspects of a thermal diode unit 1800. For purposes of illustration, the thermal diode unit 1800 shown in FIG. 19 is depicted independently of a temperature-controlled container. The thermal diode unit is shown from an angled viewpoint to illustrate features of the thermal diode unit 1800. Although a thermal diode unit 1800 would generally be constructed using opaque materials, for purposes of illustration FIG. 19 includes views through solid components into interior sections of the thermal diode unit 1800. The thermal diode unit 1800 shown in FIG. 19 is configured in a substantially boxlike shape, with the top, bottom and one side of the boxlike shape formed without walls across those regions. The open side of the thermal diode unit 1800 can, for example, be positioned within a temperature-controlled container in a position adjacent to a door in the temperature-controlled container, in order to permit access to the interior region of the temperature-controlled container. The thermal diode unit includes a temperature-stabilized interior region 1910. When the thermal diode unit 1800 is positioned for use within a storage region of a temperature-controlled container, the temperature-stabilized interior region 1910 can be utilized for storage of materials within the predetermined range of the temperature-stabilized interior region 1910. For example, in some embodiments a thermal diode unit is configured to maintain stored pharmaceutical agents, such as vaccines, within a 2° C. to 8° C. predetermined temperature range. For example, in some embodiments a thermal diode unit is configured to maintain stored pharmaceutical agents, such as vaccines, within a 0° C. to 10° C. predetermined temperature range. For example, in some embodiments a thermal diode unit is configured to maintain stored medical samples, such as serum, within a −15° C. to −25° C. predetermined temperature range.

In the embodiment illustrated in FIG. 19, the thermal diode unit 1800 includes three outer walls 1900 positioned at substantially right angles to each other. The edges of the outer walls 1900 are sealed together at their junctions with a gas-impermeable seal. For example, in some embodiments a thermal diode unit is constructed of aluminum, and the edges of the outer walls are welded together. The thermal diode unit 1800 also includes three inner walls 1930 positioned in parallel to their respective outer walls 1900. The inner walls 1930 are sealed together at their junctions with a gas-impermeable seal. For example, in some embodiments a thermal diode unit is constructed of aluminum, and the edges of the inner walls are welded together. The thermal diode unit shown in FIG. 19 includes a lower gas-impermeable seal 1940 connecting the lower edges of the inner walls 1930 and the lower edges of the outer walls 1900. For example, in some embodiments a thermal diode unit is constructed of aluminum, and the lower gas-impermeable seal is fabricated from a planar sheet of aluminum of a size and shape to position the outer walls and the inner walls substantially parallel to each other, the lower gas-impermeable seal welded to the outer walls and the inner walls at the respective edges of each component. The thermal diode unit 1800 shown in FIG. 19 includes an upper gas-impermeable seal 1950 connecting the upper edges of the inner walls 1930 and the upper edges of the outer walls 1900. For example, in some embodiments a thermal diode unit is constructed of aluminum, and the upper gas-impermeable seal is fabricated from a planar sheet of aluminum of a size and shape to position the outer walls and the inner walls substantially parallel to each other, the upper gas-impermeable seal welded to the outer walls and the inner walls at the respective edges of each component. The thermal diode unit 1800 shown in FIG. 19 includes side gas-impermeable seals 1960, connecting the edge of the inner walls 1930, the edge of the outer walls 1900, the edge of the upper gas-impermeable seal 1950 and the edge of the lower gas-impermeable seal 1950. For example, in some embodiments a thermal diode unit is constructed of aluminum, and the side gas-impermeable seal is fabricated from a planar sheet of aluminum of a size and shape to position the outer walls and the inner walls substantially parallel to each other, the side gas-impermeable seal welded to the outer walls, the inner walls, the upper gas-impermeable seal, and the lower gas-impermeable seal at the respective edges of each component.

The thermal diode unit 1800 includes a mesh structure 1820 affixed to the interior surface of the inner wall 1930, facing the gas-sealed gap 1920. The mesh structure includes a pore structure with pores of sizes to permit wicking of a liquid within the gas-sealed gap up the height of the mesh structure. The gas-sealed gap 1920 also includes a gas pressure predicted to permit the liquid to evaporate into its vapor phase during expected use of the thermal diode 1800. For example, in some embodiments a gas-sealed gap 1920 includes a gas pressure below ambient atmospheric pressure. For example, in some embodiments a gas-sealed gap 1920 includes a gas pressure above ambient atmospheric pressure.

Figure 20:
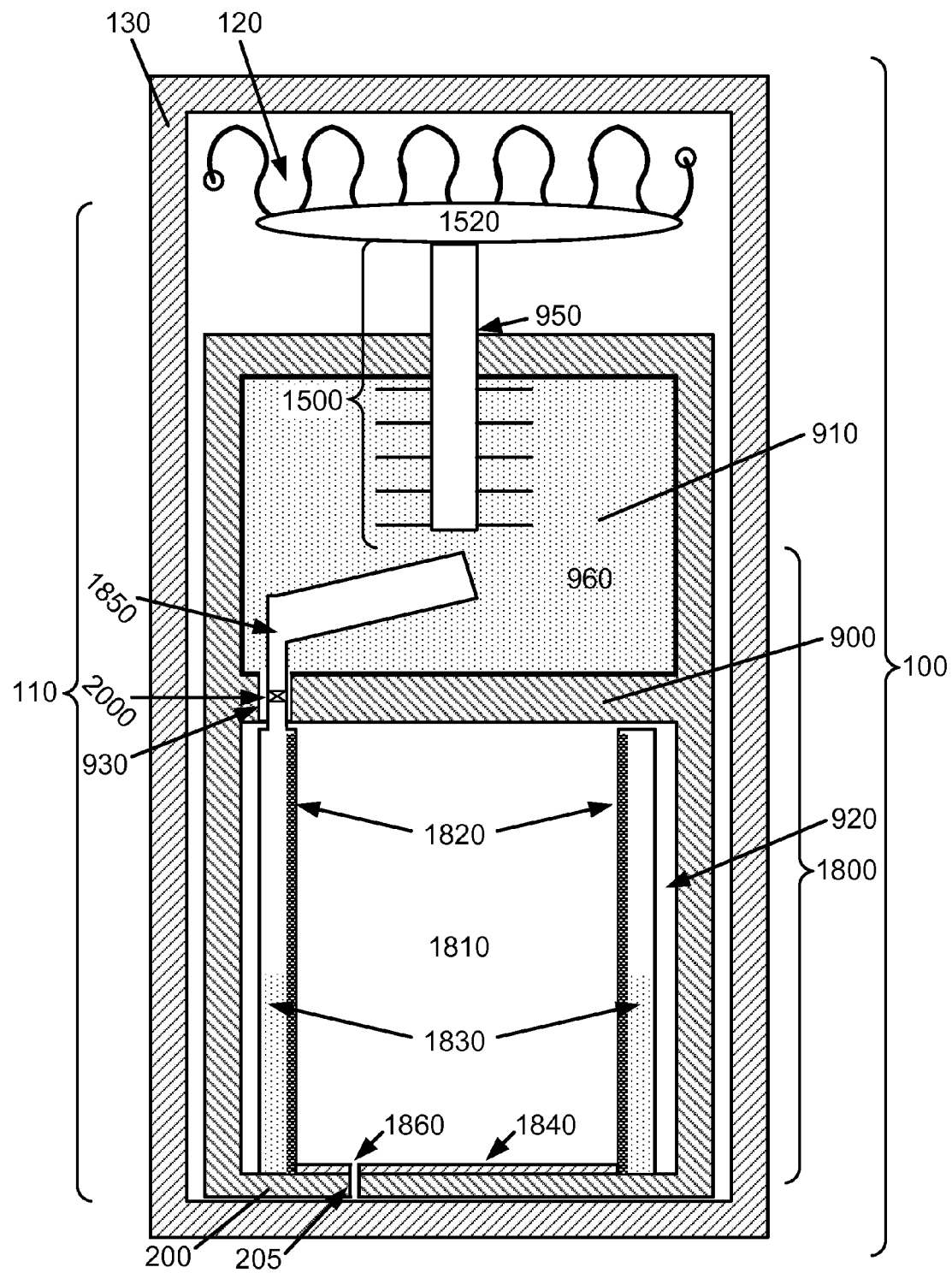
FIG. 20 is a schematic of a temperature-controlled container in use within a refrigeration device.

FIG. 20 illustrates an embodiment of a temperature-controlled container 110 within a refrigeration device 100. The refrigeration device 100 includes walls 130 surrounding the temperature-controlled container 110. For purposes of illustration, the refrigeration device 100 is shown without a door. FIG. 20 shows a temperature-controlled container 110 within the internal storage region of a refrigeration device 100. The refrigeration coils 120 of the refrigeration device 100 are exposed in the illustration of FIG. 20, although in some embodiments the depicted features of the container adjacent to the refrigeration coils are behind a panel or screen of the refrigeration device 100.

The embodiment shown in FIG. 20 includes one or more sections of insulation material substantially defining one or more walls 200 of a temperature-controlled container 110, the temperature-controlled container 110 including an internal region. The embodiment includes a thermally-insulated partition 900 dividing the internal region to form a storage region 920 and a phase change material region 910 internal to the container 110, the thermally-insulated partition including a conduit 930 between the storage region 920 and the phase change material region 910. Phase change material 960 is positioned within the phase change material region 910. The illustrated temperature-controlled container 110 includes a thermal diode unit 1800 within the storage region 920, the thermal diode unit 1800 including a thermal transfer component 1850 traversing the conduit 930. In the illustrated embodiment, the thermal transfer component 1850 extends beyond the conduit into the interior region of the phase change material region 910. The end of the thermal transfer component 1850 is a tubular structure positioned at an angle relative to the plane of the dominant axis of the partition 900.

In the embodiment shown in FIG. 20, a temperature-dependent valve 2000 is positioned within the thermal transfer component 1850 at a position adjacent to the partition 900. The temperature-dependent valve 2000 is positioned and calibrated to reversibly restrict gas flow within the thermal transfer component 1850 relative to the temperature within the thermal transfer component 1850. A temperature-dependent valve is positioned and configured to permit condensed liquid to flow through the temperature-dependent valve from the upper region of the thermal transfer component to the lower region of the thermal transfer component. In some embodiments, the container includes a primary valve positioned and configured to regulate the thermal gradient from the storage region to the phase change material region, and a secondary return valve positioned and configured to permit condensed liquid to flow through the return valve from the upper region of the thermal transfer component to the lower region of the thermal transfer component. In some embodiments, the thermal transfer component includes an adiabatic zone, for example at a position adjacent to the partition. For example, in some embodiments, a temperature-dependent valve within a thermal transfer component is calibrated to reversibly open, or permit greater gas flow, when the temperature within the thermal transfer component is greater than a predetermined value. For example, in some embodiments, a temperature-dependent valve within a thermal transfer component is calibrated to reversibly open when the temperature within the thermal transfer component is greater than a predetermined value of 6° C. For example, in some embodiments, a temperature-dependent valve within a thermal transfer component is calibrated to reversibly open when the temperature within the thermal transfer component is greater than a predetermined value of 8° C. For example, in some embodiments, a temperature-dependent valve within a thermal transfer component is calibrated to reversibly open when the temperature within the thermal transfer component is greater than a predetermined value of 10° C. For example, in some embodiments, a temperature-dependent valve within a thermal transfer component is calibrated to reversibly close, or restrict gas flow, when the temperature within the thermal transfer component is lower than a predetermined value. For example, in some embodiments, a temperature-dependent valve within a thermal transfer component is calibrated to reversibly open when the temperature within the thermal transfer component is lower than a predetermined value of 4° C. For example, in some embodiments, a temperature-dependent valve within a thermal transfer component is calibrated to reversibly open when the temperature within the thermal transfer component is lower than a predetermined value of 2° C. For example, in some embodiments, a temperature-dependent valve within a thermal transfer component is calibrated to reversibly open when the temperature within the thermal transfer component is lower than a predetermined value of 0° C.

In some embodiments, the temperature-dependent valve can reversibly substantially close the space across the thermal transfer component. For example, in some embodiments, a temperature-dependent valve is a solenoid or ball valve. In some embodiments, the temperature-dependent valve can reversibly partially close the space across the thermal transfer component. For example, in some embodiments, a temperature-dependent valve includes one or more louvers positioned to partially block the space across the width of the thermal transfer component. In some embodiments, the temperature-dependent valve is a passive valve, such as a "refrigerant bulb," which is a bulb containing refrigerant wherein the pressure of the refrigerant reversibly actuates the bulb. In some embodiments, the temperature-dependent valve is a passive temperature-dependent valve including a thermally-responsive bimetallic element. In some embodiments, the temperature-dependent valve is an active temperature-dependent valve, such as a solenoid, motorized ball valve, or one or more motorized louvers. In embodiments wherein the temperature-dependent valve is an active temperature-dependent valve, it can be operably attached to a control system including elements such as one or more temperature sensors, one or more motors, a power source, and a controller.

The illustrated embodiment of FIG. 20 also includes an aperture 950 within a section of the insulation material substantially defining the container 110, the aperture 950 between the phase change material region 910 internal to the container and an external surface of the container 110. The embodiment includes a unidirectional thermal conductor 1500 positioned within the aperture 950, the unidirectional thermal conductor 1500 configured to transmit heat in a direction from the phase change material region 910 to the external surface of the container 110. The unidirectional thermal conductor 1500 includes attached fin structures. The embodiment also includes an attachment unit 1520, the attachment unit 1520 positioned between the end of the unidirectional thermal conductor 1500 outside of the container 110 and the refrigeration coils 120 of the refrigeration device 100.

Figure 21:
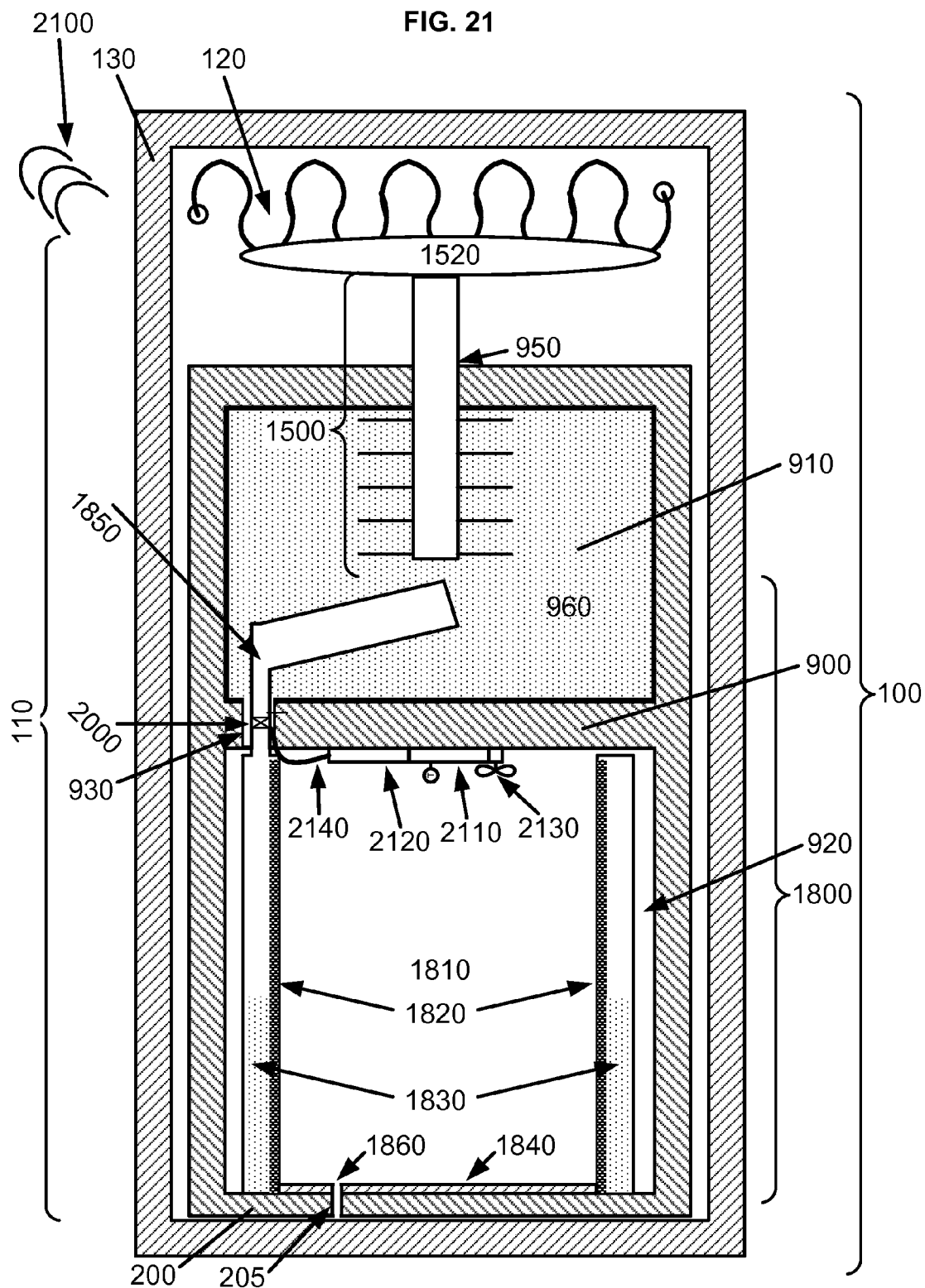
FIG. 21 is a schematic of a temperature-controlled container in use within a refrigeration device.

FIG. 21 illustrates an embodiment of a temperature-controlled container 110 within a refrigeration device 100. The refrigeration device 100 includes walls 130 surrounding the temperature-controlled container 110. For purposes of illustration, the refrigeration device 100 is shown without a door. FIG. 21 shows a temperature-controlled container 110 within the internal storage region of a refrigeration device 100. The refrigeration coils 120 of the refrigeration device 100 are exposed in the illustration of FIG. 21, although in some embodiments the depicted features of the container adjacent to the refrigeration coils are behind a panel or screen of the refrigeration device 100. In some embodiments, the unidirectional thermal conductor 1500 traverses an air duct within the refrigeration device 100 in order to connect with the refrigeration coils 120 as shown in FIG. 21.

In the embodiment shown in FIG. 21, a temperature-dependent valve 2000 is positioned within the thermal transfer component 1850 at a position adjacent to the partition 900. In some embodiments, a temperature-dependent valve can be a passive valve that reversibly opens and closes in response to the temperature of the temperature-dependent valve. In some embodiments, a temperature-dependent valve can be attached to a controller and responsive to a temperature sensor. The connection can include a physical connector, such as a wire. The connection can include a transmitted connection, including components such as a radio frequency (RF) signal transmitter and receiver. As shown in FIG. 21, a wire connector 2140 is attached between the temperature-dependent valve 2000 and a controller 2120. The controller 2120 illustrated in FIG. 21 is attached to a surface of the partition 900 facing the storage region 920 at a position adjacent to the temperature-controlled storage region 1810. A battery can be connected to the controller to provide power for the operation of the controller. For example, in some embodiments, a lithium ion battery can be attached to the controller. In some embodiments, a controller is attached to the power system for the refrigeration device. For example, a controller can be operationally attached to the power system of the refrigeration device with a wire connector. The controller 2120 is attached to the temperature-dependent valve 2000 in a manner to reversibly control the operation of the temperature-dependent valve 2000. For example, in some embodiments a controller is attached with a wire connector to a motorized valve that is configured to reversibly open and close in response to signals transmitted from the controller.

In the embodiment illustrated in FIG. 21, a temperature sensor 2110 is attached to the controller 2120. The temperature sensor 2110 is affixed to the surface of the partition 900 at a position adjacent to the controller 2120. Some embodiments include a controller unit, wherein modules such as a controller, a temperature sensor, a memory device, a transmitter, and a battery unit can be integrated into a single unit for ease of operations. A temperature sensor 2110 can include a transmitter configured to send signals 2100. For example, a temperature sensor can, in some embodiments, include a passive radio-frequency (RF) transmitter configured to transmit the most recent temperature reading from the temperature sensor in response to a RF signal. For example, a temperature sensor can, in some embodiments, include an active transmitter configured to send signals including encoded temperature data on a regular basis, for example hourly. For example, a temperature sensor can include a Bluetooth® device. In the embodiment shown in FIG. 21, a fan unit 2130 is attached to the temperature sensor 2110. A fan unit can, for example, be attached to a temperature sensor in a responsive manner. For example, a fan unit can be configured to turn on when the temperature sensor indicates a temperature value above a predetermined level. For example, a fan unit can be configured to turn off when the temperature sensor indicates a temperature value below a predetermined level. In some embodiments, a fan unit is configured to operate at predetermined time intervals, or continuously. In some embodiments, a fan unit is configured to turn on after the door to the temperature-controlled container is opened and closed, and to operate for a predetermined period of time after the door is closed.

Figure 22:
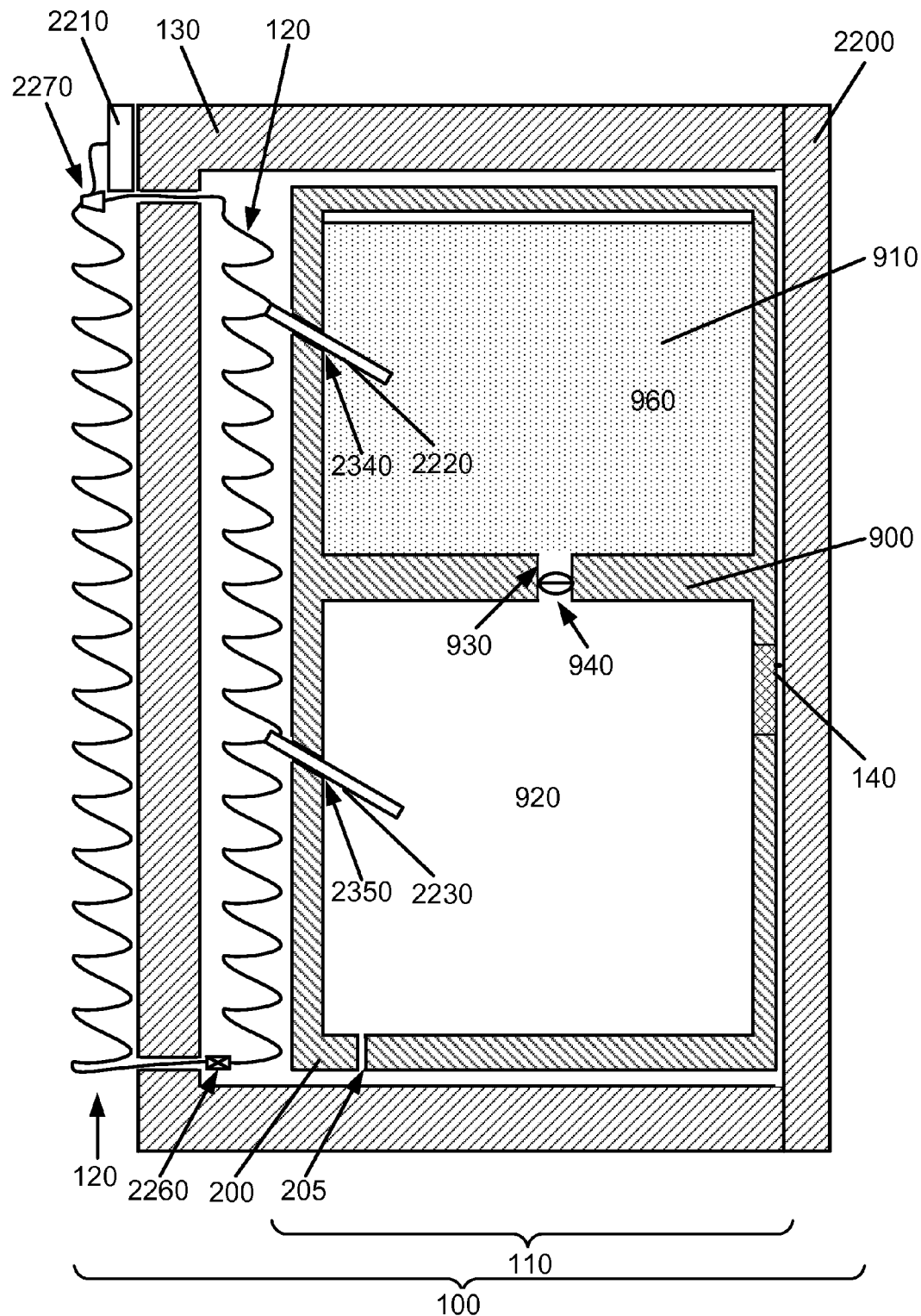
FIG. 22 is a schematic of a temperature-controlled container in use within a refrigeration device.

FIG. 22 illustrates an embodiment of a temperature-controlled container 110 within a refrigeration device 100. The view shown in FIG. 22 is a substantially cross-section view of the temperature-controlled container 110 within the refrigeration device 100. The refrigeration device 100 is surrounded by walls 130. The refrigeration device 100 includes a door 2200 positioned at the front of the refrigeration device 100, the door 2200 configured to be reversibly opened to access the contents of the interior of the refrigeration device 100. A temperature-controlled container 110 is positioned within the storage area within the refrigeration device 100. The temperature-controlled container 110 includes one or more sections of insulation material 200 substantially defining the walls of the temperature-controlled container 110. The temperature-controlled container 110 includes an aperture in the one or more sections of insulation material 200 at a position adjacent to the door 2200 of the refrigeration device, and a door 140 configured to reversibly mate with the aperture. An aperture 205 is positioned at the lower face of the temperature-controlled container 110, the aperture configured to allow liquid to flow from the interior of the storage region 920 to a point exterior to the container with minimal heat transfer into the storage region 920.

The temperature-controlled container 110 includes a thermally-insulated partition 900 dividing the internal region to form a storage region 920 and a phase change material region 910 internal to the temperature-controlled container 110. The thermally-insulated partition 900 includes a conduit 930 between the storage region 920 and the phase change material region 910. Phase change material 960 is positioned within the phase change material region 910. A thermal control device 940 is positioned within the conduit 930. In the embodiment shown, the thermal control device 940 is a passive valve configured to reversibly restrict thermal energy flow, or heat, rising from the interior of the storage region 920 to the phase change material region 910.

The refrigeration device 100 illustrated in FIG. 22 includes a set of refrigeration coils 120. In some embodiments, a refrigeration device can include a back panel or interior partition between the refrigeration coils and the interior of the refrigeration device. During installation of some embodiments of a temperature-controlled container, the panel or partition can be removed or modified as appropriate for the embodiment. The set of refrigeration coils depicted in FIG. 22 includes a section interior to the refrigeration device and a section exterior to the refrigeration device. The set of refrigeration coils 120 shown in FIG. 22 is part of a vapor-compression system, and also includes a compressor 2270 and an expansion valve 2260. A controller 2210 is connected to the set of refrigeration coils 120 through the compressor 2270. In some embodiments, the refrigeration device can be, for example, a heat-pump based system.

In the embodiment shown in FIG. 22, the rear-facing section of insulation material 200 of the temperature-controlled container 110 includes a first aperture 2340 at a position adjacent to the phase change material region 910. A first unidirectional thermal conductor 2220 is positioned traversing the first aperture 2340, the unidirectional thermal conductor 2220 including an outer surface configured to reversibly mate with the interior surface of the first aperture 2340. The first unidirectional thermal conductor 2220 includes a first end positioned within the phase change material 960 and a second end positioned to be in thermal contact with the set of refrigeration coils 120. The rear-facing section of insulation material 200 of the temperature-controlled container 110 includes a second aperture 2350 at a position adjacent to the storage region 920 of the temperature-controlled container 110. A second unidirectional thermal conductor 2230 is positioned traversing the second aperture 2350, the second unidirectional thermal conductor 2230 including an outer surface configured to reversibly mate with the interior surface of the second aperture 2350. The second unidirectional thermal conductor 2230 includes a first end positioned within the storage region 930 and a second end positioned to be in thermal contact with the set of refrigeration coils 120.

Figure 23:
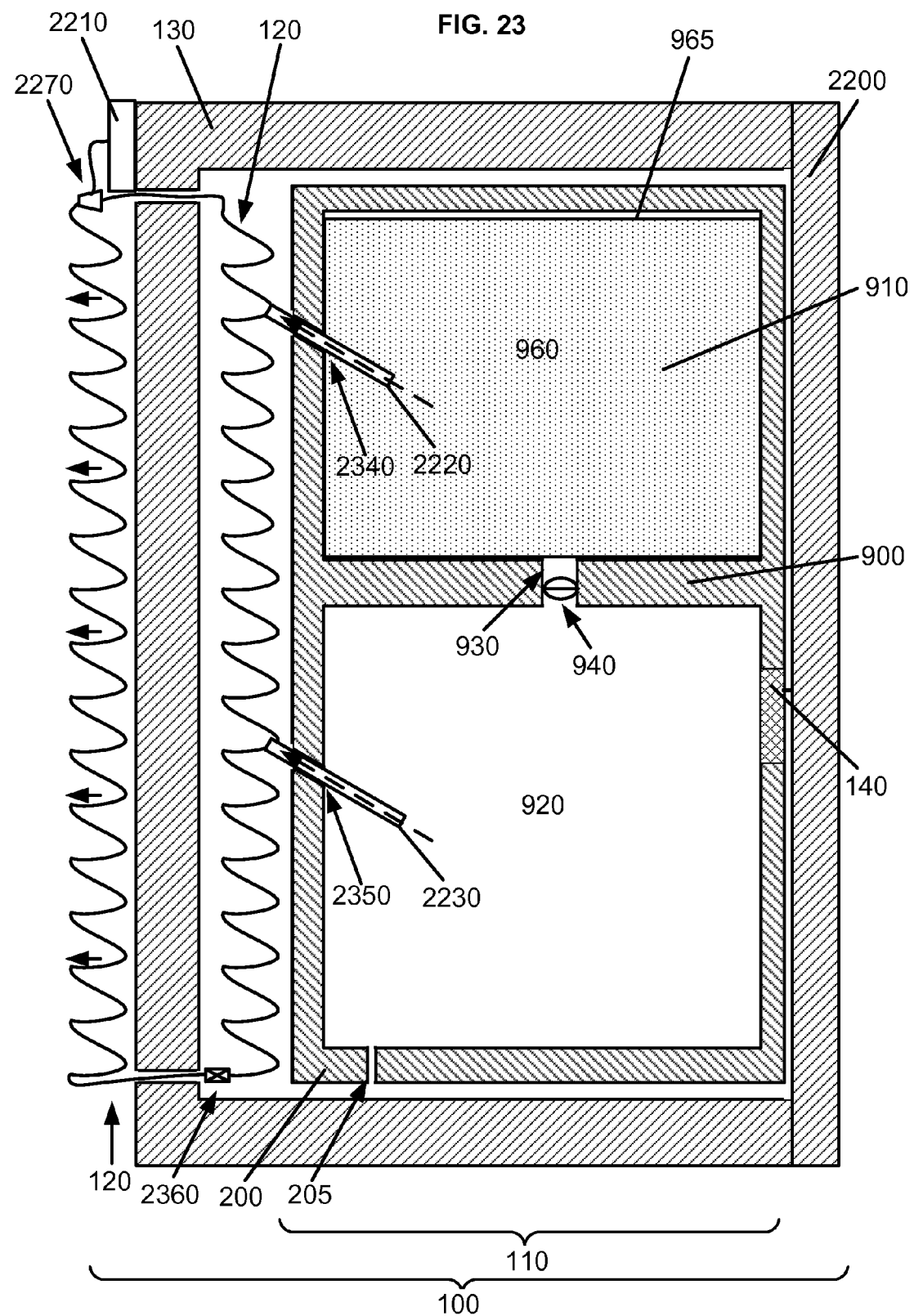
FIG. 23 is a schematic of a temperature-controlled container in use within a refrigeration device.

FIG. 23 illustrates aspects of an embodiment of a temperature-controlled container 110 in use. While the controller 2210 of the refrigeration device 100 is operating to turn on the compressor 2270, thermal energy, or heat, is being absorbed by the set of refrigeration coils 120 at positions within the refrigeration device 100 and radiated outward by the set of refrigeration coils 120 at positions exterior to the refrigeration device 100. In the illustration of FIG. 23, thermal energy, or heat, is illustrated as dotted lines. Corresponding to the thermal energy transfer within the refrigeration coils 120, thermal energy is transferred from the "hot" ends of both the first unidirectional thermal conductor 2220 and the second unidirectional thermal conductor 2230 to the set of refrigeration coils 120. Correspondingly, the ends of the first unidirectional thermal conductor 2220 and the second unidirectional thermal conductor 2230 within the temperature-controlled container 110 cool down while the controller 2210 is operating the compressor 2270 during operation of the refrigeration device. In some embodiments, a first compressor of the refrigeration device is removed and a second compressor is added during installation of a temperature-controlled container. In some embodiments, a compressor integral to the refrigeration device is modified and electrically connected to a temperature-controlled container during installation of the temperature-controlled container. In some embodiments, a thermostat integral to the refrigeration device is modified and electrically connected to a temperature-controlled container during installation of the temperature-controlled container.

Figure 24:
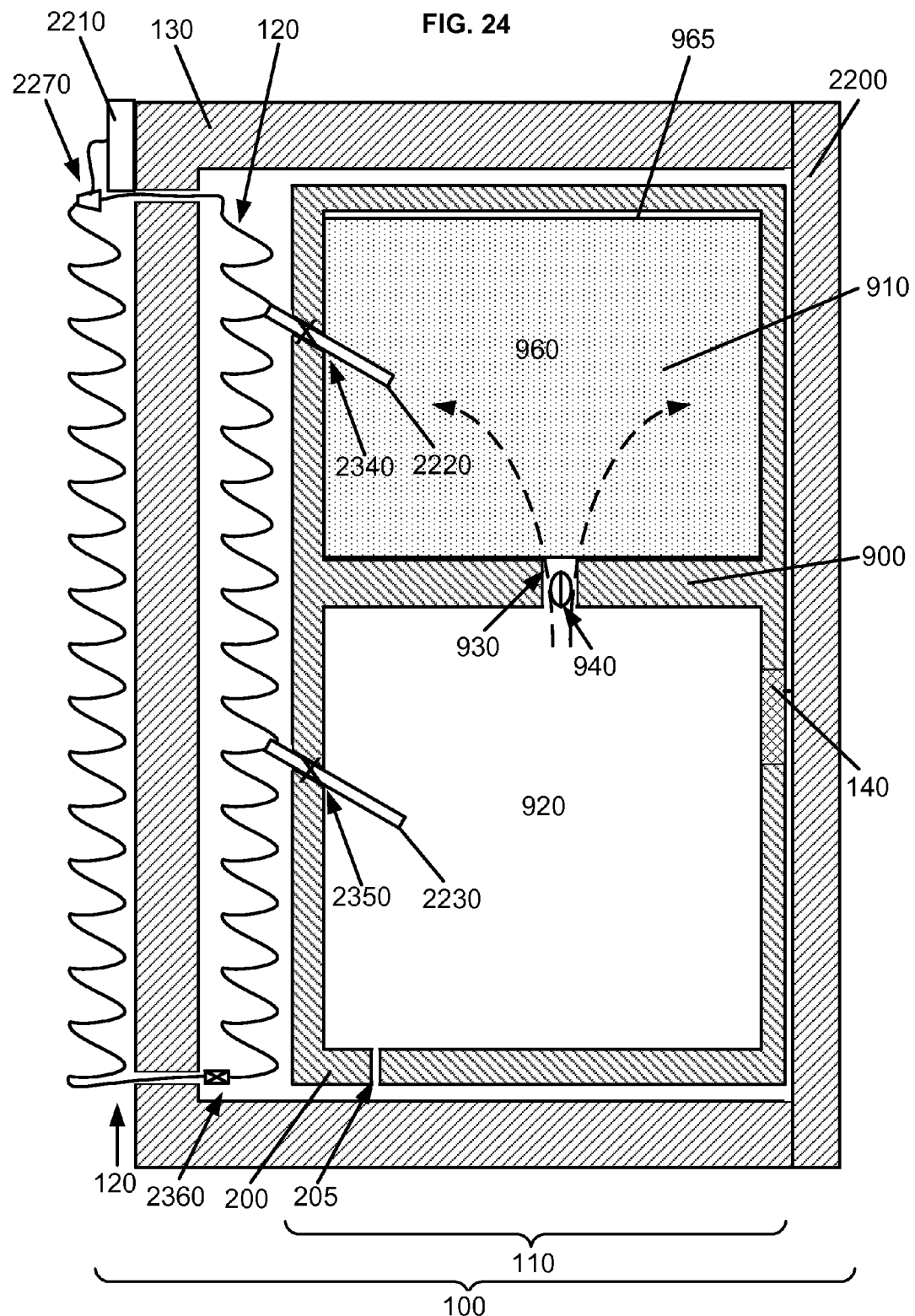
FIG. 24 is a schematic of a temperature-controlled container in use within a refrigeration device illustrating heat transfer within the device.

FIG. 24 illustrates an embodiment similar to that shown in FIG. 22, during a time when the refrigeration device 100 is not operational, such as when electrical power is not available. The embodiment shown in FIG. 24 is similar to that shown in FIGS. 22 and 23, with the exception that the compressor 2270 of the refrigeration device 100 is not operating during the time illustrated in FIG. 24, for example due to a lack of electricity to the system.

In some embodiments, operation of the compressor of a refrigeration device during normal operation of the refrigeration device serves to remove thermal energy, or heat, from the interior of the phase change material region and the storage region of a temperature-controlled container. This cools both regions within the temperature-controlled container during periods when the refrigeration device is operational, such as when it has power available. During low power or no power conditions (e.g. an electrical blackout), thermal transfer through the unidirectional thermal conductors is substantially reduced once the interior of the set of refrigeration coils is no longer actively cooling, and thereby not establishing and maintaining a thermal gradient through the unidirectional thermal conductors. This lack of thermal transfer is illustrated as an "X" mark across the first unidirectional thermal conductor 2220 and the second unidirectional thermal conductor 2230 in FIG. 24. If the refrigeration coils are not operational and the interior of the storage region rises to a temperature above the predetermined temperature for operation of the thermal control device within the partition, the thermal control device will open the space through the conduit in the partition. This is shown in FIG. 24 with the "open" position of the thermal control device 940. Subsequently, thermal energy, or heat, (illustrated as dotted lines in FIG. 24) will naturally flow through the conduit from the storage region into the phase change material region, causing cooling of the storage region. Thermal energy, or heat, will be retained within the phase change material within the phase change material region. As a result, the storage region 920 will experience temperature-regulated cooling even in the absence of electrical power flow to the refrigeration device. In some embodiments, a temperature-controlled container within a refrigeration device can be configured to maintain an internal temperature below 8° C. for at least 3 days in the absence of electrical power to the refrigeration device. In some embodiments, a temperature-controlled container within a refrigeration device can be configured to maintain an internal temperature below 8° C. for at least one week in the absence of electrical power to the refrigeration device. In some embodiments, a temperature-controlled container within a refrigeration device can be configured to maintain an internal temperature below 8° C. for at least 30 days in the absence of electrical power to the refrigeration device.

Figure 25:
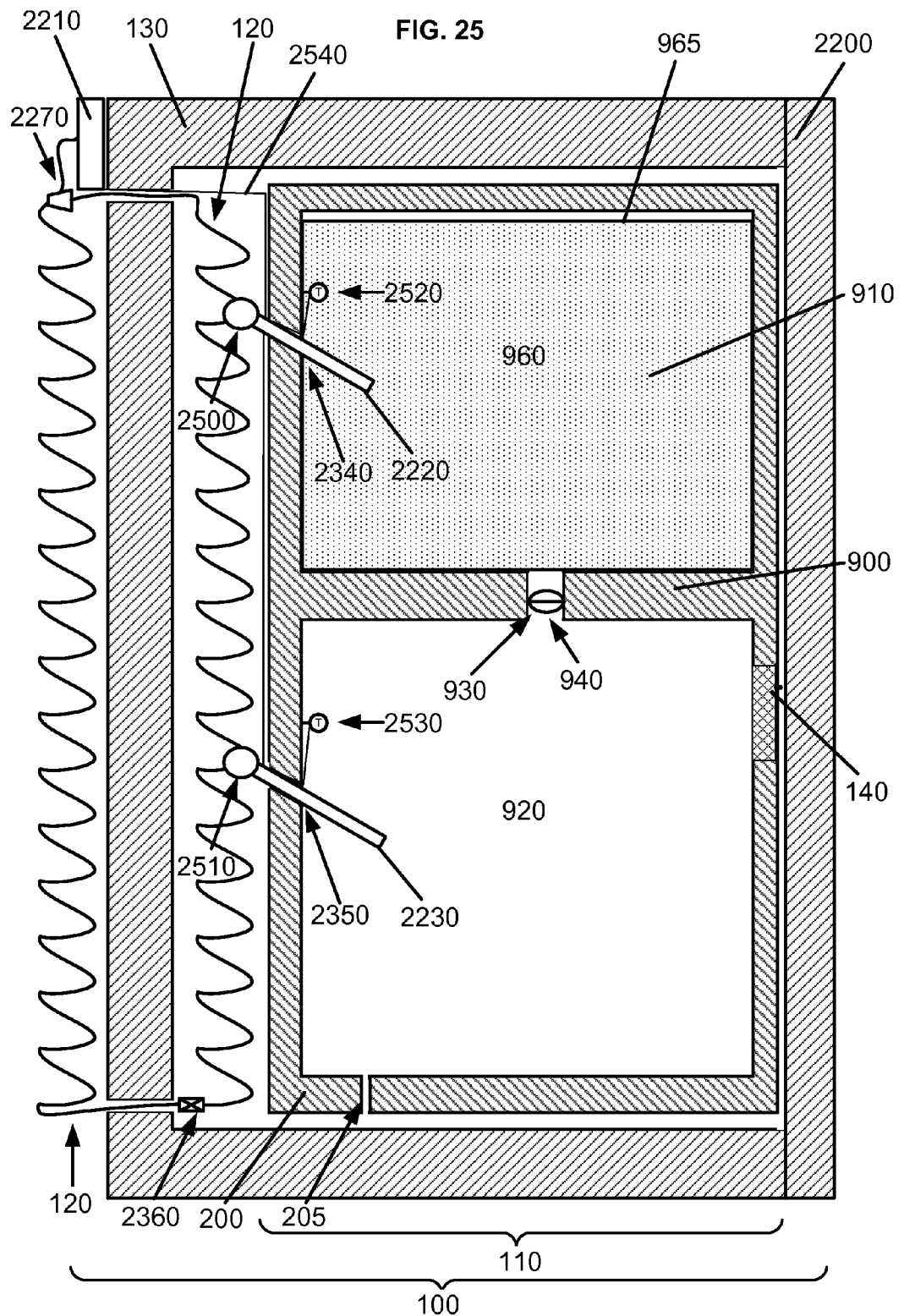
FIG. 25 is a schematic of a temperature-controlled container in use within a refrigeration device.

FIG. 25 illustrates aspects of a temperature-controlled container 110 within a refrigeration device 110. The view shown in FIG. 25 is similar to that of the preceding FIGS. 22, 23 and 24. The temperature-controlled container 110 includes one or more sections of insulation material 200 substantially defining the walls of the temperature-controlled container 110. An aperture 205 is positioned in the one or more sections of insulation material 200 at the lower face of the temperature-controlled container 110, the aperture 205 configured to allow liquid to flow from the interior of the storage region 920 to a point exterior to the container with minimal heat transfer into the storage region 920.

In the embodiment illustrated in FIG. 25, the rear-facing section of insulation material 200 of the temperature-controlled container 110 includes a first aperture 2340 at a position adjacent to the phase change material region 910. A first unidirectional thermal conductor 2220 is positioned traversing the first aperture 2340, the unidirectional thermal conductor 2220 including an outer surface configured to reversibly mate with the interior surface of the first aperture 2340. The first unidirectional thermal conductor 2220 is thermally attached to the set of refrigeration coils 120 with a first attachment unit 2500. An attachment unit can include, for example, thermally-conductive metal connectors positioned between the end of the unidirectional thermal conductor and the surface of the set of refrigeration coils. The rear-facing section of insulation material 200 of the temperature-controlled container 110 includes a second aperture 2350 at a position adjacent to the storage region 920 of the temperature-controlled container 110. A second unidirectional thermal conductor 2230 is positioned traversing the second aperture 2350, the second unidirectional thermal conductor 2230 including an outer surface configured to reversibly mate with the interior surface of the second aperture 2350. The second unidirectional thermal conductor 2220 is thermally attached to the set of refrigeration coils 120 with a second attachment unit 2510.

In some embodiments, a temperature-controlled container includes one or more temperature sensors positioned within the temperature-controlled container. For example, a temperature-controlled container can include electronic temperature sensors. The electronic temperature sensors can be, for example, connected to an electronic controller. The electronic temperature sensors can be, for example, connected to a transmitter. The electronic temperature sensors can be, for example, connected to a circuitry system configured for monitoring the internal temperature of the temperature-controlled container. In some embodiments, electronic temperature sensors positioned within the temperature-controlled container can be connected to a controller that is integral to the refrigeration device. In some embodiments, electronic temperature sensors positioned within the temperature-controlled container can be connected to a controller that is independent of the refrigeration device.

The embodiment shown in FIG. 25 includes a first temperature sensor 2520 positioned within the phase change material region 910 of the container. The temperature-controlled container 110 includes a second temperature sensor 2530 positioned within the storage region 920 of the temperature-controlled container 110. Both the first temperature sensor 2520 and the second temperature sensor 2530 are connected by a wire connector 2540 to the controller 2210 of the refrigeration device 100. The controller 2210 of the refrigeration device 100 can be, for example, configured to operate responsively to information sent from the first temperature sensor 2520 and/or the second temperature sensor 2530 through the wire connector 2540.

Figure 26:
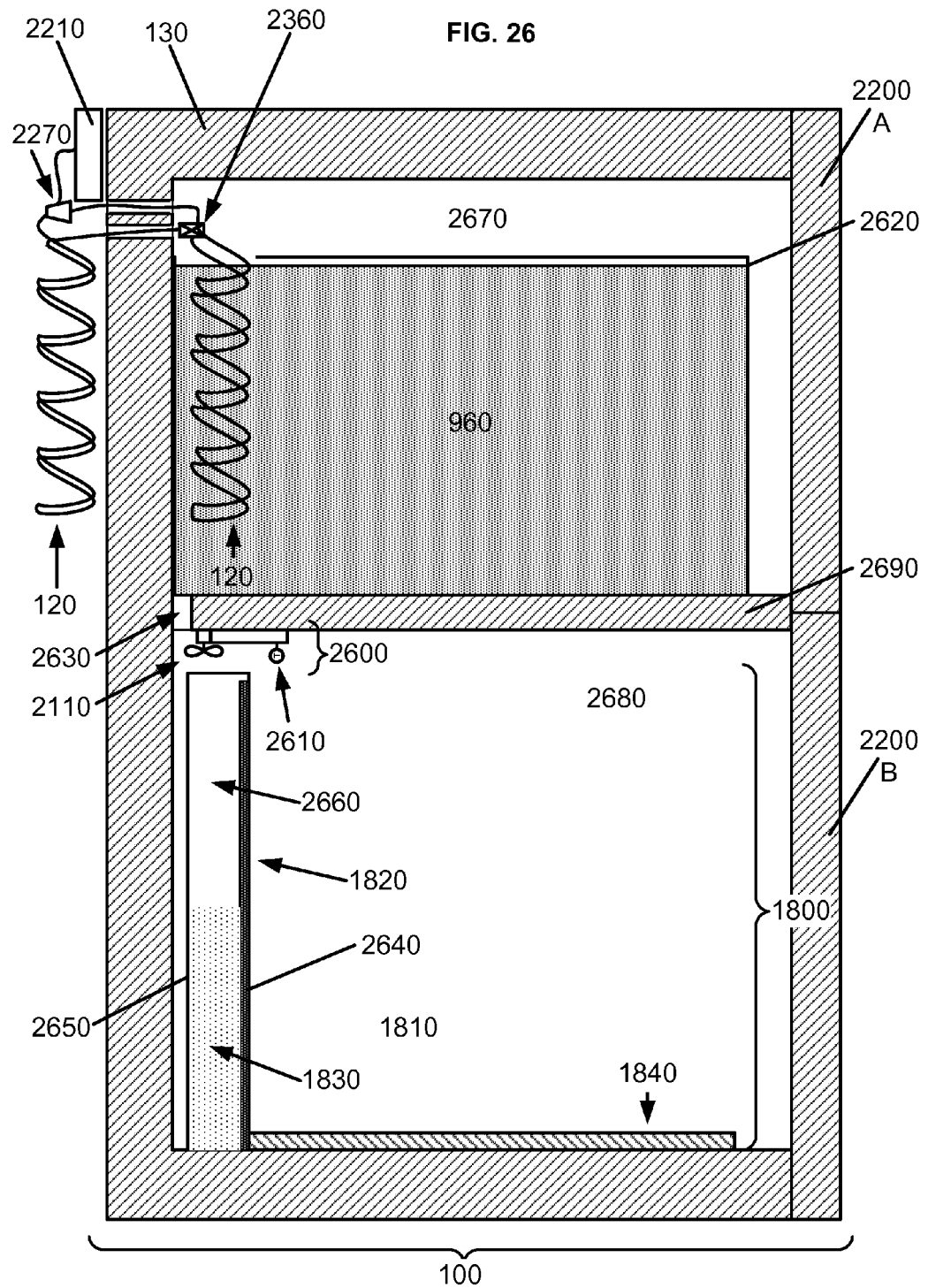
FIG. 26 is a schematic of a temperature-controlled container in use within a refrigeration device.

FIG. 26 illustrates aspects of a thermal diode unit 1800 in use within a refrigeration device 100. The refrigeration device 100 is depicted in a substantially cross section view. The refrigeration device 100 is configured to include a freezer region 2670 and a refrigeration region 2680. The refrigeration device 100 includes a freezer region door 2200 A and a refrigeration region door 2200 B, each of which operate independently to allow a user to access the respective regions. The refrigeration device 100 includes outer walls 130 and an internal divider 2690 between the freezer region 2670 and the refrigeration region 2680. The internal divider 2690 includes an aperture 2630 that permits air to circulate between the freezer region 2670 and the refrigeration region 2680. A set of refrigeration coils 120 is positioned with sections internal to the freezer region 2670. A controller 2210 is connected to a compressor 2270 on the set of refrigeration coils 120. An evaporative valve 2360 is attached to the set of refrigeration coils 120. In some refrigeration devices, a panel or internal wall covers the internal section of the refrigeration coils and/or an internal aperture. Such a panel or internal wall can be modified or removed by a user to create a configuration such as shown in FIG. 26.

In the embodiment shown in FIG. 26, a thermal diode unit is positioned within the refrigeration region 2680 of the refrigeration device 100. The thermal diode unit 1800 includes an inner vertical wall 2640 and an outer vertical wall 2650 with a gas-sealed gap 2660 located between the inner vertical wall 2640 and the outer vertical wall 2650. A liquid 1830 is positioned within the gas-sealed gap. A substantially flat floor section 1840 is attached on its end region to the inner vertical wall 2640. The combination of the floor section 1840 and the inner vertical wall 2640 form boundaries to the temperature-controlled storage region 1810 within the thermal diode unit 1800. A mesh structure 1820 is affixed to the interior surface of the inner wall of the thermal diode unit 1800, the mesh structure facing the gas-sealed gap between the inner vertical wall 2640 and the outer vertical wall 2650 of the thermal diode unit 1800. The top of the thermal diode unit 1800 is positioned adjacent to the aperture 2630 in the internal divider 2690 of the refrigeration device 100.

In the embodiment shown in FIG. 26, a temperature equalizer unit 2600 is attached to the internal divider 2690 on the surface adjacent to the refrigeration region 2680 of the refrigeration device 100. The temperature equalizer unit 2600 is positioned adjacent to the aperture 2630 in the internal divider 2690. The temperature equalizer unit 2600 includes a temperature sensor 2610 and a fan unit 2110. The fan unit 2110 is positioned to encourage air movement through the internal divider 2690, thereby transmitting thermal energy, or heat, upwards from the refrigeration region 2680 to the freezer region 2670. In some embodiments, a temperature equalizer unit is integral to the refrigeration device and controlled by the controller to the refrigeration device. In some embodiments, a temperature equalizer unit operates independently of the controller to the refrigeration device. For example, a temperature equalizer unit can include a battery and controller, and can be installed at the same time as a thermal diode unit.

As shown in FIG. 26, a phase change material container 2620 is positioned within the freezer region 2670 of the refrigeration device 100. The phase change material container 2620 is configured as a rectangular container, positioned to substantially fill the freezer region 2670. The phase change material container 2620 includes side walls, a bottom section, and a top section. The phase change material container 2620 includes an aperture in the top section, the aperture positioned and sized to permit the internal region of the set of refrigeration coils 120 to be placed within the phase change material container 2620. A phase change material container can be, for example, configured from a durable material. For example, in some embodiments a phase change material container can be fabricated from a durable plastic material. A phase change material container can be, for example, configured from a thermally-conductive material. For example, in some embodiments a phase change material container can be fabricated from a thermally-conductive plastic or metal, such as copper or aluminum. Phase change material 960 is positioned within the phase change material container 2620, the phase change material 960 in direct contact with the set of refrigeration coils 120.

Figure 27:
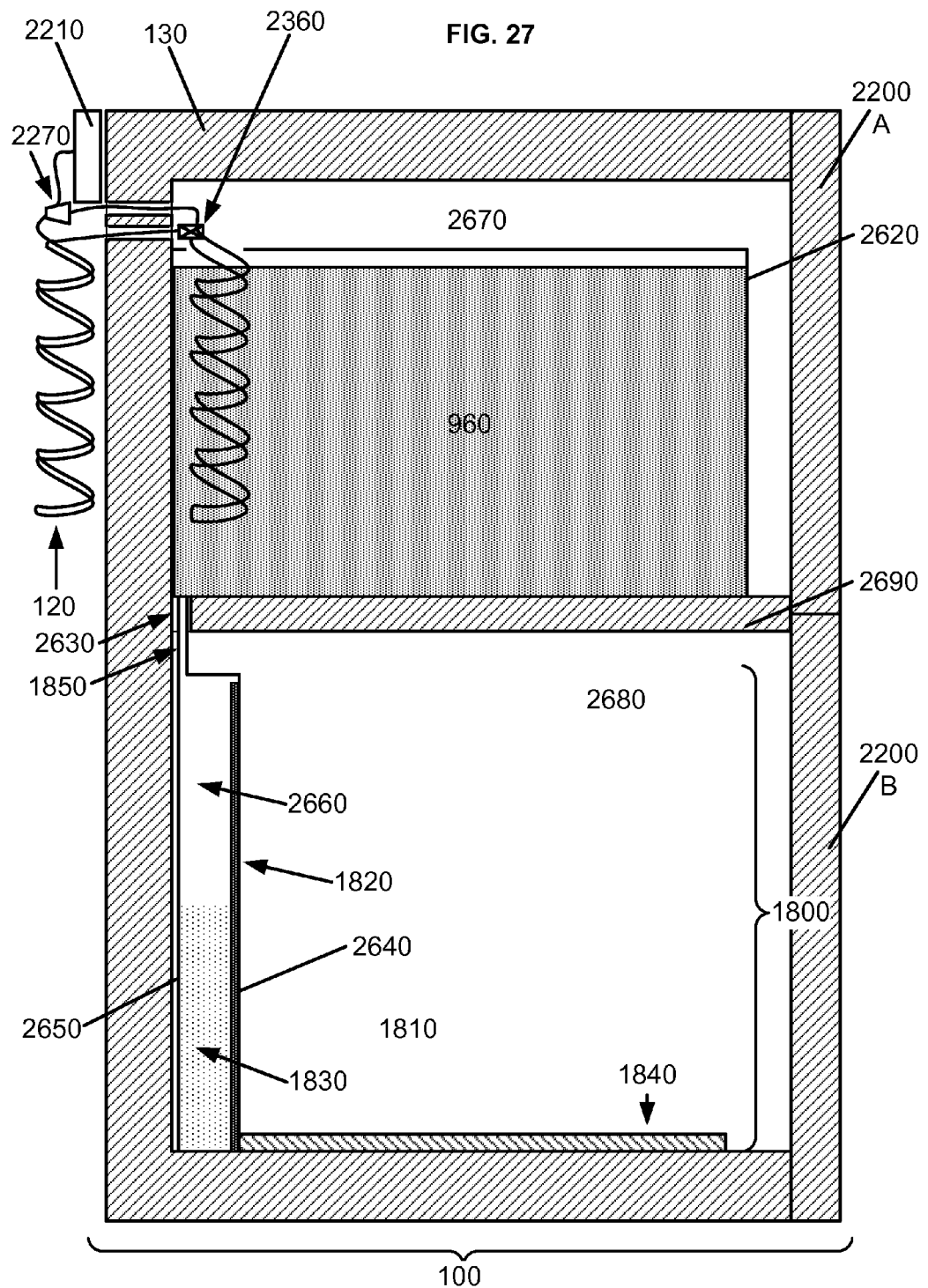
FIG. 27 is a schematic of a temperature-controlled container in use within a refrigeration device.

FIG. 27 illustrates aspects of a thermal diode unit 1800 in position within a refrigeration device 100. The thermal diode unit 1800 is similarly situated to the embodiment shown in FIG. 26. The embodiment of FIG. 27 is illustrated in a substantially cross-section view. The embodiment shown includes a thermal diode unit 1800 positioned within a refrigeration region 2680 of a refrigeration device 100. The embodiment includes a phase change material container 2620 within the freezer region 2670. The phase change material container 2620 includes an aperture positioned to permit the internal set of refrigeration coils 120 to be positioned within the phase change material container 2620, in direct thermal contact with phase change material 960.

In the embodiment shown in FIG. 27, the thermal diode unit 1800 includes a thermal transfer component 1850. The thermal transfer component 1850 is positioned to project vertically upward from the top of the rear wall of the thermal diode unit 1800. The thermal transfer component 1850 is positioned to traverse the aperture 2630 in the internal divider 2690 of the refrigeration device 100. The top edge of the thermal transfer component 1850 is in thermal contact with the bottom edge of the phase change material container 2620 within the refrigeration region 2680.

Figure 28:
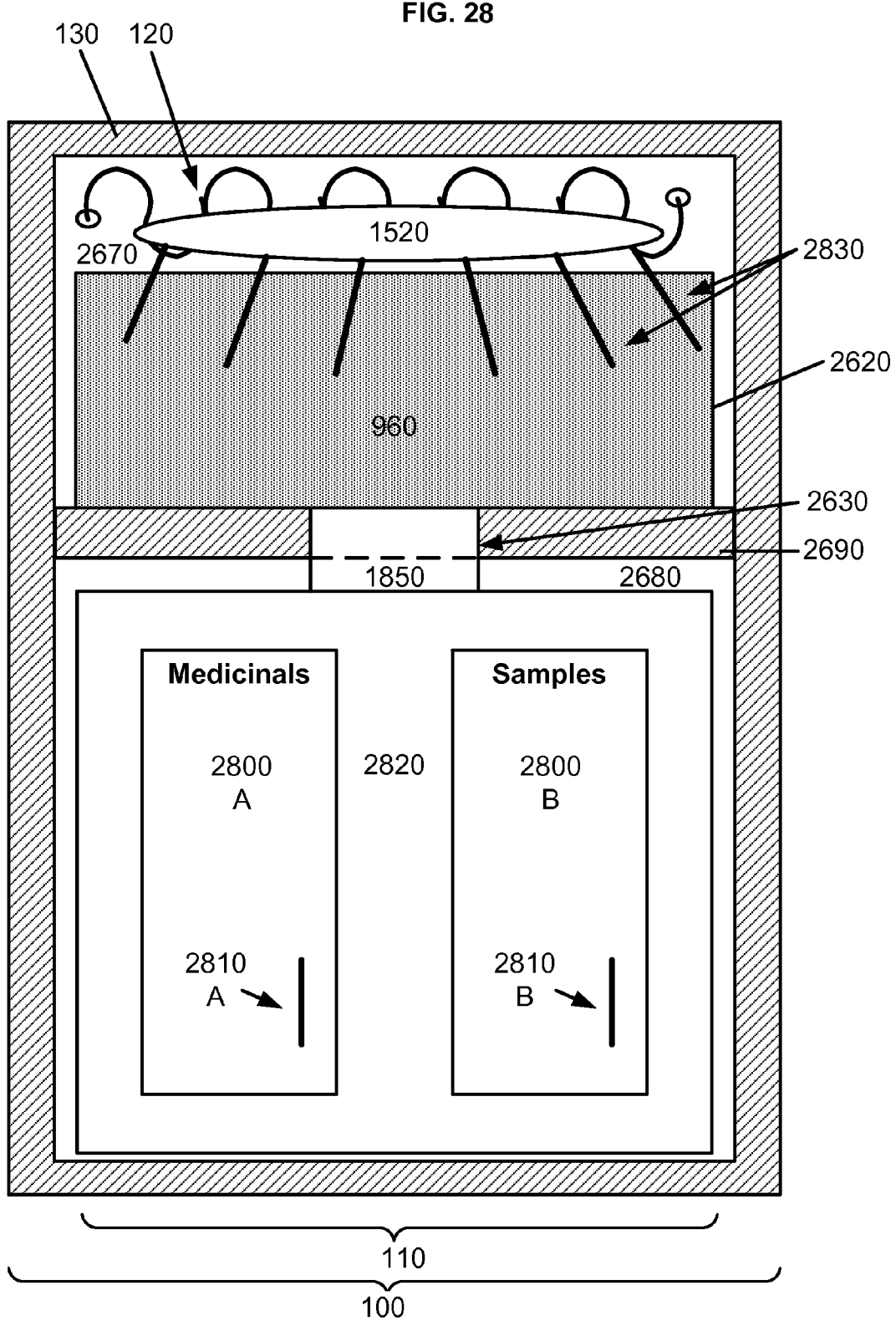
FIG. 28 is a schematic of a temperature-controlled container in use within a refrigeration device.

FIG. 28 illustrates aspects of an embodiment of a temperature-controlled container 110 within a refrigeration device 100. The refrigeration device 100 includes walls 130 surrounding the temperature-controlled container 110. For purposes of illustration, the refrigeration device 100 is shown without a door. The refrigeration device 100 includes an internal divider 2690 between an upper freezer region 2670 and a lower refrigeration region 2680. The internal divider 2690 is manufactured to include an aperture 2630 that permits air to circulate between the freezer region 2670 and the refrigeration region 2680 during normal operation of the refrigeration device 100. A set of refrigeration coils 120 is positioned with sections internal to the freezer region 2670 of the refrigeration device 100. The refrigeration coils 120 of the refrigeration device 100 are exposed in the illustration of FIG. 28, although in some embodiments the depicted features of the container adjacent to the refrigeration coils are behind a panel or screen of the refrigeration device 100. In some embodiments, the panel or screen may be removed or reconfigured during installation of temperature-controlled container 110 within the refrigeration device 100.

FIG. 28 shows a temperature-controlled container 110 within the internal storage region of the refrigeration device 100. The temperature-controlled container 110 includes a front wall 2820 which is visible in the view of FIG. 28. The front wall 2820 includes two apertures on either side of the front wall 2820. Two doors 2800 A, 2800 B are reversibly mated with each of the apertures. Each of the doors 2800 A, 2800 B include a handle positioned for a user to open the respective door and access the contents of the temperature-controlled container 110. The temperature-controlled container 110 includes a thermal transfer component 1850 positioned within the aperture 2630. A phase change material container 2620 is positioned within the freezer region 2670 of the refrigeration device 100. The top of the thermal transfer component 1850 is in thermal contact with the phase change material container 2620. For example, the top of the thermal transfer component 1850 can be in physical contact with the bottom of the phase change material container 2620. Phase change material 960 substantially fills the phase change material container 2620. An attachment unit 1520 is attached to the set of refrigeration coils 120. The attachment unit 1520 includes a plurality of thermal fins 2830 projecting into the phase change material container 2620, the thermal fins 2830 providing a thermal transfer component between the phase change material 960 within the phase change material container 2620 and the attachment unit 1520. For example, in some embodiments the plurality of thermal fins 2830 can be fabricated from a thermally-conductive metal welded to an attachment unit 1520 fabricated from a thermally-conductive metal. For example, in some embodiments the plurality of thermal fins 2830 and the attachment unit 1520 can be fabricated from copper or aluminum.

Figure 29:
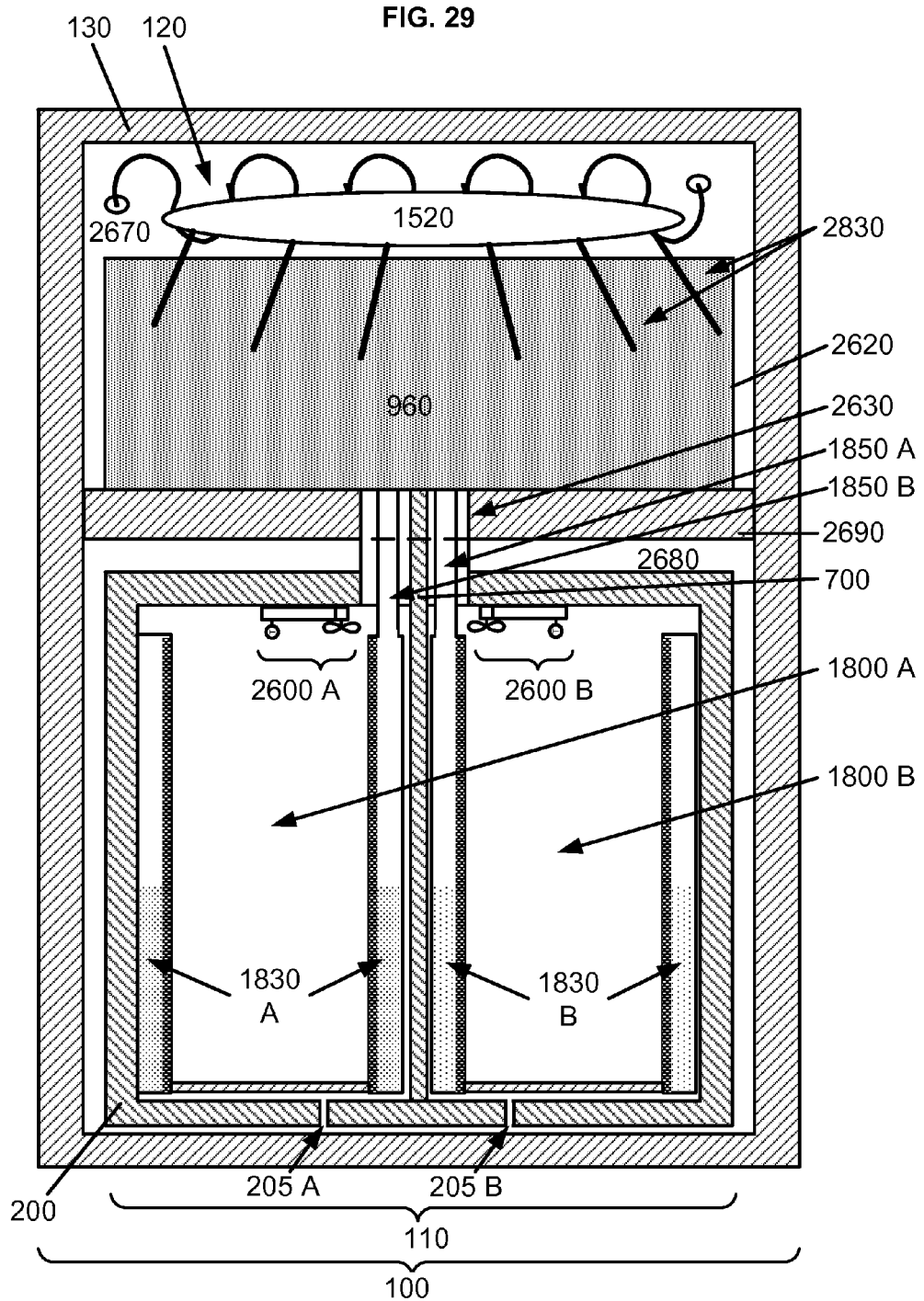
FIG. 29 is a schematic of a temperature-controlled container in use within a refrigeration device.

FIG. 29 depicts aspects of an embodiment of a temperature-controlled container 110 within the internal storage region of the refrigeration device 100. The embodiment shown in FIG. 29 is similar to that of FIG. 28, with the interior of the temperature-controlled container 110 visible within the internal storage region of the refrigeration device 100. The illustration shown in FIG. 29 is a substantially cross-section view. FIG. 29 depicts that within the temperature-controlled container 110, a substantially vertical divider 700 further separates the region internal to the one or more sections of insulation material 200 into two internal regions. Each of the internal regions can be accessed during use by one of the two doors, as shown in FIG. 28.

Each of the internal regions of the temperature-controlled container 110 shown in FIG. 29 includes a thermal diode unit 1800 A, 1800 B. Each of the thermal diode units 1800 A, 1800 B include a thermal transfer component 1850 A, 1850 B, projecting upward through the aperture 2630. The divider 700 separates the thermal transfer components 1850 A, 1850 B within the aperture 2630. Each of the thermal transfer components 1850 A, 1850 B is in thermal contact with the phase change material container 2620 at the top edges of the thermal transfer components 1850 A, 1850 B. Each of the thermal diode units 1800 A, 1800 B include a liquid 1830 A, 1830 B within a gas-sealed gap. In some embodiments, a temperature-controlled container includes a plurality of thermal diode units including the same amount and type of liquid in each of the thermal diode units. In some embodiments, a temperature-controlled container includes a plurality of thermal diode units including different liquids in different thermal diode units. In some embodiments, a temperature-controlled container includes a first thermal diode unit including a first liquid within a first gas-sealed gap, and a second thermal diode unit including a second liquid within a second gas sealed gap. For example, FIG. 29 depicts a first thermal diode unit 1800 A including a first liquid 1830 A within the gas-sealed gap of that thermal diode unit. FIG. 29 also illustrates a second thermal diode unit 1800 B including a second liquid 1830 B within the gas-sealed gap of that thermal diode unit. In the embodiment shown in FIG. 29, the temperature-controlled container 110 includes two temperature equalizer units 2600 A, 2600 B, each of them affixed to a surface of the divider 700 at a position adjacent to the aperture 2630. The temperature equalizer units 2600 A, 2600 B can be configured to operate at the same or at different temperature ranges.

Different thermal diode units from a plurality of thermal diode units within an embodiment of a temperature-controlled container can be configured to stabilize the temperatures of their internal storage regions within different temperature ranges. For example, the thermal diode units can include gas-sealed gaps with different internal liquids, different sized pores in their mesh structures, and different internal gas pressures. These variables, inter alia, would alter the efficiency of thermal transfer from the thermal diode unit to a phase change material through an attached thermal transfer component. The differences in thermal transfer would result in thermal diode units within an embodiment of a temperature-controlled container with different internal predetermined temperature ranges.

Figure 30:
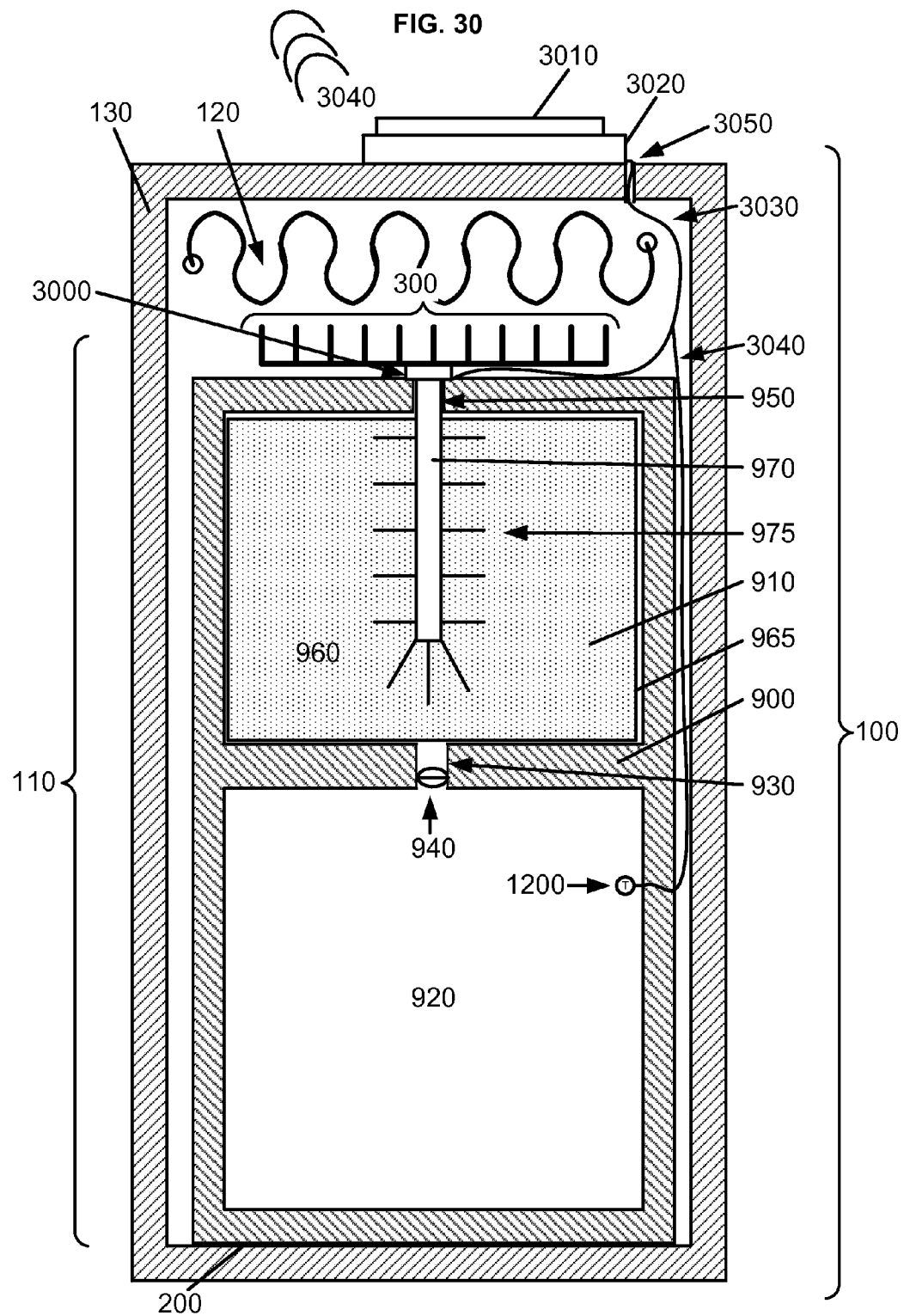
FIG. 30 is a schematic of a temperature-controlled container in use within a refrigeration device.

FIG. 30 illustrates aspects of an embodiment of a temperature-controlled container 110 within a refrigeration device 100. The refrigeration device 100 includes walls 130 surrounding the temperature-controlled container 110. For purposes of illustration, the refrigeration device 100 is shown without a door. The refrigeration device 100 includes a set of refrigeration coils 120. For purposes of illustration the set of refrigeration coils 120 are exposed, however in some embodiments they can be positioned behind a panel or barrier. The temperature-controlled container 110 shown in FIG. 30 includes one or more sections of insulation material 200 substantially defining the walls of the temperature-controlled container 110. The temperature-controlled container 110 includes a thermally-insulated partition 900 dividing the internal region to form a storage region 920 and a phase change material region 910 internal to the container 110, the thermally-insulated partition 900 including a conduit 930 between the storage region 920 and the phase change material region 910. The temperature-controlled container 110 includes a thermal control device 940 within the conduit 930. The thermal control device 940 is positioned to reversibly permit and inhibit thermal transfer between the storage region 920 and the phase change material region 910 through the conduit 930 dependent on the temperature. For example, in some embodiments, the thermal control device 940 can be a bulb filled with a refrigerant and shaped to change position when a preset temperature is reached.

The temperature-controlled container 110 illustrated in FIG. 30 includes an aperture 950 in the section of insulation material 200 forming the top wall of the container 110. A unidirectional thermal conductor 970 traverses the aperture 950. The unidirectional thermal conductor 970 is positioned with a lower end within the phase change material 960 within the phase change material region 910 and an upper end at the outer face of the container. In the embodiment illustrated in FIG. 30, a thermal dissipator unit including a thermal transfer component 300 and a thermoelectric unit 3000 is positioned at the upper end of the unidirectional thermal conductor 970, in direct contact with the unidirectional thermal conductor 970. The thermoelectric unit 3000 is positioned to transfer thermal energy away from the unidirectional thermal conductor. For example, in some embodiments, a thermoelectric unit can include a Peltier device. A wire connector 3030 connects the thermoelectric unit 3000 to a control unit 3020. In some embodiments, a wire connector 3030 can traverse, for example, an existing aperture 3050 in the wall of the refrigeration device, such as an aperture configured for a set of refrigeration coils. The control unit 3020 includes a controller, a power inverter, a sealed rechargeable battery, and a transmitter. The transmitter is configured to send signals 3040 in response to the controller. In some embodiments, a transmitter is a cellular phone transmitter. In some embodiments, a transmitter is a Bluetooth® transmitter. In some embodiments, a controller is an Arduino unit. The control unit 3020 is attached to a photovoltaic unit 3010 positioned adjacent to the exterior of the refrigeration device 100. The embodiment shown in FIG. 30 also includes an electronic temperature sensor 1200 positioned within the storage region 920. The temperature sensor 1200 is connected to the control unit 3020 with a wire connector 3040. In some embodiments, the control unit 3020 is operably connected to a compressor of the refrigeration device 100. In some embodiments, the control unit 3020 is operably connected to a controller of the refrigeration device 100.

Some embodiments of a temperature-controlled container are designed to be operational with or without routine electricity from a power grid, such as a municipal power grid. For example, a temperature-controlled container can be configured to permit operation from a power grid when such is available, and from an alternate power source, such as a photovoltaic unit, at other times. For example, a temperature-controlled container can be configured to permit operation from a power grid in response to input from a user, and from an alternate power source, such as a photovoltaic unit, in response to other input, such as the availability of solar energy. Some embodiments, for example, include a photovoltaic unit configured to provide power to a battery. Some embodiments, for example, include a photovoltaic unit configured to provide power to directly to a thermoelectric unit within the temperature-controlled container. Some embodiments include a photovoltaic unit with a power of 50 Watt (W) peak. Some embodiments are configured to utilize energy from different sources, depending on availability and the preferences of a user. For example, some embodiments include circuitry to accept power from a photovoltaic unit and a controller to direct the accepted power to either the thermoelectric unit directly or to a battery. This selection can be directed by a user through an interface, or controlled based on predetermined criteria, such as the time of day, external temperature, or temperature information from one or more temperature sensors within the temperature-controlled container. Some embodiments include a controller configured to be responsive to the detected conditions of a temperature-controlled container. Some embodiments include circuitry configured to direct power through a power inverter of 150-200 W surge from a 12 Volt (V) battery to power the existing compressor of a refrigeration device. Some embodiments are configured to power a thermoelectric unit from the sealed battery under control of the controller in response to information from the temperature sensor within the storage region. For embodiments wherein the interior storage region of the temperature-controlled container is in the 15 liter (L) to 50 L range, a 50 W peak photovoltaic unit should be able to maintain a predetermined temperature range between approximately 2° C. to 8° C. continually with one hour of maximum output 15 from the photovoltaic cell per 24 hour period. The system can also include a charge monitor, configured to ensure that the battery is not depleted below a preset threshold, for example 80% of its charge, to extend the life of the battery during use.

Figure 31:
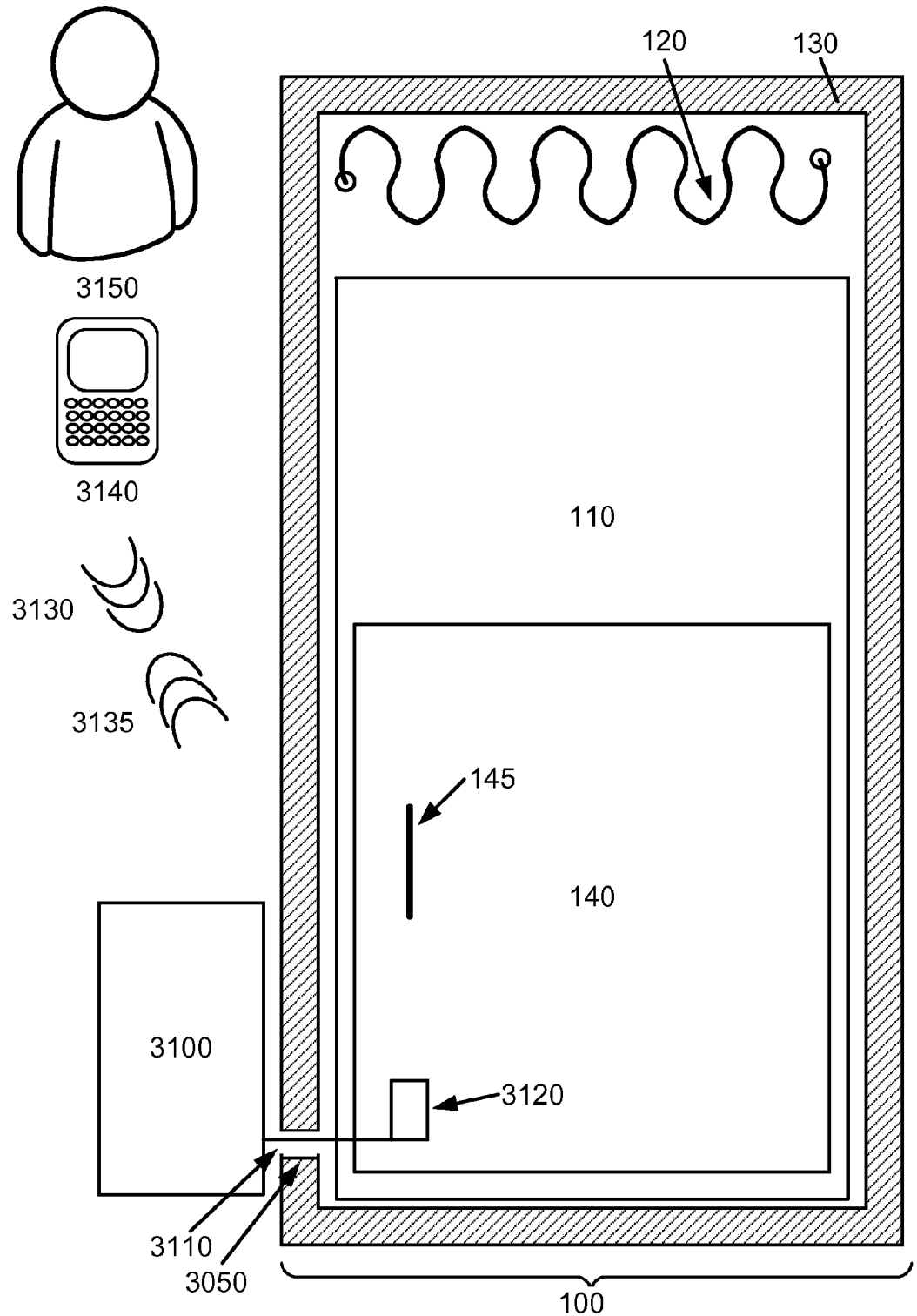
FIG. 31 is a schematic of a temperature-controlled container in use within a refrigeration device, and a remote communications device.

FIG. 31 illustrates aspects of an embodiment of a temperature-controlled container 110 positioned within a refrigeration device 100. The refrigeration device 100 includes a plurality of walls 130 and a set of refrigeration coils 120. For purposes of illustration, the refrigeration device 100 is shown without a door. The temperature-controlled container 110 includes a door 140 with a handle 145 configured to provide access to one or more storage regions internal to the temperature-controlled container 110.

The door 140 of the temperature-controlled container 110 shown in FIG. 31 includes a user interface 3120. For example, in some embodiments a user interface includes an LED display configured to depict the temperature reading from one or more temperature sensors positioned within the storage region of the temperature-controlled container. For example, in some embodiments a user interface includes an LED display configured to depict access data for the temperature-controlled container, such as the time interval since the last time that the door of the container was opened. For example, in some embodiments a user interface includes an LED display configured to depict inventory data regarding the contents of the storage region of the temperature-controlled container. The user interface 3120 is connected through an aperture 3050 in the wall 130 of the refrigeration device 100 to a control unit 3100 positioned adjacent to the exterior of the refrigeration device. FIG. 31 illustrates that the user interface 3120 is connected to a control unit 3100 via a wire connector 3110 that traverses the aperture 3050. In some embodiments, a control unit 3100 includes one or more of a battery, a controller, a memory device, and/or a transmitter. In some embodiments, a control unit 3100 is operably connected to a compressor of the refrigeration device 100. In some embodiments, a control unit 3100 is operably connected to a controller of the refrigeration device 100. In some embodiments, a control unit 3100 is operably connected to a power source for the refrigeration device 100.

In the embodiment shown in FIG. 31, the control unit 3100 includes a transmitter configured to send signals 3135 to a remote device 3140. The control unit 3100 is also configured to receive signals 3130 from the remote device 3140. The remote device is operated by a user 3150. In some embodiments, a remote device is a special-purpose, dedicated monitoring device configured specifically for use with a temperature-controlled container. In some embodiments, a remote device is a general-purpose device configured for use with a temperature-controlled container. For example, a remote device can include a cell phone configured to send and receive signals to the control unit. The signals sent and received by the control unit can include, for example, radio waves or Bluetooth® signals. A control unit 3100 can include, for example, a radio transmitter and receiver. A control unit 3100 can include, for example, a Bluetooth® transmitter and receiver.

Although user 3150 is shown/described herein as a single illustrated figure, those skilled in the art will appreciate that user 3150 may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Figure 32:
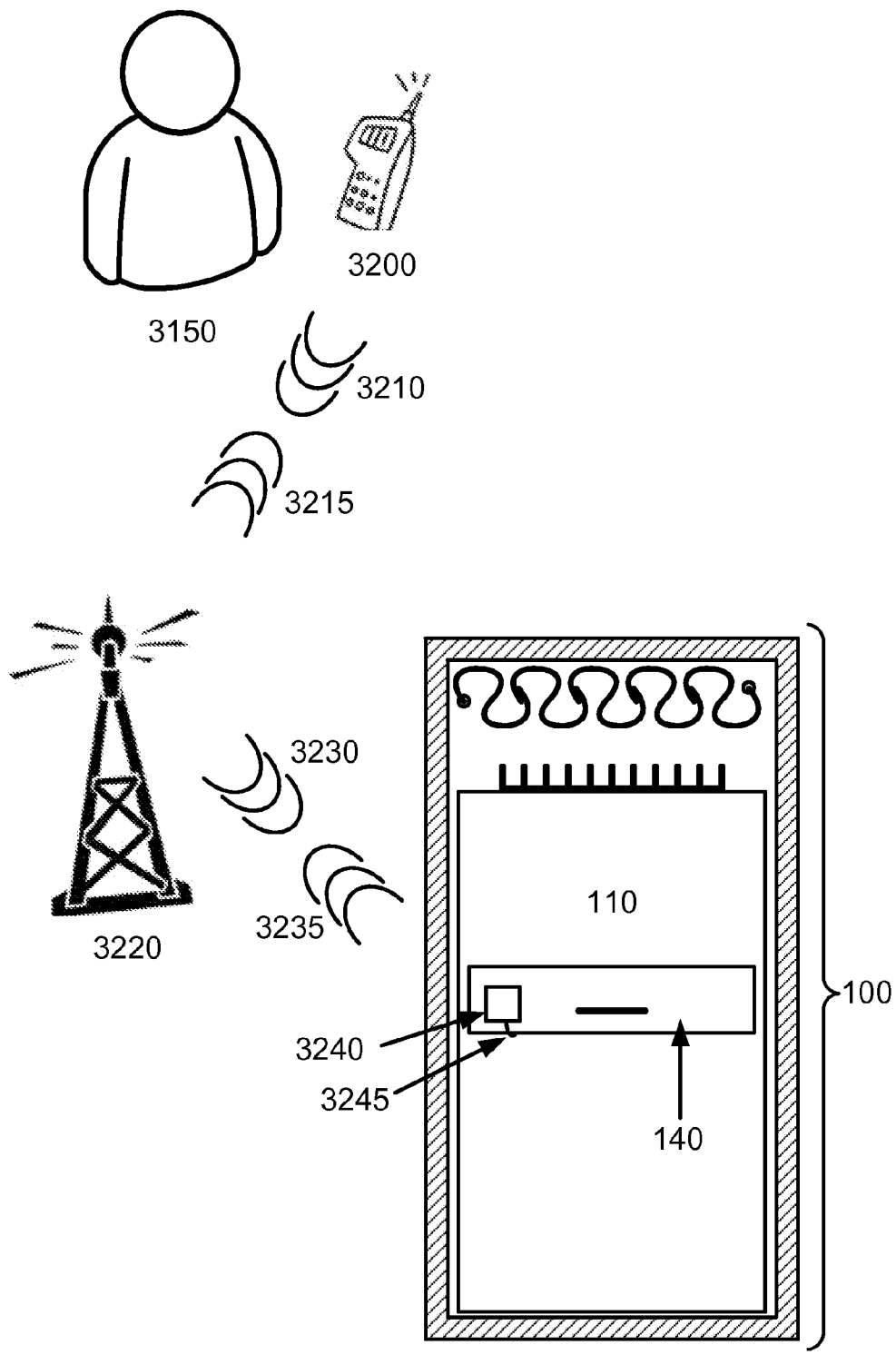
FIG. 32 is a schematic of a temperature-controlled container in use within a refrigeration device.

FIG. 32 illustrates aspects of an embodiment of a temperature-controlled container 110. As shown in FIG. 32, a temperature-controlled container 110 is positioned within a refrigeration device 100. For purposes of illustration, the refrigeration device 100 is shown without a door. The temperature-controlled container 110 includes a door 140 positioned to provide access to the interior of the temperature-controlled container 110 for a user. The door 140 includes a communication unit 3240 affixed to the exterior of the door 140. The communication unit 3240 is operably attached to one or more sensors within the storage region of the temperature-controlled container 110. For example, in some embodiments, a communication unit 3240 is operably connected to one of more of: a temperature sensor, a data logger, an inventory control device, or a plurality thereof. In the embodiment shown in FIG. 32, the communication unit 3240 is connected to one or more sensors with a wire connector 3245. The communication unit 3240 includes one or more of: a transmitter, a receiver, memory, and a user interface. In some embodiments, the communication unit 3240 includes a transmitter and receiver of cellular signals. Signals 3235 can be sent, for example, from the communication unit 3240 to a cellular tower 3220. The cellular tower can, subsequently, transmit signals 3215 to a cellular device 3200 operated by a user 3150. The cellular device 3200 can include a cell phone connected to a wireless cellular network. The user 3150 can operate the cellular device 3200, causing it to send signals 3210 to a cellular tower 3220 and to the cellular network. A cellular tower 3220 can transmit signals 3230 to a communications unit 3240. For example, the signals can include a status query signal, or a control signal for the temperature-controlled container 110.

In some embodiments, a temperature-controlled container includes a communication unit configured to transmit a signal in response to a predetermined condition, for example as detected by a sensor attached to the temperature-controlled container. For example, in some embodiments a communication unit can be configured to transmit a signal in response to a sensed temperature within the storage region of the temperature-controlled container. For example, in some embodiments a communication unit can be configured to transmit a signal in response to an elapsed time period, such as after 24 hours has elapsed. For example, in some embodiments a communication unit can be configured to transmit a signal in response to resumption of electrical power in the refrigeration device. In some embodiments, a communication unit includes a power-saving setting for use when minimal power is available. In some embodiments, a communication unit includes a visible indicator, such as a LED. In some embodiments, a communication unit includes a camera configured to capture images when the door of the temperature-controlled container is opened.

In some embodiments, a method of forming a temperature-control addition to a refrigeration device includes: obtaining measurements of interior surfaces of a refrigeration device; forming a temperature-controlled container from one or more walls formed from insulative material, the temperature-controlled container including an exterior surface configured to reversibly mate with the interior surfaces of the refrigeration device and a thermally-sealed internal region; affixing at least one thermally-insulated partition within the thermally-sealed internal region to form at least one storage region and at least one phase change material region; positioning at least one unidirectional thermal conductor through the one or more walls so that heat is conducted from the thermally-sealed internal region to the interior surfaces of the refrigeration device when the temperature-controlled container is positioned within the refrigeration device; and sealing phase change material within the phase change material region.

In some embodiments, a method of forming a temperature-control addition to a refrigeration device includes obtaining measurements of interior surfaces of a refrigeration device, wherein the obtaining measurements includes accepting manufacturer's data regarding the refrigeration device. In some embodiments, a method of forming a temperature-control addition to a refrigeration device includes obtaining a CAD file of the interior of the refrigeration device. In some embodiments, a method of forming a temperature-control addition to a refrigeration device includes obtaining a 3-D model of the interior of the refrigeration device. In some embodiments, a method of forming a temperature-control addition to a refrigeration device includes obtaining a digital image of the interior of the refrigeration device. In some embodiments, a method of forming a temperature-control addition to a refrigeration device includes wherein the forming a temperature-controlled container includes sealing the one or more walls together with thermally-non-conductive material. In some embodiments, a method of forming a temperature-control addition to a refrigeration device includes wherein the affixing at least one thermally-insulated partition within the thermally-sealed internal region includes sealing the at least one thermally-insulated partition to an internal surface of the one or more walls. In some embodiments, a method of forming a temperature-control addition to a refrigeration device includes wherein the positioning at least one unidirectional thermal conductor through the one or more walls includes referencing manufacturer's data regarding the refrigeration device. In some embodiments, a method of forming a temperature-control addition to a refrigeration device includes wherein the sealing phase change material within the phase change material region includes sealing phase change material within a container placed within the phase change material region.

In some embodiments, a method of installation of a temperature-controlled container within a refrigeration device includes replacement of the first set refrigeration coils of the refrigeration device with a second set of refrigeration coils in the refrigeration device. For example, in some embodiments a first set of refrigeration coils in a refrigeration device are configured to maximize conduction of thermal energy, e.g. heat, in air. A second set of refrigeration coils can, for example, be configured to maximize thermal conduction in a phase-change material specific to an embodiment. For example, a second set of refrigeration coils can include thicker fins with wider spacing than the first set of refrigeration coils in an embodiment. A second set of refrigeration coils can, for example, be fabricated from aluminum or copper.

In some embodiments, the installation of a temperature-controlled container within a refrigeration device includes activities performed at the original factory where the refrigeration device is manufactured. For example, a manufacturer can, in some embodiments, incorporate a temperature-controlled container into a model of a refrigeration device at the factory, before the refrigeration device is shipped to retailers, distributors, or direct customers. For example, a temperature-controlled container can be sized and shaped for specific use with a specific model of refrigeration device. For example, a temperature-controlled container can be affixed within a refrigeration device by the manufacturer of the refrigeration device. In some embodiments, a manufacturer of a refrigeration device may alter the manufacturing process of a model of a refrigeration device in order to include a temperature-controlled container within some units. For example, a manufacturer may choose to not install an internal shelf, panel, or similar structure in a unit in order to better fit a temperature-controlled container within the unit. For example, in some embodiments a manufacturer can use the outer wall of a refrigeration device and install a temperature-controlled container within the outer wall of the refrigeration device directly, without the internal structures such as panels, insulation, and shelves usually installed within the refrigeration device. For example, in some embodiments a manufacturer can use the outer wall of a refrigeration device and install a temperature-controlled container within the outer wall of the refrigeration device directly, without the usual internal insulation of the refrigeration device, but with an insulation specifically sized and shaped to the temperature-controlled container, such as blow-molded insulation between the outer surface of the temperature-controlled container and the interior surface of the refrigeration device.

In some embodiments, the installation of a temperature-controlled container within a refrigeration device includes activities performed away from the original factory where the refrigeration device is manufactured. For example, a refrigeration device can, in some embodiments, be retrofitted with an appropriately sized and shaped temperature-controlled container by a distributor, a retailer, or a purchaser of the refrigeration device. For example, a user can place some embodiments of a temperature-controlled container within a refrigeration device with minimal effort. For example, in some embodiments a distributor can retrofit some units of a model of a refrigeration device in the warehouse or distribution center.

Aspects of the subject matter described herein are set out in the following numbered clauses:

1. In some embodiments, a temperature-controlled container for use within a refrigeration device includes: one or more sections of insulation material substantially defining a temperature-controlled container of a size and shape to fit within a storage region of a refrigeration device, the one or more sections of insulation material forming an aperture at one side of the container and a storage region internal to the container distal to the aperture; and two or more walls substantially forming a tank, the tank configured to hold phase change material internal to the container, the two or more walls positioned within the one or more sections of insulation material so that a first wall of the tank is adjacent to the aperture at one side of the container and a second wall of the tank is positioned adjacent to the storage region.

2. Some embodiments of the temperature-controlled container for use within a refrigeration device of paragraph 1 is of a size and shape to fit within a cold-storage region of a domestic refrigeration device.

3. Some embodiments of the temperature-controlled container for use within a refrigeration device of paragraph 1 include wherein the one or more sections of insulation material include one or more sections of vacuum-insulated panels.

4. Some embodiments of the temperature-controlled container for use within a refrigeration device of paragraph 1 include wherein the one or more sections of insulation material include an insulation material with an R-value of at least 5 $ft^{2 \cdot \circ} F. \cdot h/Btu$.

5. Some embodiments of the temperature-controlled container for use within a refrigeration device of paragraph 1 include wherein the one or more sections of insulation material include an insulation material with an R-value of at least 7 $ft^{2 \cdot \circ} F. \cdot h/Btu$.

6. Some embodiments of the temperature-controlled container for use within a refrigeration device of paragraph 1 include wherein the one or more sections of insulation material include an insulation material with an R-value of at least 10 $ft^{2 \cdot \circ} F. \cdot h/Btu$.

7. Some embodiments of the temperature-controlled container for use within a refrigeration device of paragraph 1 include wherein the one or more sections of insulation material include an access aperture adjacent to the storage region internal to the container; and a door configured to substantially mate with the access aperture.

8. Some embodiments of the temperature-controlled container for use within a refrigeration device of paragraph 7 include wherein the door includes at least one insulation material.

9. Some embodiments of the temperature-controlled container for use within a refrigeration device of paragraph 1 include wherein the one or more sections of insulation material include an aperture at the lower face of the container, the aperture configured to permit condensed liquid to flow from the interior of the container.

10. Some embodiments of the temperature-controlled container for use within a refrigeration device of paragraph 1 include wherein the aperture at one side of the container is positioned adjacent to a refrigeration unit when the temperature-controlled container is within a storage region of a refrigeration device.

11. Some embodiments of the temperature-controlled container for use within a refrigeration device of paragraph 1 include wherein the aperture at one side of the container is positioned at the top edge of the temperature-controlled container when the temperature-controlled container is positioned for use.

12. Some embodiments of the temperature-controlled container for use within a refrigeration device of paragraph 1 include wherein the aperture at one side of the container substantially encompasses one side of the temperature-controlled container.

13. Some embodiments of the temperature-controlled container for use within a refrigeration device of paragraph 1 include wherein the storage region internal to the container is positioned adjacent to the bottom of the temperature-controlled container when the temperature-controlled container is positioned for use.

14. Some embodiments of the temperature-controlled container for use within a refrigeration device of paragraph 1 include wherein the storage region internal to the container is configured to store material at a temperature substantially between 2° C. and 8° C.

15. Some embodiments of the temperature-controlled container for use within a refrigeration device of paragraph 1 include wherein the storage region internal to the container is configured to store medicinal material.

16. Some embodiments of the temperature-controlled container for use within a refrigeration device of paragraph 1 include wherein the two or more walls substantially forming a tank are fabricated from a thermally conductive material.

17. Some embodiments of the temperature-controlled container for use within a refrigeration device of paragraph 1 include wherein the two or more walls substantially forming a tank are fabricated from a material with a thermal conductivity value of at least 50 W/[m·K].

18. Some embodiments of the temperature-controlled container for use within a refrigeration device of paragraph 1 include wherein the two or more walls substantially forming a tank are fabricated from a material with a thermal conductivity value of at least 100 W/[m·K].

19. Some embodiments of the temperature-controlled container for use within a refrigeration device of paragraph 1 include wherein the two or more walls substantially forming a tank are fabricated from a material with a thermal conductivity value of at least 150 W/[m·K].

20. Some embodiments of the temperature-controlled container for use within a refrigeration device of paragraph 1 include wherein the two or more walls substantially forming a tank are fabricated from a material with a thermal conductivity value of at least 200 W/[m·K].

21. Some embodiments of the temperature-controlled container for use within a refrigeration device of paragraph 1 include wherein the two or more walls substantially forming a tank are fabricated from an aluminum material.

22. Some embodiments of the temperature-controlled container for use within a refrigeration device of paragraph 1 include wherein the two or more walls substantially forming a tank include an aperture at a position adjacent to the aperture at one side of the container; and a reversible seal on the aperture.

23. Some embodiments of the temperature-controlled container for use within a refrigeration device of paragraph 1 include wherein the two or more walls substantially forming a tank are watertight.

24. Some embodiments of the temperature-controlled container for use within a refrigeration device of paragraph 1 include wherein the two or more walls substantially forming a tank are gastight.

25. Some embodiments of the temperature-controlled container for use within a refrigeration device of paragraph 1 include wherein the tank is positioned above the storage region when the container is positioned for use.

26. Some embodiments of the temperature-controlled container for use within a refrigeration device of paragraph 1 include further an aperture in the lower face of the temperature-controlled container, the aperture of a size and shape to allow condensation to leave the storage region due to gravity while minimizing thermal energy transfer between the storage region and a region exterior to the container.

27. Some embodiments of a temperature-controlled container for use within a refrigeration device include: one or more sections of insulation material substantially defining one or more walls of a temperature-controlled container, the temperature-controlled container including an internal region; a thermally-insulated partition dividing the internal region to form a storage region and a phase change material region internal to the container, the thermally-insulated partition including a conduit between the storage region and the phase change material region; a thermal control device within the conduit; an aperture within a section of the insulation material substantially defining the container, the aperture between the phase change material region internal to the container and an external surface of the container; a unidirectional thermal conductor positioned within the aperture, the unidirectional thermal conductor configured to transmit heat in a direction from the phase change material region to the external surface of the container; and thermal dissipator unit adjacent to the external surface of the container, the thermal dissipator unit including a radiative component configured to be positioned within the refrigeration device, and a thermal transfer component, the thermal transfer component in thermal contact with the unidirectional thermal conductor.

28. In some embodiments of the temperature-controlled container for use within a refrigeration device of paragraph 27 include wherein the temperature-controlled container is of a size and shape to fit within a cold-storage region of a domestic refrigeration device.

29. In some embodiments of the temperature-controlled container for use within a refrigeration device of paragraph 27 include wherein the one or more sections of insulation material include: one or more sections of vacuum-insulated panels.

30. In some embodiments of the temperature-controlled container for use within a refrigeration device of paragraph 27 include wherein the one or more sections of insulation material include: an insulation material with an R-value of at least 5 ft$^{2\cdot\circ}$ F.·h/Btu.

31. In some embodiments of the temperature-controlled container for use within a refrigeration device of paragraph 27 include wherein the one or more sections of insulation material include: an insulation material with an R-value of at least 7 ft²·°F.·h/Btu.
32. In some embodiments of the temperature-controlled container for use within a refrigeration device of paragraph 27 include wherein the one or more sections of insulation material include: an insulation material with an R-value of at least 10 ft²·°F.·h/Btu.
33. In some embodiments of the temperature-controlled container for use within a refrigeration device of paragraph 27 include wherein the one or more sections of insulation material include: an access aperture adjacent to the storage region internal to the container; and a door configured to substantially mate with the access aperture.
34. In some embodiments of the temperature-controlled container for use within a refrigeration device of paragraph 33 include wherein the door includes at least one insulation material.
35. In some embodiments of the temperature-controlled container for use within a refrigeration device of paragraph 27 include wherein the one or more sections of insulation material include: an aperture at a lower face of the container, the aperture configured to permit condensed liquid to flow from an interior of the container.
36. In some embodiments of the temperature-controlled container for use within a refrigeration device of paragraph 27 include wherein the one or more sections of insulation material include: an external surface configured to be positioned adjacent to one or more walls of a refrigeration region within a refrigeration device.
37. In some embodiments of the temperature-controlled container for use within a refrigeration device of paragraph 27 include wherein the walls of the temperature-controlled container include: one or more external surfaces configured to reversibly mate with one or more internal surfaces of the refrigeration device.
38. In some embodiments of the temperature-controlled container for use within a refrigeration device of paragraph 27 include wherein the walls of the temperature-controlled container include: a structural material attached to the one or more sections of insulation material.
39. In some embodiments of the temperature-controlled container for use within a refrigeration device of paragraph 27 include wherein the walls of the temperature-controlled container are of a size and shape to fit within a storage region of the refrigeration device.
40. In some embodiments of the temperature-controlled container for use within a refrigeration device of paragraph 27 include wherein the walls of the temperature-controlled container include: a radiative surface configured to be positioned adjacent to a set of refrigeration coils.
41. In some embodiments of the temperature-controlled container for use within a refrigeration device of paragraph 27 include wherein the thermally-insulated partition includes: one or more sections of insulation material.
42. In some embodiments of the temperature-controlled container for use within a refrigeration device of paragraph 27 include wherein the thermally-insulated partition is configured so that the phase change material region is positioned adjacent to at least one external surface of the temperature-controlled container, the at least one external surface configured to be positioned adjacent to the refrigeration region.
43. In some embodiments of the temperature-controlled container for use within a refrigeration device of paragraph 27 include wherein the thermal control device within the conduit includes: a passive thermal control device.
44. In some embodiments of the temperature-controlled container for use within a refrigeration device of paragraph 27 include wherein the thermal control device within the conduit includes: a temperature sensor; an electronic controller attached to the temperature sensor; and an electronically-controlled thermal control unit responsive to the electronic controller.
45. In some embodiments of the temperature-controlled container for use within a refrigeration device of paragraph 27 include wherein the aperture within a section of the insulation material substantially defining the container is positioned at a top face of the temperature-controlled container when the container is oriented for use within a refrigeration device.
46. In some embodiments of the temperature-controlled container for use within a refrigeration device of paragraph 27 include wherein the aperture within a section of the insulation material substantially defining the container includes: an aperture of a size and shape to substantially correspond with an external surface of the unidirectional thermal conductor positioned within the aperture.
47. In some embodiments of the temperature-controlled container for use within a refrigeration device of paragraph 27 include wherein the unidirectional thermal conductor includes: a heat pipe device.
48. In some embodiments of the temperature-controlled container for use within a refrigeration device of paragraph 27 include wherein the unidirectional thermal conductor includes: a thermal diode device.
49. In some embodiments of the temperature-controlled container for use within a refrigeration device of paragraph 27 include wherein the unidirectional thermal conductor includes: one or more thermal conduction units in thermal contact with an exterior surface of the unidirectional thermal conductor, the one or more thermal conduction units positioned within the phase change material region.
50. In some embodiments of the temperature-controlled container for use within a refrigeration device of paragraph 27 include wherein the thermal dissipator unit includes: a radiative component affixed to an exterior surface of the temperature-controlled container.
51. In some embodiments of the temperature-controlled container for use within a refrigeration device of paragraph 27 include wherein the thermal dissipator unit includes: a radiative component including radiative fin structure.
52. In some embodiments of the temperature-controlled container for use within a refrigeration device of paragraph 27 include wherein the thermal dissipator unit includes: a thermal transfer component including a highly thermally-conductive material in thermal contact with the unidirectional thermal conductor.
53. In some embodiments of the temperature-controlled container for use within a refrigeration device of paragraph 27 include wherein the thermal dissipator unit includes: a thermal transfer component including a Peltier device in thermal contact with the unidirectional thermal conductor.
54. In some embodiments of the temperature-controlled container for use within a refrigeration device of paragraph 27 include wherein the thermal dissipator unit includes: an attachment unit configured to attach to a refrigeration coil of a refrigeration device.
55. In some embodiments of the temperature-controlled container for use within a refrigeration device of paragraph 54 include wherein the thermal dissipator unit with an attachment unit includes an attachment unit fabricated from a thermally-expansive material.

56. In some embodiments of the temperature-controlled container for use within a refrigeration device of paragraph 27 include wherein the thermal transfer component of the thermal dissipator unit includes a thermoelectric unit positioned to transfer thermal energy away from the unidirectional thermal conductor, and further include: a temperature sensor positioned within the storage region; a photovoltaic unit configured to be positioned exterior to the refrigeration device; a power inverter attached to the photovoltaic unit; a sealed battery attached to the power inverter; a transmitter attached to the battery; and a controller attached to the thermoelectric unit, the temperature sensor, the sealed battery and the transmitter, the controller configured to send operational signals to the thermoelectric unit in response to input from the temperature sensor and to send operational signals to the transmitter.

57. In some embodiments of the temperature-controlled container for use within a refrigeration device of paragraph 27 further include: a temperature sensor positioned within the storage region, the temperature sensor attached to the thermal control device within the conduit.

58. In some embodiments of the temperature-controlled container for use within a refrigeration device of paragraph 27 further include: a temperature sensor positioned within the storage region, the temperature sensor attached to a heating device within the storage region.

59. In some embodiments of the temperature-controlled container for use within a refrigeration device of paragraph 27 further include: a temperature sensor positioned within the storage region, the temperature sensor attached to a transmission device.

60. In some embodiments of the temperature-controlled container for use within a refrigeration device of paragraph 27 further include: a temperature sensor positioned within the storage region, the temperature sensor attached to a controller for the refrigeration device.

61. In some embodiments of the temperature-controlled container for use within a refrigeration device of paragraph 27 further include: a liner region for the storage region, the liner region configured to contain a phase change material.

62. In some embodiments of the temperature-controlled container for use within a refrigeration device of paragraph 27 further include: a second thermally-insulated partition dividing the internal region to form a second storage region and a second phase change material region internal to the container, the second thermally-insulated partition including a conduit between the second storage region and the second phase change material region.

63. In some embodiments of the temperature-controlled container for use within a refrigeration device of paragraph 62 further include: a liner region for the second storage region, the liner region configured to contain a phase change material.

64. In some embodiments of the temperature-controlled container for use within a refrigeration device of paragraph 62 further include: a second aperture within a section of the insulation material substantially defining the container, the second aperture between the phase change material region internal to the container and an external surface of the container; a second unidirectional thermal conductor positioned within the second aperture, the second unidirectional thermal conductor configured to transmit heat in a direction from the phase change material region to the external surface of the container; and a second thermal dissipator unit adjacent to the external surface of the container, the second thermal dissipator unit including a radiative component configured to be positioned within a storage region of the refrigeration device, and a thermal transfer component, the thermal transfer component in thermal contact with the second unidirectional thermal conductor.

65. Some embodiments of a temperature-controlled container for use within a refrigeration device include: one or more sections of insulation material substantially defining one or more walls of a temperature-controlled container, the temperature-controlled container including an internal region; a thermally-insulated partition dividing the internal region to form a storage region and a phase change material region internal to the container, the thermally-insulated partition including a conduit between the storage region and the phase change material region; a thermal diode unit within the storage region, the thermal diode unit including a thermal transfer component positioned within the conduit; an aperture within a section of the insulation material substantially defining the container, the aperture between the phase change material region internal to the container and an external surface of the container; a unidirectional thermal conductor positioned within the aperture, the unidirectional thermal conductor configured to transmit heat in a direction from the phase change material region to the external surface of the container; and a thermal dissipator unit adjacent to the external surface of the container, the thermal dissipator unit including a radiative component configured to be positioned within the refrigeration device, and a thermal transfer component, the thermal transfer component in thermal contact with the unidirectional thermal conductor.

66. In some embodiments, the temperature-controlled container of paragraph 65 includes wherein the temperature-controlled container is of a size and shape to fit within a cold-storage region of a domestic refrigeration device.

67. In some embodiments, the temperature-controlled container of paragraph 65 includes wherein the one or more sections of insulation material includes: one or more sections of vacuum-insulated panels.

68. In some embodiments, the temperature-controlled container of paragraph 65 includes wherein the one or more sections of insulation material includes: an insulation material with an R-value of at least 5 $ft^{2.\circ}$ F.·h/Btu.

69. In some embodiments, the temperature-controlled container of paragraph 65 includes wherein the one or more sections of insulation material includes: an insulation material with an R-value of at least 7 $ft^{2.\circ}$ F.·h/Btu.

70. In some embodiments, the temperature-controlled container of paragraph 65 includes wherein the one or more sections of insulation material includes: an insulation material with an R-value of at least 10 $ft^{2.\circ}$ F.·h/Btu.

71. In some embodiments, the temperature-controlled container of paragraph 65 includes wherein the one or more sections of insulation material includes: an access aperture adjacent to the storage region internal to the container; and a door configured to substantially mate with the access aperture.

72. In some embodiments, the temperature-controlled container of paragraph 71 includes wherein the door includes at least one insulation material.

73. In some embodiments, the temperature-controlled container of paragraph 65 includes wherein the one or more sections of insulation material includes: an aperture at a lower face of the container, the aperture configured to permit condensed liquid to flow from an interior of the container.

74. In some embodiments, the temperature-controlled container of paragraph 65 includes wherein the one or more sections of insulation material includes: an external surface configured to be positioned adjacent to one or more walls of a refrigeration region within a refrigeration device.

75. In some embodiments, the temperature-controlled container of paragraph 65 includes wherein the walls of the temperature-controlled container include: one or more external surfaces configured to reversibly mate with one or more internal surfaces of the refrigeration device.

76. In some embodiments, the temperature-controlled container of paragraph 65 includes wherein the walls of the temperature-controlled container include: a structural material attached to the one or more sections of insulation material.

77. In some embodiments, the temperature-controlled container of paragraph 65 includes wherein the walls of the temperature-controlled container are of a size and shape to fit within a storage region of the refrigeration device.

78. In some embodiments, the temperature-controlled container of paragraph 65 includes wherein the walls of the temperature-controlled container include: a radiative surface configured to be positioned adjacent to a set of refrigeration coils.

79. In some embodiments, the temperature-controlled container of paragraph 65 includes wherein the thermally-insulated partition includes: one or more sections of insulation material.

80. In some embodiments, the temperature-controlled container of paragraph 65 includes wherein the thermally-insulated partition is configured so that the phase change material region is positioned adjacent to at least one external surface of the temperature-controlled container, the at least one external surface configured to be positioned adjacent to the refrigeration region.

81. In some embodiments, the temperature-controlled container of paragraph 65 includes wherein the thermal diode unit includes: a plurality of walls enclosing an interior space including a surface positioned adjacent to the storage region; a mesh structure affixed to the surface positioned adjacent to the storage region; a liquid within the interior space; and one or more sealed junctions between the plurality of walls enclosing the interior space.

82. In some embodiments, the temperature-controlled container of paragraph 81 includes wherein the plurality of walls of the thermal diode unit are fabricated from a thermally-conductive material.

83. In some embodiments, the temperature-controlled container of paragraph 81 includes wherein the plurality of walls of the thermal diode unit include one or more external walls configured to reversibly mate with one or more walls of the storage region.

84. In some embodiments, the temperature-controlled container of paragraph 81 includes wherein the interior space of the thermal diode unit has a gas pressure less than atmospheric gas pressure.

85. In some embodiments, the temperature-controlled container of paragraph 81 includes wherein the mesh structure includes: a three dimensional mesh structure.

86. In some embodiments, the temperature-controlled container of paragraph 81 includes: a substantially planar bottom unit to the thermal diode unit.

87. In some embodiments, the temperature-controlled container of paragraph 81 includes wherein the thermal diode unit includes: a thermal transfer component positioned to extend into the phase change material region of the temperature-controlled container.

88. In some embodiments, the temperature-controlled container of paragraph 65 includes wherein the aperture within a section of the insulation material substantially defining the container is positioned at a top face of the temperature-controlled container when the container is oriented for use within a refrigeration device.

89. In some embodiments, the temperature-controlled container of paragraph 65 includes wherein the aperture within a section of the insulation material substantially defining the container includes: an aperture of a size and shape to substantially correspond with an external surface of the unidirectional thermal conductor positioned within the aperture.

90. In some embodiments, the temperature-controlled container of paragraph 65 includes wherein the unidirectional thermal conductor includes: a heat pipe device.

91. In some embodiments, the temperature-controlled container of paragraph 65 includes wherein the unidirectional thermal conductor includes: a thermal diode device.

92. In some embodiments, the temperature-controlled container of paragraph 65 includes wherein the unidirectional thermal conductor includes: one or more thermal conduction units in thermal contact with an exterior surface of the unidirectional thermal conductor, the one or more thermal conduction units positioned within the phase change material region.

93. In some embodiments, the temperature-controlled container of paragraph 65 includes wherein the thermal dissipator unit includes: a radiative component affixed to an exterior surface of the temperature-controlled container.

94. In some embodiments, the temperature-controlled container of paragraph 65 includes wherein the thermal dissipator unit includes: a radiative component including radiative fin structure.

95. In some embodiments, the temperature-controlled container of paragraph 65 includes wherein the thermal dissipator unit includes: a thermal transfer component including a highly thermally-conductive material in thermal contact with the unidirectional thermal conductor.

96. In some embodiments, the temperature-controlled container of paragraph 65 includes wherein the thermal dissipator unit includes: a thermal transfer component including a Peltier device in thermal contact with the unidirectional thermal conductor.

97. In some embodiments, the temperature-controlled container of paragraph 65 includes wherein the thermal dissipator unit includes: an attachment unit configured to attach to a refrigeration coil of a refrigeration device.

98. In some embodiments, the attachment unit of paragraph 97 includes: an attachment unit fabricated from a thermally-expansive material.

99. In some embodiments, the temperature-controlled container of paragraph 65 includes wherein the thermal transfer component of the thermal dissipator unit includes a thermoelectric unit positioned to transfer thermal energy away from the unidirectional thermal conductor, and further includes: a temperature sensor positioned within the storage region; a photovoltaic unit configured to be positioned exterior to the refrigeration device; a power inverter attached to the photovoltaic unit; a sealed battery attached to the power inverter; a transmitter attached to the battery; and a controller attached to the thermoelectric unit, the temperature sensor, the sealed battery and the transmitter, the controller configured to send operational signals to the thermoelectric unit in response to input from the temperature sensor and to send operational signals to the transmitter.

100. In some embodiments, the temperature-controlled container of paragraph 65 further includes: a temperature sensor positioned within the storage region, the temperature sensor attached to a data logger device.
101. In some embodiments, the temperature-controlled container of paragraph 65 further includes: a temperature sensor positioned within the storage region, the temperature sensor attached to a heating device within the storage region.
102. In some embodiments, the temperature-controlled container of paragraph 65 further includes: a temperature sensor positioned within the storage region, the temperature sensor attached to a transmission device.
103. In some embodiments, the temperature-controlled container of paragraph 65 further includes: a temperature sensor positioned within the storage region, the temperature sensor attached to a controller for the refrigeration device.
104. In some embodiments, the temperature-controlled container of paragraph 65 further includes: a liner region for the storage region, the liner region configured to contain a phase change material.
105. In some embodiments, the temperature-controlled container of paragraph 65 further includes: a second thermally-insulated partition dividing the internal region to form a second storage region and a second phase change material region internal to the container, the second thermally-insulated partition including a conduit between the second storage region and the second phase change material region.
106. In some embodiments, the temperature-controlled container of paragraph 105 further includes: a liner region for the second storage region, the liner region configured to contain a phase change material.
107. In some embodiments, the temperature-controlled container of paragraph 105 further includes: a second aperture within a section of the insulation material substantially defining the container, the second aperture between the phase change material region internal to the container and an external surface of the container; a second unidirectional thermal conductor positioned within the second aperture, the second unidirectional thermal conductor configured to transmit heat in a direction from the phase change material region to the external surface of the container; and a second thermal dissipator unit adjacent to the external surface of the container, the second thermal dissipator unit including a radiative component configured to be positioned within a storage region of the refrigeration device, and a thermal transfer component, the thermal transfer component in thermal contact with the second unidirectional thermal conductor.
108. Some embodiments include a thermal diode unit configured for use within a temperature-controlled container, including: diode unit configured for use within a temperature-controlled container, at least one outer wall of a size and shape to align with the at least one inner wall, with a gap formed between the at least one inner wall and the at least one outer wall; a mesh structure affixed to a surface of the at least one inner wall adjacent to the gap; a liquid within the gap; one or more seals between the at least one inner wall and the at least one outer wall, forming a gas-impermeable interior region of the thermal diode unit surrounding the gap; and a gas pressure less than atmospheric pressure within the gas-impermeable interior region.
109. In some embodiments, the thermal diode unit of paragraph 108 include wherein the thermal diode unit is configured as a boxlike shape.
110. In some embodiments, the thermal diode unit of paragraph 108 include wherein the thermal diode unit is configured as a substantially upright cylindrical shape.
111. In some embodiments, the thermal diode unit of paragraph 108 include wherein the thermal diode unit is of a size and shape to fit within a storage region of a refrigeration device.
112. In some embodiments, the thermal diode unit of paragraph 108 include wherein the at least one outer wall substantially defines an exterior of the thermal diode unit.
113. In some embodiments, the thermal diode unit of paragraph 108 include wherein the at least one inner wall is fabricated from a thermally-conductive metal.
114. In some embodiments, the thermal diode unit of paragraph 108 include wherein the at least one inner wall includes: at least one outer surface substantially defining a temperature-stabilized region.
115. In some embodiments, the thermal diode unit of paragraph 108 include wherein the mesh structure includes: a plurality of interior pores, the average dimension of the plurality of interior pores sufficient to conduct the liquid to a top edge of the mesh structure when the thermal diode unit is positioned for use.
116. In some embodiments, the thermal diode unit of paragraph 108 include wherein the mesh structure includes: a plurality of interior pores, the average dimension of the plurality of interior pores less than approximately 100 microns.
117. In some embodiments, the thermal diode unit of paragraph 108 include wherein the mesh structure is affixed to a majority of the surface of the inner wall.
118. In some embodiments, the thermal diode unit of paragraph 108 include wherein the mesh structure is affixed to the surface of the inner wall with thermal contact between the mesh structure and the majority of the surface.
119. In some embodiments, the thermal diode unit of paragraph 108 include wherein the gas pressure less than atmospheric pressure within the gas-impermeable interior region includes: a gas pressure less than the partial gas pressure of the liquid under expected conditions of use of the thermal diode.
120. In some embodiments, the thermal diode unit of paragraph 108 further includes: a bottom wall, the bottom wall affixed to the at least one inner wall at a lower edge when the thermal diode unit is positioned for use.
121. In some embodiments, the thermal diode unit of paragraph 108 further includes: a thermal transfer component including an interior space contiguous with the gas-impermeable interior region of the thermal diode unit.
122. In some embodiments, the thermal diode unit of paragraph 108 further includes: a thermal transfer component in thermal contact with the gas-impermeable interior region of the thermal diode unit.
123. In some embodiments, the thermal diode unit of paragraph 108 further includes: a temperature sensor affixed to the thermal diode unit, the temperature sensor attached to a transmission device.
124. Some embodiments of a temperature-controlled container for use within a refrigeration device include: one or more sections of insulation material substantially defining one or more walls of a temperature-controlled container, the temperature-controlled container including an internal region; a thermally-insulated partition dividing the internal region to form a storage region and a phase change material region internal to the container, the thermally-insulated partition including a conduit between the storage region and the phase change material region; a thermal control device within the conduit; a first aperture within a section of the insulation material substantially defining the container, the aperture between the phase change material region internal to the container and an external surface of the container; a first unidirectional thermal conductor positioned within the first aperture, the unidirectional thermal conductor configured to transmit heat in a direction from the phase change material region to the external surface of the container; a second aperture within a section of the insulation material substantially defining the container, the aperture between the storage region internal to the container and an external surface of the container; and a second unidirectional thermal conductor positioned within the second aperture, the unidirectional thermal conductor configured to transmit heat in a direction from the storage region to the external surface of the container.

125. Some embodiments include the temperature-controlled container of paragraph 124 wherein the temperature-controlled container is of a size and shape to fit within a cold-storage region of a domestic refrigeration device.

126. In some embodiments, the temperature-controlled container of paragraph 124 includes wherein the one or more sections of insulation material include: one or more sections of vacuum-insulated panels.

127. In some embodiments, the temperature-controlled container of paragraph 124 includes wherein the one or more sections of insulation material include: an insulation material with an R-value of at least 5 $ft^{2.\circ}$ F.·h/Btu.

128. In some embodiments, the temperature-controlled container of paragraph 124 includes wherein the one or more sections of insulation material include: an insulation material with an R-value of at least 7 $ft^{2.\circ}$ F.·h/Btu.

129. In some embodiments, the temperature-controlled container of paragraph 124 includes wherein the one or more sections of insulation material include: an insulation material with an R-value of at least 10 $ft^{2.\circ}$ F.·h/Btu.

130. In some embodiments, the temperature-controlled container of paragraph 124 includes wherein the one or more sections of insulation material include: an access aperture adjacent to the storage region internal to the container; and a door configured to substantially mate with the access aperture.

131. In some embodiments, the door of paragraph 130 includes: at least one insulation material.

132. In some embodiments, the temperature-controlled container of paragraph 124 includes wherein the one or more sections of insulation material include: an aperture at a lower face of the container, the aperture configured to permit condensed liquid to flow from an interior of the container.

133. In some embodiments, the temperature-controlled container of paragraph 124 includes wherein the one or more sections of insulation material include: an external surface configured to be positioned adjacent to one or more walls of a refrigeration region within a refrigeration device.

134. In some embodiments, the temperature-controlled container of paragraph 124 includes wherein the walls of the temperature-controlled container include: one or more external surfaces configured to reversibly mate with one or more internal surfaces of the refrigeration device.

135. In some embodiments, the temperature-controlled container of paragraph 124 includes wherein the walls of the temperature-controlled container include: a structural material attached to the one or more sections of insulation material.

136. In some embodiments, the temperature-controlled container of paragraph 124 includes wherein the walls of the temperature-controlled container are of a size and shape to fit within a storage region of the refrigeration device.

137. In some embodiments, the temperature-controlled container of paragraph 124 includes wherein the walls of the temperature-controlled container include: a surface configured to be positioned adjacent to a set of refrigeration coils.

138. In some embodiments, the temperature-controlled container of paragraph 124 includes wherein the thermally-insulated partition includes: one or more sections of insulation material.

139. In some embodiments, the temperature-controlled container of paragraph 124 includes wherein the thermally-insulated partition is configured so that the phase change material region is positioned above the storage region.

140. In some embodiments, the temperature-controlled container of paragraph 124 includes wherein the thermal control device within the conduit includes: a passive thermal control device.

141. In some embodiments, the temperature-controlled container of paragraph 124 includes wherein the thermal control device within the conduit includes: a temperature sensor; an electronic controller attached to the temperature sensor;
and an electronically-controlled thermal control unit responsive to the electronic controller.

142. In some embodiments, the temperature-controlled container of paragraph 124 includes wherein the first aperture within a section of the insulation material substantially defining the container is positioned at a face of the temperature-controlled container adjacent to a set of refrigeration coils when the container is oriented for use within a refrigeration device.

143. In some embodiments, the temperature-controlled container of paragraph 124 includes wherein the first aperture within a section of the insulation material substantially defining the container includes: a first aperture of a size and shape to substantially correspond with an external surface of the first unidirectional thermal conductor positioned within the first aperture.

144. In some embodiments, the temperature-controlled container of paragraph 124 includes wherein the first unidirectional thermal conductor includes: a heat pipe device.

145. In some embodiments, the temperature-controlled container of paragraph 124 includes wherein the first unidirectional thermal conductor includes: a thermal diode device.

146. In some embodiments, the temperature-controlled container of paragraph 124 includes wherein the first unidirectional thermal conductor includes: one or more thermal conduction units in thermal contact with an exterior surface of the first unidirectional thermal conductor, the one or more thermal conduction units positioned within the phase change material region.

147. In some embodiments, the temperature-controlled container of paragraph 124 includes wherein the first unidirectional thermal conductor includes: an attachment unit configured to attach to a refrigeration coil of a refrigeration device.

148. In some embodiments, the temperature-controlled container of paragraph 124 includes wherein the attachment unit includes: an attachment unit fabricated from a thermally-expansive material.

149. In some embodiments, the temperature-controlled container of paragraph 124 includes wherein the second aperture within a section of the insulation material substantially defining the container is positioned at a face of the temperature-controlled container adjacent to a set of refrigeration coils when the container is oriented for use within a refrigeration device.

150. In some embodiments, the temperature-controlled container of paragraph 124 includes wherein the second aperture within a section of the insulation material substantially defining the container includes: a second aperture of a size and shape to substantially correspond with an external surface of the second unidirectional thermal conductor positioned within the first aperture.
151. In some embodiments, the temperature-controlled container of paragraph 124 includes wherein the second unidirectional thermal conductor includes: a heat pipe device.
152. In some embodiments, the temperature-controlled container of paragraph 124 includes wherein the second unidirectional thermal conductor includes: a thermal diode device.
153. In some embodiments, the temperature-controlled container of paragraph 124 includes wherein the second unidirectional thermal conductor includes: one or more thermal conduction units in thermal contact with an exterior surface of the second unidirectional thermal conductor, the one or more thermal conduction units positioned within the storage region.
154. In some embodiments, the temperature-controlled container of paragraph 124 includes wherein the second unidirectional thermal conductor includes: an attachment unit configured to attach to a refrigeration coil of a refrigeration device.
155. In some embodiments, the temperature-controlled container of paragraph 154 includes wherein the attachment unit includes: an attachment unit fabricated from a thermally-expansive material.
156. In some embodiments, the temperature-controlled container of paragraph 124 further includes: a temperature sensor positioned within the storage region, the temperature sensor attached to the thermal control device within the conduit.
157. In some embodiments, the temperature-controlled container of paragraph 124 further includes: a temperature sensor positioned within the storage region, the temperature sensor attached to a heating device within the storage region.
158. In some embodiments, the temperature-controlled container of paragraph 124 further includes: a temperature sensor positioned within the storage region, the temperature sensor attached to a transmission device.
159. In some embodiments, the temperature-controlled container of paragraph 124 further includes: a temperature sensor positioned within the storage region, the temperature sensor attached to a controller for the refrigeration device.
160. In some embodiments, the temperature-controlled container of paragraph 124 further includes: a liner region for the storage region, the liner region configured to contain a phase change material.
161. In some embodiments, the temperature-controlled container of paragraph 124 further includes: a second thermally-insulated partition dividing the internal region to form a second storage region and a second phase change material region internal to the container, the second thermally-insulated partition including a second conduit between the second storage region and the second phase change material region.
162. In some embodiments, the temperature-controlled container of paragraph 161 further includes: a liner region for the second storage region, the liner region configured to contain a phase change material.
163. In some embodiments, the temperature-controlled container of paragraph 161 further includes: a third aperture within a section of the insulation material substantially defining the container, the third aperture between the second phase change material region internal to the container and an external surface of the container; and a third unidirectional thermal conductor positioned within the third aperture, the third unidirectional thermal conductor configured to transmit heat in a direction from the phase change material region to the external surface of the container.
164. In some embodiments, a temperature-control addition to a refrigeration device includes: a thermal storage unit including a container of a size and shape to fit within a freezer section of a refrigeration device, the container including an aperture with an edge dimension larger than a cross-section of a refrigeration coil of the refrigeration device; a thermal diode unit of a size and shape to fit within a refrigeration section of the refrigeration device, the thermal diode unit including a top edge configured to be positioned adjacent to a vent aperture of the refrigeration device; and a control unit including a temperature sensor, a controller responsive to the temperature sensor, and a fan responsive to the controller.
165. Some embodiments of the temperature-control addition to a refrigeration device of paragraph 164 include wherein the thermal storage unit includes: a single aperture with an edge dimension larger than a cross-section of a refrigeration coil of the refrigeration device.
166. Some embodiments of the temperature-control addition to a refrigeration device of paragraph 164 include wherein the container of the thermal storage unit includes: a liquid-impermeable container.
167. Some embodiments of the temperature-control addition to a refrigeration device of paragraph 164 include wherein the container of the thermal storage unit includes: a phase-change material substantially filling the container.
168. Some embodiments of the temperature-control addition to a refrigeration device of paragraph 164 include wherein the thermal diode unit includes: at least one inner wall configured to be substantially vertical during use of the thermal diode unit; at least one outer wall of a size and shape to align with the at least one inner wall, with a gap formed between the at least one inner wall and the at least one outer wall, the outer wall including an outer surface configured to be positioned within the refrigeration section of the refrigeration device; a mesh structure affixed to a surface of the at least one inner wall adjacent to the gap; a liquid within the gap; one or more seals between the at least one inner wall and the at least one outer wall, forming a gas-impermeable interior region of the thermal diode unit surrounding the gap; and a gas pressure less than atmospheric pressure within the gas-impermeable interior region.
169. Some embodiments of the temperature-control addition to a refrigeration device of paragraph 164 include wherein the thermal diode unit is fabricated from thermally-conductive material.
170. Some embodiments of the temperature-control addition to a refrigeration device of paragraph 164 include wherein the thermal diode unit includes: a mesh structure affixed to a surface of the at least one inner wall adjacent to the gap, the mesh structure including a plurality of interior pores, the average dimension of the plurality of interior pores sufficient to conduct the liquid to a top edge of the mesh structure when the thermal diode unit is positioned for use.
171. Some embodiments of the temperature-control addition to a refrigeration device of paragraph 164 include wherein the thermal diode unit includes: a bottom wall, the bottom wall affixed to the at least one inner wall at a lower edge when the thermal diode unit is positioned for use.

172. Some embodiments of the temperature-control addition to a refrigeration device of paragraph 164 include wherein the thermal diode unit includes: a thermal transfer component in thermal contact with the thermal diode unit, the thermal transfer unit positioned adjacent to the top edge of the thermal diode unit.

173. Some embodiments of the temperature-control addition to a refrigeration device of paragraph 164 include wherein the control unit includes: a transmission device.

174. Some embodiments of the temperature-control addition to a refrigeration device of paragraph 164 include wherein the control unit includes: a battery.

175. In some embodiments, a temperature-control addition to a refrigeration device includes: a temperature-controlled container including one or more sections of insulation material substantially defining one or more walls of the temperature-controlled container, a thermally-insulated partition dividing the internal region into at least a first storage region and a second storage region, a first conduit attached to the first storage region, a second conduit attached to a second storage region, the first conduit and the second conduit both of a size and shape to be positioned within a ventilation conduit of a refrigeration device; a first thermal diode unit of a size and shape to fit within the first storage region of the temperature-controlled container, the first thermal diode unit including a thermal transfer component in thermal contact with a top edge of the first thermal diode unit, the thermal transfer component configured to be positioned within the first conduit of the temperature-controlled container; a second thermal diode unit of a size and shape to fit within the second storage region of the temperature-controlled container, the second thermal diode unit including a thermal transfer component in thermal contact with a top edge of the second thermal diode unit, the thermal transfer component configured to be positioned within the second conduit of the temperature-controlled container; a first control unit including a temperature sensor, a controller responsive to the temperature sensor, and a fan responsive to the controller attached to the first storage region of the temperature-controlled container; and a second control unit including a temperature sensor, a controller responsive to the temperature sensor, and a fan responsive to the controller attached to the second storage region of the temperature-controlled container.

176. Some embodiments of a temperature-control addition to a refrigeration device as in paragraph 175 include wherein the temperature-controlled container is of a size and shape to fit within a cold-storage region of a domestic refrigeration device.

177. Some embodiments of a temperature-control addition to a refrigeration device as in paragraph 175 include wherein the one or more sections of insulation material include: one or more sections of vacuum-insulated panels.

178. Some embodiments of a temperature-control addition to a refrigeration device as in paragraph 175 include wherein the one or more sections of insulation material include: an insulation material with an R-value of at least 5 $ft^{2.°}$ F.·h/Btu.

179. Some embodiments of a temperature-control addition to a refrigeration device as in paragraph 175 include wherein the one or more sections of insulation material include: an insulation material with an R-value of at least 7 $ft^{2.°}$ F.·h/Btu.

180. Some embodiments of a temperature-control addition to a refrigeration device as in paragraph 175 include wherein the one or more sections of insulation material include: an insulation material with an R-value of at least 10 $ft^{2.°}$ F.·h/Btu.

181. Some embodiments of a temperature-control addition to a refrigeration device as in paragraph 175 include wherein the one or more sections of insulation material include: an access aperture adjacent to the first storage region internal to the container; and a door configured to substantially mate with the access aperture.

182. Some embodiments of a temperature-control addition to a refrigeration device as in paragraph 181 include wherein the door includes at least one insulation material.

183. Some embodiments of a temperature-control addition to a refrigeration device as in paragraph 175 include wherein the one or more sections of insulation material include: an access aperture adjacent to the second storage region internal to the container; and a door configured to substantially mate with the access aperture.

184. Some embodiments of a temperature-control addition to a refrigeration device as in paragraph 183 include wherein the door includes at least one insulation material.

185. Some embodiments of a temperature-control addition to a refrigeration device as in paragraph 175 include wherein the one or more sections of insulation material include: an aperture at a lower face of the container, the aperture configured to permit condensed liquid to flow from an interior of the container.

186. Some embodiments of a temperature-control addition to a refrigeration device as in paragraph 175 include wherein the one or more sections of insulation material include: an external surface configured to be positioned adjacent to one or more walls of a refrigeration region within a refrigeration device.

187. Some embodiments of a temperature-control addition to a refrigeration device as in paragraph 175 include wherein the walls of the temperature-controlled container include: one or more external surfaces configured to reversibly mate with one or more internal surfaces of the refrigeration device.

188. Some embodiments of a temperature-control addition to a refrigeration device as in paragraph 175 include wherein the walls of the temperature-controlled container include: a structural material attached to the one or more sections of insulation material.

189. Some embodiments of a temperature-control addition to a refrigeration device as in paragraph 175 include wherein the walls of the temperature-controlled container are of a size and shape to fit within a storage region of the refrigeration device.

190. Some embodiments of a temperature-control addition to a refrigeration device as in paragraph 175 include wherein the first thermal diode unit includes: at least one inner wall configured to be substantially vertical during use of the first thermal diode unit; at least one outer wall of a size and shape to align with the at least one inner wall, with a gap formed between the at least one inner wall and the at least one outer wall; a mesh structure affixed to a surface of the at least one inner wall adjacent to the gap; a liquid within the gap; one or more seals between the at least one inner wall and the at least one outer wall, forming a gas-impermeable interior region of the first thermal diode unit surrounding the gap; and a gas pressure less than atmospheric pressure within the gas-impermeable interior region.

191. Some embodiments of a temperature-control addition to a refrigeration device as in paragraph 190 include wherein the at least one inner wall of the first thermal diode unit is fabricated from a thermally-conductive metal.

192. Some embodiments of a temperature-control addition to a refrigeration device as in paragraph 190 include wherein the mesh structure includes: a plurality of interior pores, the average dimension of the plurality of interior pores sufficient to conduct the liquid to a top edge of the mesh structure when the thermal diode unit is positioned for use.

193. Some embodiments of a temperature-control addition to a refrigeration device as in paragraph 190 include wherein the mesh structure includes: a plurality of interior pores, the average dimension of the plurality of interior pores less than approximately 100 microns.

194. Some embodiments of a temperature-control addition to a refrigeration device as in paragraph 190 include wherein the mesh structure is affixed to the surface of the inner wall with thermal contact between the mesh structure and the majority of the surface.

195. Some embodiments of a temperature-control addition to a refrigeration device as in paragraph 175 include wherein the second thermal diode unit includes: at least one inner wall configured to be substantially vertical during use of the second thermal diode unit; at least one outer wall of a size and shape to align with the at least one inner wall, with a gap formed between the at least one inner wall and the at least one outer wall; a mesh structure affixed to a surface of the at least one inner wall adjacent to the gap; a liquid within the gap; one or more seals between the at least one inner wall and the at least one outer wall, forming a gas-impermeable interior region of the second thermal diode unit surrounding the gap; and a gas pressure less than atmospheric pressure within the gas-impermeable interior region.

196. Some embodiments of a temperature-control addition to a refrigeration device as in paragraph 195 includes wherein the at least one inner wall of the second thermal diode unit is fabricated from a thermally-conductive metal.

197. Some embodiments of a temperature-control addition to a refrigeration device as in paragraph 195 includes wherein the mesh structure includes: a plurality of interior pores, the average dimension of the plurality of interior pores sufficient to conduct the liquid to a top edge of the mesh structure when the thermal diode unit is positioned for use.

198. Some embodiments of a temperature-control addition to a refrigeration device as in paragraph 195 includes wherein the mesh structure includes: a plurality of interior pores, the average dimension of the plurality of interior pores less than approximately 100 microns.

199. Some embodiments of a temperature-control addition to a refrigeration device as in paragraph 195 includes wherein the mesh structure is affixed to the surface of the inner wall with thermal contact between the mesh structure and the majority of the surface.

200. Some embodiments of a temperature-control addition to a refrigeration device as in paragraph 175 include wherein the first control unit includes: a transmission unit.

201. Some embodiments of a temperature-control addition to a refrigeration device as in paragraph 175 include wherein the second control unit includes: a transmission unit.

202. Some embodiments of a temperature-control addition to a refrigeration device as in paragraph 175 further include: an attachment unit, including a thermally conductive attachment configured to attach to a refrigeration coil of the refrigeration device and a plurality of thermally transmissive projections affixed to the thermally conductive attachment; and a thermal storage unit including a liquid-impermeable container of a size and shape to fit within a freezer section of a refrigeration device, the container including a plurality of apertures configured to receive the plurality of thermally transmissive projections affixed to the thermally conductive attachment.

203. Some embodiments of a method of forming a temperature-control addition to a refrigeration device include: obtaining measurements of interior surfaces of a refrigeration device; forming a temperature-controlled container from one or more walls formed from insulative material, the temperature-controlled container including an exterior surface configured to reversibly mate with the interior surfaces of the refrigeration device and a thermally-sealed internal region; affixing at least one thermally-insulated partition within the thermally-sealed internal region to form at least one storage region and at least one phase change material region; positioning at least one unidirectional thermal conductor through the one or more walls so that heat is conducted from the thermally-sealed internal region to the interior surfaces of the refrigeration device when the temperature-controlled container is positioned within the refrigeration device; and sealing phase change material within the phase change material region.

204. In some embodiments, the method of forming a temperature-control addition to a refrigeration device of paragraph 203 includes wherein obtaining the measurements of the interior surfaces includes: accepting manufacturer's data regarding the refrigeration device.

205. In some embodiments, the method of forming a temperature-control addition to a refrigeration device of paragraph 203 includes wherein forming a temperature-controlled container includes: sealing the one or more walls together with thermally-non-conductive material.

206. In some embodiments, the method of forming a temperature-control addition to a refrigeration device of paragraph 203 includes wherein affixing at least one thermally-insulated partition within the thermally-sealed internal region includes: sealing the at least one thermally-insulated partition to an internal surface of the one or more walls.

207. In some embodiments, the method of forming a temperature-control addition to a refrigeration device of paragraph 203 includes wherein positioning at least one unidirectional thermal conductor includes: referencing manufacturer's data regarding the refrigeration device.

208. In some embodiments, the method of forming a temperature-control addition to a refrigeration device of paragraph 203 includes wherein sealing phase change material within the phase change material region includes: sealing phase change material within a container placed within the phase change material region.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

In an embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, aspects of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Examples of electro-mechanical systems include but are not limited to a variety of consumer electronics systems, medical devices, as well as other systems such as motorized transport systems, factory automation systems, security systems, and/or communication/computing systems. Electro-mechanical as used herein is not necessarily limited to a system that has both electrical and mechanical actuation except as context may dictate otherwise.

In a general sense, the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). The subject matter described herein may be implemented in an analog or digital fashion or some combination thereof.

At least a portion of the devices and/or processes described herein can be integrated into an image processing system. A typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

At least a portion of the devices and/or processes described herein can be integrated into a data processing system. A data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Such terms (e.g. "configured to") generally encompass active-state components and/or inactive-state components and/or standby-state components, unless context requires otherwise.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A temperature-control addition to a refrigeration device, comprising:
    a thermal storage unit including a container of a size and shape to fit within a freezer section of a refrigeration device, the container including an aperture with an edge dimension larger than a cross-section of a refrigeration coil of the refrigeration device;
    a thermal diode unit of a size and shape to fit within a refrigeration section of the refrigeration device, the thermal diode unit including a top edge configured to be positioned adjacent to a vent aperture of the refrigeration device; and
    a control unit including a temperature sensor, a controller responsive to the temperature sensor, and a fan of a size and shape to fit within the refrigeration section of the refrigeration device, the fan responsive to the controller.

2. The temperature-control addition to a refrigeration device of claim 1, wherein the thermal diode unit comprises:
    at least one inner wall configured to be substantially vertical during use of the thermal diode unit;
    at least one outer wall of a size and shape to align with the at least one inner wall, with a gap formed between the at least one inner wall and the at least one outer wall, the outer wall including an outer surface configured to be positioned within the refrigeration section of the refrigeration device;
    a mesh structure affixed to a surface of the at least one inner wall adjacent to the gap;
    a liquid within the gap;
    one or more seals between the at least one inner wall and the at least one outer wall, forming a gas-impermeable interior region of the thermal diode unit surrounding the gap; and
    a gas pressure within the gas-impermeable interior region that is not identical to atmospheric pressure surrounding the thermal diode unit.

3. The temperature-control addition to a refrigeration device of claim 1, comprising:
    a transmission device.

4. A temperature-control addition to a refrigeration device, comprising:
    a temperature-controlled container including one or more sections of insulation material substantially defining one or more walls of the temperature-controlled container, a thermally-insulated partition dividing the internal region into at least a first storage region and a second storage region, a first conduit attached to the first storage region, a second conduit attached to a second storage region, the first conduit and the second conduit both of a size and shape to be positioned within a ventilation conduit of a refrigeration device;
    a first thermal diode unit of a size and shape to fit within the first storage region of the temperature-controlled container, the first thermal diode unit including a thermal transfer component in thermal contact with a top edge of the first thermal diode unit, the thermal transfer component configured to be positioned within the first conduit of the temperature-controlled container;
    a second thermal diode unit of a size and shape to fit within the second storage region of the temperature-controlled container, the second thermal diode unit including a thermal transfer component in thermal contact with a top edge of the second thermal diode unit, the thermal transfer component configured to be positioned within the second conduit of the temperature-controlled container;
    a first control unit including a temperature sensor, a controller responsive to the temperature sensor, and a fan responsive to the controller attached to the first storage region of the temperature-controlled container; and
    a second control unit including a temperature sensor, a controller responsive to the temperature sensor, and a fan responsive to the controller attached to the second storage region of the temperature-controlled container.

5. The temperature-controlled container of claim 4, wherein the first thermal diode unit comprises:
- at least one inner wall configured to be substantially vertical during use of the first thermal diode unit;
- at least one outer wall of a size and shape to align with the at least one inner wall, with a gap formed between the at least one inner wall and the at least one outer wall;
- a mesh structure affixed to a surface of the at least one inner wall adjacent to the gap;
- a liquid within the gap;
- one or more seals between the at least one inner wall and the at least one outer wall, forming a gas-impermeable interior region of the first thermal diode unit surrounding the gap; and
- a gas pressure within the gas-impermeable interior region that is not identical to atmospheric pressure surrounding the thermal diode unit.

6. The temperature-control addition to a refrigeration device of claim 4, further comprising:
- an attachment unit, including a thermally conductive attachment configured to attach to a refrigeration coil of the refrigeration device and a plurality of thermally transmissive projections affixed to the thermally conductive attachment; and
- a thermal storage unit including a liquid-impermeable container of a size and shape to fit within a freezer section of a refrigeration device, the container including a plurality of apertures configured to receive the plurality of thermally transmissive projections affixed to the thermally conductive attachment.

7. A temperature-control addition to a refrigeration device, comprising:
- a thermal storage unit including a container of a size and shape to fit within a freezer section of a refrigeration device, the container including an aperture with an edge dimension larger than a cross-section of a refrigeration coil of the refrigeration device;
- a control unit including a temperature sensor and a controller responsive to the temperature sensor; and
- a thermal diode unit including a top edge configured to be positioned adjacent to the thermal storage unit, the thermal diode unit of a size and shape to fit within the refrigeration device, the thermal diode unit including at least one inner wall configured to be substantially vertical during use of the thermal diode unit, at least one outer wall of a size and shape to align with the at least one inner wall, with a gap formed between the at least one inner wall and the at least one outer wall, a liquid within the gap, one or more seals between the at least one inner wall and the at least one outer wall, forming a gas-impermeable interior region of the thermal diode unit surrounding the gap, and a gas pressure within the gas-impermeable interior region that is not identical to atmospheric pressure surrounding the thermal diode unit.

8. A temperature-control addition to a refrigeration device, comprising:
- a temperature-controlled container including one or more sections of insulation material substantially defining one or more walls of the temperature-controlled container, a thermally-insulated partition dividing the internal region into at least a first storage region and a second storage region;
- a first thermal diode unit of a size and shape to fit within the first storage region of the temperature-controlled container, the first thermal diode unit including a thermal transfer component in thermal contact with a top edge of the first thermal diode unit;
- a second thermal diode unit of a size and shape to fit within the second storage region of the temperature-controlled container, the second thermal diode unit including a thermal transfer component in thermal contact with a top edge of the second thermal diode unit;
- a first control unit including a first temperature sensor, a controller responsive to the first temperature sensor; and
- a second control unit including a second temperature sensor, a controller responsive to the second temperature sensor.

* * * * *